US008977797B2

(12) United States Patent
Chu

(10) Patent No.: US 8,977,797 B2
(45) Date of Patent: *Mar. 10, 2015

(54) METHOD OF IMPROVING PERIPHERAL COMPONENT INTERFACE COMMUNICATIONS UTILIZING A LOW VOLTAGE DIFFERENTIAL SIGNAL CHANNEL

(71) Applicant: ACQIS LLC, McKinney, TX (US)

(72) Inventor: William W. Y. Chu, Los Altos, CA (US)

(73) Assignee: ACQIS LLC, McKinney, TX (US)

( * ) Notice: Subject to any disclaimer, the term of this patent is extended or adjusted under 35 U.S.C. 154(b) by 275 days.

This patent is subject to a terminal disclaimer.

(21) Appl. No.: 13/649,084

(22) Filed: Oct. 10, 2012

(65) Prior Publication Data

US 2013/0097352 A1    Apr. 18, 2013

Related U.S. Application Data

(63) Continuation of application No. 13/560,924, filed on Jul. 27, 2012, now Pat. No. 8,626,977, which is a continuation of application No. 13/087,912, filed on Apr. 15, 2011, now Pat. No. 8,234,436, which is a (Continued)

(51) Int. Cl.
*G06F 13/20* (2006.01)
*G06F 1/08* (2006.01)
(Continued)

(52) U.S. Cl.
CPC .. *G06F 1/08* (2013.01); *G06F 1/12* (2013.01); *G06F 13/385* (2013.01); *G06F 13/4068* (2013.01); *G06F 13/42* (2013.01)
USPC ......................................... 710/313

(58) Field of Classification Search
CPC .................................... G06F 13/4081
USPC ......... 710/300–304, 313–315, 62–64, 72–74; 709/214–21, 226–227; 726/2–9, 726/16–21, 34, 36; 713/182–183, 192–194
See application file for complete search history.

(56) References Cited

U.S. PATENT DOCUMENTS

| 4,769,764 A | 9/1988 | Levanon |
| 4,799,258 A | 1/1989 | Davies |

(Continued)

FOREIGN PATENT DOCUMENTS

| EP | 0722138 A1 | 7/1996 |
| JP | 6-289953 | 10/1994 |

(Continued)

OTHER PUBLICATIONS

Boosten, "Transmission Overhead and Optimal Packet Size", Mar. 11, 1998, printed on: Jan. 28, 2011, 2 pgs.

*Primary Examiner* — Raymond Phan
(74) *Attorney, Agent, or Firm* — Cooley LLP

(57) ABSTRACT

A computer system for multi-processing purposes. The computer system has a console comprising a first coupling site and a second coupling site. Each coupling site comprises a connector. The console is an enclosure that is capable of housing each coupling site. The system also has a plurality of computer modules, where each of the computer modules is coupled to a connector. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

38 Claims, 31 Drawing Sheets

Related U.S. Application Data continuation of application No. 12/504,534, filed on Jul. 16, 2009, now Pat. No. 8,041,873, which is a continuation of application No. 12/077,503, filed on Mar. 18, 2008, now Pat. No. 7,676,624, which is a continuation of application No. 11/166,656, filed on Jun. 24, 2005, now Pat. No. 7,376,779, which is a continuation of application No. 11/097,694, filed on Mar. 31, 2005, now Pat. No. 7,363,415, which is a continuation of application No. 10/772,214, filed on Feb. 3, 2004, now Pat. No. 7,099,981, which is a continuation of application No. 09/569,758, filed on May 12, 2000, now Pat. No. 6,718,415.

(60) Provisional application No. 60/134,122, filed on May 14, 1999.

(51) Int. Cl.
*G06F 1/12* (2006.01)
*G06F 13/38* (2006.01)
*G06F 13/40* (2006.01)
*G06F 13/42* (2006.01)

(56) References Cited

U.S. PATENT DOCUMENTS

| | | |
|---|---|---|
| 5,086,499 A | 2/1992 | Mutone |
| 5,103,446 A | 4/1992 | Fischer |
| 5,191,581 A | 3/1993 | Woodbury et al. |
| 5,198,806 A | 3/1993 | Lord |
| 5,319,771 A | 6/1994 | Takeda |
| 5,463,742 A | 10/1995 | Kobayashi |
| 5,519,843 A | 5/1996 | Moran et al. |
| 5,539,616 A | 7/1996 | Kikinis |
| 5,546,463 A | 8/1996 | Caputo et al. |
| 5,550,861 A | 8/1996 | Chan et al. |
| 5,572,441 A | 11/1996 | Boie |
| 5,590,377 A | 12/1996 | Smith |
| 5,608,608 A | 3/1997 | Flint et al. |
| 5,623,637 A | 4/1997 | Jones et al. |
| 5,638,521 A | 6/1997 | Buchala et al. |
| 5,640,302 A | 6/1997 | Kikinis |
| 5,648,762 A | 7/1997 | Ichimura et al. |
| 5,689,654 A | 11/1997 | Kikinis et al. |
| 5,721,842 A | 2/1998 | Beasley et al. |
| 5,751,711 A | 5/1998 | Sakaue |
| 5,751,950 A | 5/1998 | Crisan |
| 5,764,924 A | 6/1998 | Hong |
| 5,774,704 A | 6/1998 | Williams |
| 5,815,681 A | 9/1998 | Kikinis |
| 5,819,053 A | 10/1998 | Goodrum et al. |
| 5,838,932 A | 11/1998 | Alzien |
| 5,857,085 A | 1/1999 | Zhang et al. |
| 5,862,381 A | 1/1999 | Advani et al. |
| 5,878,211 A | 3/1999 | Delagrange et al. |
| 5,884,049 A | 3/1999 | Atkinson |
| 5,907,566 A | 5/1999 | Benson et al. |
| 5,909,559 A | 6/1999 | So |
| 5,933,609 A | 8/1999 | Walker et al. |
| 5,935,226 A | 8/1999 | Klein |
| 5,941,965 A | 8/1999 | Moroz et al. |
| 5,941,968 A | 8/1999 | Mergard et al. |
| 5,974,486 A | 10/1999 | Siddappa |
| 5,978,919 A | 11/1999 | Doi et al. |
| 5,991,833 A | 11/1999 | Wandler et al. |
| 5,999,476 A | 12/1999 | Dutton et al. |
| 5,999,952 A | 12/1999 | Jenkins et al. |
| 6,006,243 A | 12/1999 | Karidis |
| 6,012,145 A | 1/2000 | Mathers et al. |
| 6,025,989 A | 2/2000 | Ayd et al. |
| 6,029,183 A | 2/2000 | Jenkins et al. |
| 6,038,621 A | 3/2000 | Gale et al. |
| 6,046,571 A | 4/2000 | Bovio et al. |
| 6,069,615 A | 5/2000 | Abraham et al. |
| 6,070,214 A | 5/2000 | Ahern |
| 6,104,921 A | 8/2000 | Cosley et al. |
| 6,157,534 A | 12/2000 | Gallagher et al. |
| 6,161,157 A | 12/2000 | Tripathi |
| 6,161,524 A | 12/2000 | Akbarian et al. |
| 6,199,134 B1 | 3/2001 | Deschepper et al. |
| 6,202,115 B1 | 3/2001 | Khosrowpour |
| 6,202,169 B1 | 3/2001 | Razzaghe-Ashrafi et al. |
| 6,216,185 B1 | 4/2001 | Chu |
| 6,226,700 B1 | 5/2001 | Wandler et al. |
| 6,256,689 B1 | 7/2001 | Khosrowpour |
| 6,266,539 B1 | 7/2001 | Pardo |
| 6,301,637 B1 | 10/2001 | Krull et al. |
| 6,304,895 B1 | 10/2001 | Schneider et al. |
| 6,311,268 B1 | 10/2001 | Chu |
| 6,314,522 B1 | 11/2001 | Chu |
| 6,321,277 B1 | 11/2001 | Andresen et al. |
| 6,321,335 B1 | 11/2001 | Chu |
| 6,324,605 B1 | 11/2001 | Rafferty et al. |
| 6,332,180 B1 | 12/2001 | Kauffman et al. |
| 6,345,330 B2 | 2/2002 | Chu |
| 6,366,951 B1 | 4/2002 | Schmidt |
| 6,378,009 B1 | 4/2002 | Pinkston, II et al. |
| 6,401,124 B1 | 6/2002 | Yang et al. |
| 6,452,790 B1 | 9/2002 | Chu |
| 6,453,344 B1 | 9/2002 | Ellsworth et al. |
| 6,460,106 B1 | 10/2002 | Stufflebeam |
| 6,477,593 B1 | 11/2002 | Khosrowpour et al. |
| 6,487,614 B2 | 11/2002 | Nobutani et al. |
| 6,549,966 B1 | 4/2003 | Dickens et al. |
| 6,643,777 B1 | 11/2003 | Chu |
| 6,718,415 B1 | 4/2004 | Chu |
| 7,099,981 B2 | 8/2006 | Chu |
| 7,146,446 B2 | 12/2006 | Chu |
| 7,328,297 B2 | 2/2008 | Chu |
| 7,363,415 B2 | 4/2008 | Chu |
| 7,363,416 B2 | 4/2008 | Chu |
| 7,376,779 B2 | 5/2008 | Chu |
| RE41,076 E | 1/2010 | Chu |
| RE41,092 E | 1/2010 | Chu |
| 7,676,624 B2 | 3/2010 | Chu |
| RE41,294 E | 4/2010 | Chu |
| 7,818,487 B2 | 10/2010 | Chu |
| RE41,961 E | 11/2010 | Chu |
| RE42,814 E | 10/2011 | Chu |
| 8,041,873 B2 | 10/2011 | Chu |
| RE42,984 E | 11/2011 | Chu |
| RE43,119 E | 1/2012 | Chu |
| RE43,171 E | 2/2012 | Chu |
| 8,234,436 B2 | 7/2012 | Chu |
| RE43,602 E | 8/2012 | Chu |
| RE44,468 E | 8/2013 | Chu |
| RE44,654 E * | 12/2013 | Chu ............................ 726/16 |
| 2001/0011312 A1 | 8/2001 | Chu |
| 2004/0177200 A1 | 9/2004 | Chu |
| 2005/0174729 A1 | 8/2005 | Chu |
| 2005/0182882 A1 | 8/2005 | Chu |
| 2005/0195575 A1 | 9/2005 | Chu |
| 2005/0204083 A1 | 9/2005 | Chu |
| 2005/0246469 A1 | 11/2005 | Chu |
| 2006/0265361 A1 | 11/2006 | Chu |
| 2008/0244149 A1 | 10/2008 | Chu |
| 2009/0157939 A1 | 6/2009 | Chu |
| 2010/0174844 A1 | 7/2010 | Chu |
| 2011/0208893 A1 | 8/2011 | Chu |

FOREIGN PATENT DOCUMENTS

| | | |
|---|---|---|
| WO | WO 92/18924 | 10/1992 |
| WO | WO 94/00970 | 1/1994 |
| WO | WO 95/13640 | 5/1995 |

\* cited by examiner

Attached Computer Module with Single Chip Fully Integrated: CPU, Cache, Core Logic, Graphics Controller and Interface Controller

| | Symbol | Signal | Data Rate | Description |
|---|---|---|---|---|
| 1 | PD0 RTN | | | GND |
| 2 | PD0+ | Synch. To PCK | 10 x clock rate | Computer to Peripheral LVDS Data 0+ |
| 3 | PD0- | | | Computer to Peripheral LVDS Data 0- |
| 4 | PD1 RTN | | | GND |
| 5 | PD1+ | Synch. To PCK | 10 x clock rate | Computer to Peripheral LVDS Data 1+ |
| 6 | PD1- | | | Computer to Peripheral LVDS Data 1- |
| 7 | PD2 RTN | | | GND |
| 8 | PD2+ | Synch. To PCK | 10 x clock rate | Computer to Peripheral LVDS Data 2+ |
| 9 | PD2- | | | Computer to Peripheral LVDS Data 2- |
| 10 | PD3 RTN | | | GND |
| 11 | PD3+ | Synch. To PCK | 10 x clock rate | Computer to Peripheral LVDS Data 3+ |
| 12 | PD3- | | | Computer to Peripheral LVDS Data 3- |
| 13 | PCK RTN | | | GND |
| 14 | PCK+ | Clock | Clock rate | Computer to Peripheral LVDS Clock + |
| 15 | PCK- | | | Computer to Peripheral LVDS Clock - |
| 16 | PCN RTN | | | GND |
| 17 | PCN+ | Synch. To PCK | 10 x clock rate | Computer to Peripheral LVDS Control + |
| 18 | PCN- | | | Computer to Peripheral LVDS Control - |
| 19 | PDR0 RTN | | | GND |
| 20 | PDR0+ | Synch. To PCKR | 10 x clock rate | Peripheral to Computer LVDS Data 0+ |
| 21 | PDR0- | | | Peripheral to Computer LVDS Data 0- |
| 22 | PDR1 RTN | | | GND |
| 23 | PDR1+ | Synch. To PCKR | 10 x clock rate | Peripheral to Computer LVDS Data 1+ |
| 24 | PDR1- | | | Peripheral to Computer LVDS Data 1- |
| 25 | PDR2 RTN | | | GND |
| 26 | PDR2+ | Synch. To PCKR | 10 x clock rate | Peripheral to Computer LVDS Data 2+ |
| 27 | PDR2- | | | Peripheral to Computer LVDS Data 2- |
| 28 | PDR3 RTN | | | GND |
| 29 | PDR3+ | Synch. To PCKR | 10 x clock rate | Peripheral to Computer LVDS Data 3+ |
| 30 | PDR3- | | | Peripheral to Computer LVDS Data 3- |
| 31 | PCKR RTN | | | GND |
| 32 | PCKR+ | Reverse Dir Clock | Clock rate | Peripheral to Computer LVDS Clock + |
| 33 | PCKR- | | | Peripheral to Computer LVDS Clock - |
| 34 | PCNR RTN | | | GND |
| 35 | PCNR+ | Synch. To PCKR | 10 x clock rate | Peripheral to Computer LVDS Control + |
| 36 | PCNR- | | | Peripheral to Computer LVDS Control - |
| 37 | RESET# | | Asynchronous | Reset |

FIGURE 12

| PCK | CK+ | CK+ | CK+ | CK+ | CK+ | CK- | CK- | CK- | CK- | CK- | CK- | CK+ | CK+ | CK+ | CK+ | CK+ | CK+ | CK- | CK- | CK- | CK- | CK- | CK- |
|---|---|---|---|---|---|---|---|---|---|---|---|---|---|---|---|---|---|---|---|---|---|---|---|
| PD0 | BS0 | CM0# | A00 | A01 | A02 | A03 | A04 | A05 | A06 | A07 | BS0 | BE0# | D00 | D01 | D02 | D03 | D04 | D05 | D06 | D07 |
| PD1 | BS1 | CM1# | A08 | A09 | A10 | A11 | A12 | A13 | A14 | A15 | BS1 | BE1# | D08 | D09 | D10 | D11 | D12 | D13 | D14 | D15 |
| PD2 | BS2 | CM2# | A16 | A17 | A18 | A19 | A20 | A21 | A22 | A23 | BS2 | BE2# | D16 | D17 | D18 | D19 | D20 | D21 | D22 | D23 |
| PD3 | BS3 | CM3# | A24 | A25 | A26 | A27 | A28 | A29 | A30 | A31 | BS3 | BE3# | D24 | D25 | D26 | D27 | D28 | D29 | D30 | D31 |
| PCN | CN0 | CN1 | CN2 | CN3 | CN4 | CN5 | CN6 | CN7 | CN8 | CN9 | CN0 | CN1 | CN2 | CN3 | CN4 | CN5 | CN6 | CN7 | CN8 | CN9 |

| Name | Type | Pins | Description |
|---|---|---|---|
| AD[31::0] | TS | 32 | Multiplexed Address/Data. AD is driven to a valid state when GNT# is asserted. |
| C/BE[3::0]# | TS | 4 | Multiplexed Command/Byte Enables. For a two-address transaction, 1st address phase carries the command, and the 2nd address phase carries the transaction type C/BE is driven to a valid state when GNT# is asserted. |
| FRAME# | STS | 1 | Indicates beginning and duration of a PCI transaction. When the bus is idle, FRAME# is driven to High for 1 cycle. A pull-up resistor sustains STS signal. |
| IRDY# | STS | 1 | Initiator Ready. IRDY# is driven High for 1 cycle if bus is idle, and the state is sustained by a pull-up resistor. |
| TRDY# | STS | 1 | Target Ready. When bus is idle, TRDY# is driven High for 1 cycle if bus is idle. An external pull-up resistor sustains STS signal. |
| DEVSEL# | STS | 1 | Device Select. DEVSEL# is asserted by target to indicate it is ready to accept the transaction. HIC decodes address of a transaction to decide the need to assert DEVSEL#. As an initiator, HIC waits for 5 cycles to detect assertion of DEVSEL# by the target; otherwise HIC terminates with a master abort. DEVSEL# is driven High for 1 cycle when bus is idle, and the state is sustained by a pull-up resistor. |
| STOP# | STS | 1 | Target request to stop transaction. There are 3 cases: STOP#, TRDY# & DEVSEL# asserted: disconnect with data transfer Only STOP# & DEVSEL# asserted: request initiator to retry later Only STOP# asserted: target abort STOP# is driven High for 1 cycle when bus is idle, and the state is sustained by a pull-up resistor. |
| PAR | TS | 1 | Even parity for 36 bits of AD & C/BE#. PAR is sent one cycle after address or data is valid. In write transaction, initiator sends PAR one cycle after write data is valid. In read transaction, target sends PAR one cycle after read data is valid. |
| LOCK# | Input | 1 | Initiator request lock on target downstream. LOCK# is asserted 1 clock cycle after address phase by an initiator wanting to perform an atomic operation that take more than one transaction to complete. HIC passes the LOCK# request to the secondary PCI bus. HIC does not drive LOCK# or propagate LOCK# upstream. |
| IDSEL# | Input | 1 | Chip Select for Type 0 configuration access. During a Type 0 configuration transaction, the initiator asserts IDSEL# during the address phase to select HIC. HIC responds by asserting DEVSEL#. |
| PERR# | STS | 1 | Data Parity Error on all transactions except Special Cycle. PERR# is driven one clock cycle after PAR. PERR# is asserted by target during write transactions, and by initiator during read transactions. |
| SERR# | OD | 1 | System Error. HIC asserts SERR# under the following conditions: Address parity error. Secondary bus SERR# asserted. Posted write transaction: data parity error on target bus. Posted write transaction discarded. Master abort. Target abort Delayed read or write transaction discarded, and Delayed transaction master timeout. |
| REQ# | TS | 1 | Request for bus. If a target retry or disconnect is received in response to initiating a transaction, HIC deasserts REQ# for at least 2 cycles before asserting it again. |
| GNT# | Input | 1 | Bus is granted to HIC. HIC can initiate transaction if GNT# is asserted and the bus is idle. When HIC is not requesting bus and GNT# is asserted, HIC must drive AD, C/BE, and PAR to valid logic levels. |
| CLKRUN# | I/OD | 1 | Input indicating clock status. HIC can request the central clock resource to start, speed up or maintain the PCI clock. There are 3 clocking states: Clock running, Clock about to stop/slow down, and Clock stopped/slowed. |
| PCICK | Input | 1 | PCI Clock. All inputs are sampled on the rising edge of PCICK. Frequency |

FIGURE 16

Attached Computer Module with a "Plug & Display" port and direct power connection.

| Pin No | Symbol | Signal | Standard | Description |
|---|---|---|---|---|
| P2 | PDR0 + | LVDS | | Peripheral data reverse 0 + |
| P3 | PDR0 - | LVDS | | Peripheral data reverse 0 - |
| P5 | PDR1 + | LVDS | | Peripheral data reverse 1 + |
| P6 | PDR1 - | LVDS | | Peripheral data reverse 1 - |
| P8 | PDR2 + | LVDS | | Peripheral data reverse 2 + |
| P9 | PDR2 - | LVDS | | Peripheral data reverse 2 - |
| P11 | PCKR + | LVDS | | Peripheral clock reverse + |
| P12 | PCKR - | LVDS | | Peripheral clock reverse - |
| P15 | PDR3 + | LVDS | | Peripheral data reverse 3 + |
| P16 | PDR3 - | LVDS | | Peripheral data reverse 3 - |
| P18 | PCNR + | LVDS | | Peripheral control reverse + |
| P19 | PCNR - | LVDS | | Peripheral control reverse - |
| P21 | PD0 + | LVDS | | Peripheral data 0 + |
| P22 | PD0 - | LVDS | | Peripheral data 0 - |
| P24 | PD1 + | LVDS | | Peripheral data 1 + |
| P25 | PD1 - | LVDS | | Peripheral data 1 - |
| P27 | PD2 + | LVDS | | Peripheral data 2 + |
| P28 | PD2 - | LVDS | | Peripheral data 2 - |
| P30 | PCK + | LVDS | | Peripheral clock + |
| P31 | PCK - | LVDS | | Peripheral clock - |
| P34 | PD3 + | LVDS | | Peripheral data 3 + |
| P35 | PD3 - | LVDS | | Peripheral data 3 - |
| P37 | PCN + | LVDS | | Peripheral control + |
| P38 | PCN - | LVDS | | Peripheral control - |
| P40 | Config 0 | Static | 3.3v or GND | Configuration bit 0 |
| P41 | Config 1 | Static | 3.3v or GND | Configuration bit 1 |
| P1,P4,P7,P10, P13,P26 P14,P17,P23,P26 P29,P32,P36,P39 | GND | | GND | Ground |

FIGURE 25

| Pin No. | Syntax | Signal | Standard | Description |
|---|---|---|---|---|
| V2 | Red Video | Analog | | Video |
| V4 | Green Video | Analog | | Video |
| V6 | Blue Video | Analog | | Video |
| V8 | HSYNC | | | Horizontal Sync |
| V9 | VSYNC | | | Vertical Sync |
| V11 | DDC2 SCL | | VESA DDC std 2 | DDC Clock |
| V12 | DDC2 SDA | | VESA DDC std 2 | DDC Data |
| V14 | TV-C/V/CNTL 0 | | | TV Composite Video |
| V15 | SV Y/CNTL 1 | | Super Video | SV Luminance or Control 1 |
| V17 | SV C/CNTL 2 | | Super Video | SV Chrominance of Control 2 |
| V20 | D0 + | TMDS | VESA P & D | Data 0 + |
| V21 | D0 - | TMDS | VESA P & D | Data 0 - |
| V22 | CLK + | TMDS | VESA P & D | Clock + |
| V27 | CLK - | TMDS | VESA P & D | Clock - |
| V28 | D1 + | TMDS | VESA P & D | Data 1 + |
| V30 | D1 - | TMDS | VESA P & D | Data 1 - |
| V31 | D2 + | TMDS | VESA P & D | Data 2 + |
| V33 | D2 - | TMDS | VESA P & D | Data 2 - |
| V34 | VPCK + | LVDS | | Video Port Pixel Clock + |
| V37 | VPCK - | LVDS | | Video Port Pixel Clock - |
| V40 | VPD + | LVDS | | Video Port Pixel Data + |
| V41 | VPD - | LVDS | | Video Port Pixel Data - |
| V15 | Config 2 | | 3.3v or GND | Configuration bit 2 |
| V35 | Config 3 | | 3.3v or GND | Configuration bit 3 |
| V1,V3,V5,V7,V10,V23,V26,V29,V32,V36,V38,V42,V43,V44 | GND | | GND | Ground |

FIGURE 26

| IE bits (P0 P1 P2 P3) | Data Packet Type |
|---|---|
| X X 0 0 | PCI 1st address/data segment |
| X X 1 0 | PCI 2nd address/data segment |
| 0 0 0 1 | Control 1st segment with PCI response |
| 1 0 0 1 | Control 1st segment without PCI response |
| 0 1 0 1 | Control 2nd segment with PCI response |
| 1 1 0 1 | Control 2nd segment without PCI response |
| 0 0 1 1 | Reserved |
| 1 0 1 1 | Reserved |
| 0 1 1 1 | Initialization |
| 1 1 1 1 | K30.7 |

FIGURE 27

METHOD OF IMPROVING PERIPHERAL COMPONENT INTERFACE COMMUNICATIONS UTILIZING A LOW VOLTAGE DIFFERENTIAL SIGNAL CHANNEL

CROSS REFERENCE TO RELATED APPLICATIONS

This application is a continuation of U.S. patent application Ser. No. 13/560,924, filed Jul. 27, 2012, which is a continuation of U.S. patent application Ser. No. 13/087,912, filed Apr. 15, 2011 (Now U.S. Pat. No. 8,234,436), which is a continuation of U.S. patent application Ser. No. 12/504,534, filed Jul. 16, 2009 (Now U.S. Pat. No. 8,041,873), which is a continuation of U.S. patent application Ser. No. 12/077,503, filed Mar. 18, 2008 (Now U.S. Pat. No. 7,676,624), which is a continuation of U.S. patent application Ser. No. 11/166,656, filed Jun. 24, 2005 (Now U.S. Pat. No. 7,376,779), which is a continuation of U.S. patent application Ser. No. 11/097,694, filed Mar. 31, 2005 (Now U.S. Pat. No. 7,363,415), which is a continuation of U.S. patent application Ser. No. 10/772,214, filed Feb. 3, 2004 (Now U.S. Pat. No. 7,099,981), which is a continuation of U.S. patent application Ser. No. 09/569,758, filed May 12, 2000 (Now U.S. Pat. No. 6,718,415), and which claimed priority to U.S. Provisional Patent Application No. 60/134,122, filed May 14, 1999. These applications are hereby incorporated by reference in their entirety.

BACKGROUND OF THE INVENTION

The present invention relates to computing devices. More particularly, the present invention provides a system including a plurality of computer modules that can independently operate to provide backup capability, dual processing, and the like. Merely by way of example, the present invention is applied to a modular computing environment for desk top computers, but it will be recognized that the invention has a much wider range of applicability. It can be applied to a server as well as other portable or modular computing applications.

Many desktop or personal computers, which are commonly termed PCs, have been around and used for over ten years. The PCs often come with state-of-art microprocessors such as the Intel Pentium™ microprocessor chips. They also include a hard or fixed disk drive such as memory in the giga-bit range. Additionally, the PCs often include a random access memory integrated circuit device such as a dynamic random access memory device, which is commonly termed DRAM. The DRAM devices now provide up to millions of memory cells (i.e., mega-bit) on a single slice of silicon. PCs also include a high resolution display such as cathode ray tubes or CRTs. In most cases, the CRTs are at least 15 inches or 17 inches or 20 inches in diameter. High resolution flat panel displays are also used with PCs.

Many external or peripheral devices can be used with the PCs. Among others, these peripheral devices include mass storage devices such as a Zip™ Drive product sold by Iomega Corporation of Utah. Other storage devices include external hard drives, tape drives, and others. Additional devices include communication devices such as a modem, which can be used to link the PC to a wide area network of computers such as the Internet. Furthermore, the PC can include output devices such as a printer and other output means. Moreover, the PC can include special audio output devices such as speakers the like.

PCs also have easy to use keyboards, mouse input devices, and the like. The keyboard is generally configured similar to a typewriter format. The keyboard also has the length and width for easily inputting information by way of keys to the computer. The mouse also has a sufficient size and shape to easily move a curser on the display from one location to another location.

Other types of computing devices include portable computing devices such as "laptop" computers and the like. Although somewhat successful, laptop computers have many limitations. These computing devices have poor display technology. In fact, these devices often have a smaller flat panel display that has poor viewing characteristics. Additionally, these devices also have poor input devices such as smaller keyboards and the like. Furthermore, these devices have limited common platforms to transfer information to and from these devices and other devices such as PCs.

Up to now, there has been little common ground between these platforms including the PCs and laptops in terms of upgrading, ease-of-use, cost, performance, and the like. Many differences between these platforms, probably somewhat intentional, have benefited computer manufacturers at the cost of consumers. A drawback to having two separate computers is that the user must often purchase both the desktop and laptop to have "total" computing power, where the desktop serves as a "regular" computer and the laptop serves as a "portable" computer. Purchasing both computers is often costly and runs "thousands" of dollars. The user also wastes a significant amount of time transferring software and data between the two types of computers. For example, the user must often couple the portable computer to a local area network (i.e., LAN), to a serial port with a modem, and then manually transfer over files and data between the desktop and the portable computer. Alternatively, the user often must use floppy disks to "zip" up files and programs that exceed the storage capacity of conventional floppy disks, and transfer the floppy disk data manually.

Another drawback with the current model of separate portable and desktop computer is that the user has to spend money to buy components and peripherals which are duplicated in at least one of these computers. For example, both the desktop and portable computers typically include hard disk drives, floppy drives, CD-ROMs, computer memory, host processors, graphics accelerators, and the like. Because program software and supporting programs generally must be installed upon both hard drives in order for the user to operate programs on the road and in the office, hard disk space is often wasted.

One approach to reduce some of these drawbacks has been the use of a docking station with a portable computer. Here, the user has the portable computer for "on the road" use and a docking station that houses the portable computer for office use.

Similar to separate desktop and portable computers, there is no commonality between two desktop computers. To date, most personal computers are constructed with a single motherboard that provides connection for CPU and other components in the computer. Dual CPU systems have been available through Intel's slot 1 architecture. For example, two Pentium II cartridges can be plugged into two "slot 1" card slots on a motherboard to form a Dual-processor system. The two CPU's share a common host bus that connects to the rest of the system, e.g. main memory, hard disk drive, graphics subsystem, and others. Dual CPU systems have the advantage of increased CPU performance for the whole system. Adding a CPU cartridge requires no change in operating systems and application software. However, dual CPU systems may suffer limited performance improvement if memory or disk drive bandwidth becomes the limiting factor. Also, dual CPU systems have to time-share the processing unit in running multiple applications. CPU performance improvement efficiency also depends on software coding structure. Dual CPU systems provide no hardware redundancy to help fault tolerance. In running multiple applications, memory and disk drive data throughput will become the limiting factor in improving performance with multi-processor systems.

The present invention generally relates to computer interfaces. More specifically, the present invention relates to an interface channel that interfaces two computer interface buses that operate under protocols that are different from that used by the interface channel.

Interfaces coupling two independent computer buses are well known in the art. A block diagram of a computer system utilizing such a prior art interface is shown in FIG. 5. In FIG. 5, a primary peripheral component interconnect (PCI) bus 505 of a notebook PC 500 is coupled to a secondary PCI bus 555 in a docking system 550 (also referred to as docking station 550) through high pin count connectors 501 and 502, which are normally mating connectors. The high pin count connectors 501 and 502 contain a sufficiently large number of pins so as to carry PCI bus signals between the two PCI buses without any translation. The main purpose for interfacing the two independent PCI buses is to allow transactions to occur between a master on one PCI bus and a target on the other PCI bus. The interface between these two independent PCI buses additionally includes an optional PCI to PCI bridge 560, located in the docking station 550, to expand the add on capability in docking station 550. The bridge 560 creates a new bus number for devices behind the bridge 560 so that they are not on the same bus number as other devices in the system thus increasing the add on capability in the docking station 550.

An interface such as that shown in FIG. 5 provides an adequate interface between the primary and secondary PCI buses. However, the interface is limited in a number of ways. The interface transfers signals between the primary and secondary PCI buses using the protocols of a PCI bus. Consequently, the interface is subject to the limitations under which PCI buses operate. One such limitation is the fact that PCI buses are not cable friendly. The cable friendliness of the interface was not a major concern in the prior art. However, in the context of the computer system of the present invention, which is described in the present inventor's (William W. Y. Chu's) application for "Personal Computer Peripheral Console With Attached Computer Module" filed concurrently with the present application on Sep. 8, 1998 and incorporated herein by reference, a cable friendly interface is desired for interfacing an attached computer module (ACM) and a peripheral console of the present invention. Furthermore, as a result of operating by PCI protocols, the prior art interface includes a very large number of signal channels with a corresponding large number of conductive lines (and a similarly large number of pins in the connectors of the interface) that are commensurate in number with the number of signal lines in the PCI buses which it interfaces. One disadvantage of an interface having a relatively large number of conductive lines and pins is that it costs more than one that uses a fewer number of conductive lines and pins. Additionally, an interface having a large number of conductive lines is bulkier and more cumbersome to handle. Finally, a relatively large number of signal channels in the interface renders the option of using differential voltage signals less viable because a differential voltage signal method would require duplicating a large number of signal lines. It is desirable to use a low voltage differential signal (LVDS) channel in the computer system of the present invention because an LVDS channel is more cable friendly, faster, consumes less power, and generates less noise, including electromagnetic interferences (EMI), than a PCI channel. The term LVDS is herein used to generically refer to low voltage differential signals and is not intended to be limited to any particular type of LVDS technology.

Thus, what is needed are computer systems that can have multiple computer modules. Each computer module has dedicated memory and disk drive, and can operate independently.

BRIEF SUMMARY OF THE INVENTION

According to the present invention, a technique including a method and device for multi-module computing is provided. In an exemplary embodiment, the present invention provides a system including a plurality of computer modules that can independently operate to provide backup capability, dual processing, and the like.

In a specific embodiment, the present invention provides a computer system for multi-processing purposes. The computer system has a console comprising a first coupling site and a second coupling site, e.g., computer module bay. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, and a mass storage device coupled to the processing unit. Each of the computer modules is substantially similar in design to each other to provide independent processing of each of the computer modules in the computer system.

In an alternative specific embodiment, the present invention provides a multi-processing computer system. The system has a console comprising a first coupling site and a second coupling site. Each coupling site comprises a connector. The console is an enclosure that is capable of housing each coupling site. The system also has a plurality of computer modules, where each of the computer modules is coupled to one of the connectors. Each of the computer modules has a processing unit, a main memory coupled to the processing unit, a graphics controller coupled to the processing unit, a mass storage device coupled to the processing unit, and a video output coupled to the processing unit. Each of the computer modules is substantially similar in design to each other to provide independent processing of each of the computer modules in the computer system. A video switch circuit is coupled to each of the computer modules through the video output. The video switch is configured to switch a video signal from any one of the computer modules to a display.

Numerous benefits are achieved using the present invention over previously existing techniques. In one embodiment, the invention provides improved processing and maintenance features. The invention can also provide increased CPU performance for the whole system. The invention also can be implemented without changes in operating system and application software. The present invention is also implemented using conventional technologies that can be provided in the present computer system in an easy and efficient manner.

In another embodiment, the invention provides at least two users to share the same modular desktop system. Each user operates on a different computer module. The other peripheral devices, i.e. CDROM, printer, DSL connection, etc. can be shared. This provides lower system cost, less desktop space and more efficiency. Depending upon the embodiment, one or more of these benefits can be available. These and other advantages or benefits are described throughout the present specification and are described more particularly below.

In still further embodiments, the present invention provides methods of using multiple computer modules.

The present invention encompasses an apparatus for bridging a first computer interface bus and a second computer interface bus. where each of the first and second computer interface buses have a number of parallel multiplexed address/data bus lines and operate at a clock speed in a predetermined clock speed range having a minimum clock speed and a maximum clock speed. The apparatus comprises an interface channel having a clock line and a plurality of bit lines for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.

In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.

The present invention overcomes the aforementioned disadvantages of the prior art by interfacing two PCI or PCI-like buses using a non-PCI or non-PCI-like channel. In the present invention, PCI control signals are encoded into control bits and the control bits, rather than the control signals that they represent, are transmitted on the interface channel. At the receiving end, the control bits representing control signals are decoded back into PCI control signals prior to being transmitted to the intended PCI bus.

The fact that control bits rather than control signals are transmitted on the interface channel allows using a smaller number of signal channels and a correspondingly small number of conductive lines in the interface channel than would otherwise be possible. This is because the control bits can be more easily multiplexed at one end of the interface channel and recovered at the other end than control signals. This relatively small number of signal channels used in the interface channel allows using LVDS channels for the interface. As mentioned above, an LVDS channel is more cable friendly, faster, consumes less power, and generates less noise than a PCI bus channel, which is used in the prior art to interface two PCI buses. Therefore, the present invention advantageously uses an LVDS channel for the hereto unused purpose of interfacing PCI or PCI-like buses. The relatively smaller number of signal channels in the interface also allows using connectors having smaller pins counts. As mentioned above an interface having a smaller number of signal channels and, therefore, a smaller number of conductive lines is less bulky and less expensive than one having a larger number of signal channels. Similarly, connectors having a smaller number of pins are also less expensive and less bulky than connectors having a larger number of pins.

In one embodiment, the present invention encompasses an apparatus for bridging a first computer interface bus and a second computer interface bus, in a microprocessor based computer system where each of the first and second computer interface buses have a number of parallel multiplexed address/data bus lines and operate at a clock speed in a predetermined clock speed range having a minimum clock speed and a maximum clock speed. The apparatus comprises an interface channel having a clock channel and a plurality of bit channels for transmitting bits; a first interface controller coupled to the first computer interface bus and to the interface channel to encode first control signals from the first computer interface bus into first control bits to be transmitted on the interface channel and to decode second control bits received from the interface channel into second control signals to be transmitted to the first computer interface bus; and a second interface controller coupled to the interface channel and the second computer interface bus to decode the first control bits from the interface channel into third control signals to be transmitted on the second computer interface bus and to encode fourth control signals from the second computer interface bus into the second control bits to be transmitted on the interface channel.

In one embodiment, the first and second interface controllers comprise a host interface controller (HIC) and a peripheral interface controller (PIC), respectively, the first and second computer interface buses comprise a primary PCI and a secondary PCI bus, respectively, and the interface channel comprises an LVDS channel.

In a preferred embodiment, the interface channel has a plurality of serial bit channels numbering fewer than the number of parallel bus lines in each of the PCI buses and operates at a clock speed higher than the clock speed at which any of the bus lines operates. More specifically, the interface channel includes two sets of unidirectional serial bit channels which transmit data in opposite directions such that one set of bit channels transmits serial bits from the HIC to the PIC while the other set transmits serial bits from the PIC to the HIC. For each cycle of the PCI clock, each bit channel of the interface channel transmits a packet of serial bits.

The HIC and PIC each include a bus controller to interface with the first and second computer interface buses, respectively, and to manage transactions that occur therewith. The HIC and PIC also include a translator coupled to the bus controller to encode control signals from the first and second computer interface buses, respectively, into control bits and to decode control bits from the interface channel into control signals. Additionally, the HIC and PIC each include a transmitter and a receiver coupled to the translator. The transmitter converts parallel bits into serial bits and transmits the serial bits to the interface channel. The receiver receives serial bits from the interface channel and converts them into parallel bits.

According to the present invention, a technique including a method and device for securing a computer module using a password in a computer system is provided. In an exemplary embodiment, the present invention provides a security system for an attached computer module ("ACM"). In an embodiment, the ACM inserts into a Computer Module Bay (CMB) within a peripheral console to form a functional computer.

In a specific embodiment, the present invention provides a computer module. The computer module has an enclosure that is insertable into a console. The module also has a central processing unit (i.e., integrated circuit chip) in the enclosure. The module has a hard disk drive in the enclosure, where the hard disk drive is coupled to the central processing unit. The module further has a programmable memory device in the enclosure, where the programmable memory device can be configurable to store a password for preventing a possibility of unauthorized use of the hard disk drive and/or other module elements. The stored password can be any suitable key strokes that a user can change from time to time. In a further embodiment, the present invention provides a permanent password or user identification code stored in flash memory, which also can be in the processing unit, or other integrated circuit element. The permanent password or user identification code is designed to provide a permanent "finger print" on the attached computer module.

In a specific embodiment, the present invention provides a variety of methods. In one embodiment, the present invention provides a method for operating a computer system such as a modular computer system and others. The method includes inserting an attached computer module ("ACM") into a bay of a modular computer system. The ACM has a microprocessor unit (e.g., microcontroller, microprocessor) coupled to a mass memory storage device (e.g., hard disk). The method also includes applying power to the computer system and the ACM to execute a security program, which is stored in the mass memory storage device. The method also includes prompting for a user password from a user on a display (e.g., flat panel, CRT). In a further embodiment, the present method includes a step of reading a permanent password or user identification code stored in flash memory, or other integrated circuit element. The permanent password or user identification code provides a permanent finger print on the attached computer module. The present invention includes a variety of these methods that can be implemented in computer codes, for example, as well as hardware.

Numerous benefits are achieved using the present invention over previously existing techniques. The present invention provides mechanical and electrical security systems to prevent theft or unauthorized use of the computer system in a specific embodiment. Additionally, the present invention substantially prevents accidental removal of the ACM from the console. In some embodiments, the present invention prevents illegal or unauthorized use during transit. The present invention is also implemented using conventional technologies that can be provided in the present computer system in an easy and efficient manner. Depending upon the embodiment, one or more of these benefits can be available. These and other advantages or benefits are described throughout the present specification and are described more particularly below.

These and other embodiments of the present invention, as well as its advantages and features, are described in more detail in conjunction with the text below and attached Figs.

BRIEF DESCRIPTION OF THE DRAWINGS

In an implementation with South Bridge in Peripheral Console.

FIG. 12 is a table showing the symbols, signals, data rate and description of signals in a first embodiment of the XPBus.

FIG. 13 is a table showing the information transmitted on the XPBus during two clock cycles of the XPBus in one embodiment of the present invention where 10 data bits transmitted in each clock cycle of the XPBus.

FIG. 14 is a table showing information transmitted on the XPBus during four clock cycles of the XPBus in another embodiment of the present invention where 10 data bits are transmitted in each clock cycle of the XPBus.

FIG. 16 is a table showing the names, types, number of pins dedicated to, and the description of the primary bus PCI signals.

FIGS. 25 and 26 are tables including the pin number, symbol, signal, standard and description for the pins on the peripheral and video connectors, respectively.

FIG. 27 is a table showing different types of first nibbles and their corresponding data packet types.

DETAILED DESCRIPTION OF THE INVENTION

According to the present invention, a technique including a method and device for multi-module computing is provided. In an exemplary embodiment, the present invention provides a system including a plurality of computer modules that can independently operate to provide backup capability, dual processing, and the like.

Figure 1:
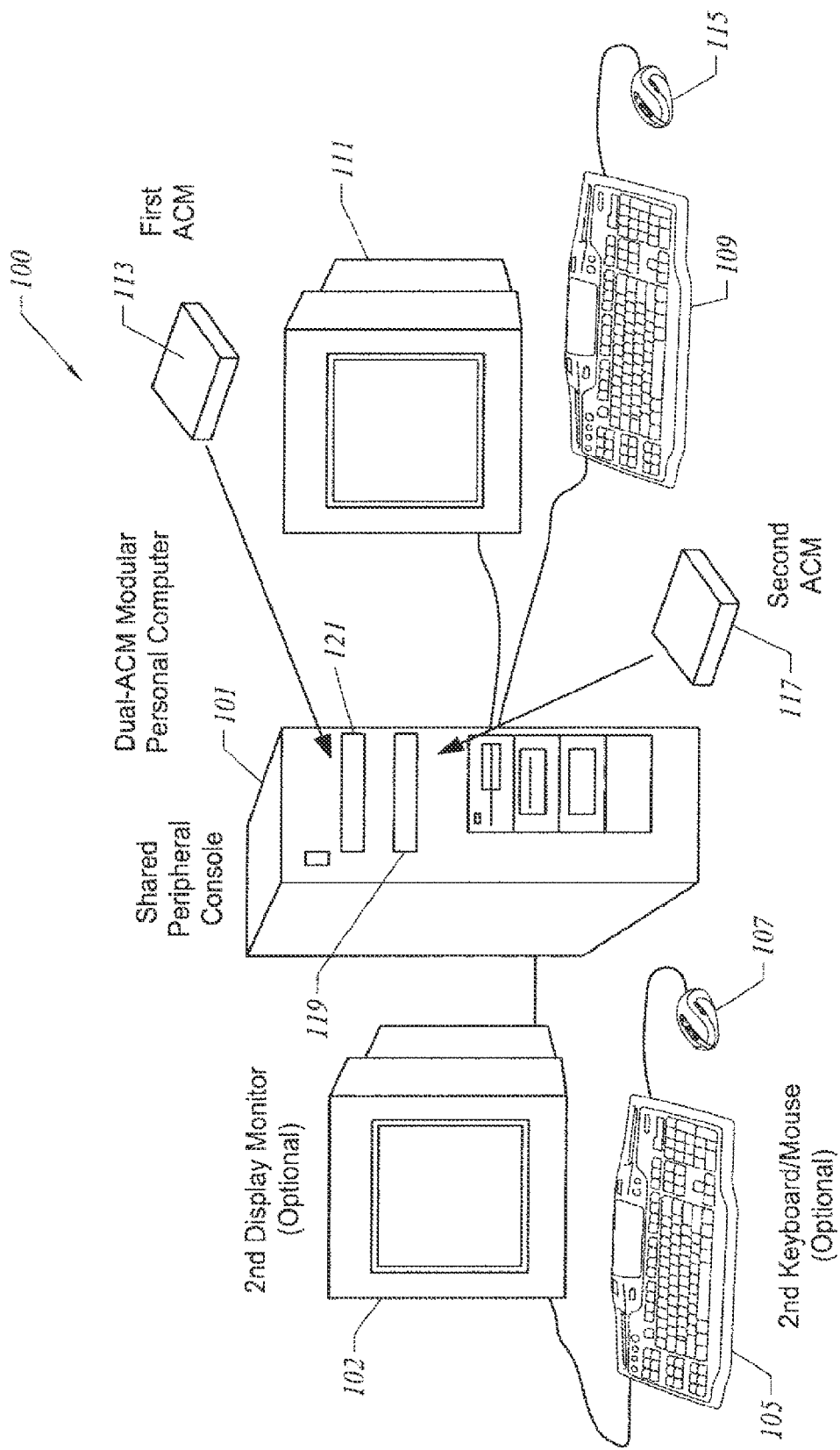
FIG. 1 is a simplified diagram of a computer system according to an embodiment of the present invention.

FIG. 1 is a simplified diagram of a computer system 100 according to an embodiment of the present invention. This diagram is merely an illustration and should not limit the scope of the claims herein. One of ordinary skill in the art would recognize other variations, modifications, and alternatives. The computer system 100 includes an attached computer module (i.e., ACM) 113, a desktop console 101, among other elements. The computer system also has another ACM module 117. Each ACM module has a respective slot 121, 119, which mechanically houses and electrically couples each ACM to the computer console. Also shown is a display 111, which connects to the console. Additionally, keyboard 109 and mouse 115 are also shown. A second display 102, keyboard 105, and mouse 107 can be coupled to the console in some optional embodiments to allow more than one user to operate the computer system. The computer system is modular and has a variety of components that are removable. Some of these components (or modules) can be used in different computers, workstations, computerized television sets, and portable or laptop units.

In the present embodiment, each ACM 113 includes computer components as will be described below, including a central processing unit ("CPU"). IDE controller, hard disk drive, computer memory, and the like. The computer module bay (i.e., CMB) 121 is an opening or slot in the desktop console. The CMB houses the ACM and provides communication to and from the ACM. The CMB also provides mechanical protection and support to the ACM. The CMB has a mechanical alignment mechanism for mating a portion of the ACM to the console. The CMB further has thermal heat dissipation sinks, electrical connection mechanisms, and the like. Some details of the ACM can be found in co-pending patent application Ser. Nos. 09/149,882 and 09/149,548 filed Sep. 8, 1998, commonly assigned, and hereby incorporated by reference for all purposes.

In a specific embodiment, the present multiple computer module system has a peripheral console that has two or more computer bays that can receive a removable computer module or ACM. Multiple computer module system can function as a personal computer with only one ACM and the peripheral console. The second and additional ACM can be added later to increase overall system performance and reliability. The ACM operates independently as self-contained computer, communicates with each other through a high-speed serial communication and share most peripheral devices within the peripheral console. Each ACM controls its independent graphics subsystem and drives separate video output signals. A practical implementation is a dual ACM system. In a dual ACM system, two monitors can be used to display the two ACMs' graphics outputs at the same time. For a single monitor, a RGB switch is used to switch between the video outputs of the two ACMs and can be controlled by a command from the user. Similarly, input devices (i.e. keyboard and mouse) are switched between the two computer systems with a command from the user. Command from the user can be in the form of either a dedicated key on the keyboard or a special icon on the screen that the mouse can click on.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present system are described in more detail below. In a dual ACM system, the primary ACM can connect directly to the peripheral board in the peripheral console. The second ACM can connect either directly or indirectly to the peripheral board. For indirect connection, a receptacle board is added to allow a cable connection to the peripheral board. This is to facilitate the mechanical positioning of the second ACM inside the computer chassis. The receptacle board approach can even be used for the primary ACM if a high bandwidth peripheral bus, e.g. PCI Bus, is not connected from the primary ACM to the peripheral board.

The shared peripheral console has a chassis and a motherboard that connects the following devices:

1) Input means, e.g. keyboard and mouse,
2) Display means, e.g. RGB monitor,
3) Add-on means, e.g. PCI add-on slots,
4) Two Computer Module Bays (CMB) with connectors to two ACMs,
5) A serial communication Hub controller that interfaces to serial communication controller of both ACMs,
6) Shared storage subsystem, e.g. Floppy drive, CDROM drive, DVD drive, or 2nd Hard Drive,
7) Communication device, e.g. modem,
8) Power supply, and others.

The computer bay is an opening in the peripheral console that receives an ACM. CMB provides mechanical protection to ACM, mechanical alignment for connector mating, mechanical locking system to prevent theft and accidental removal, and connectors at the end of the opening for connecting to ACM. The interface bus between ACM and the peripheral console has a video bus, peripheral connections, serial communication connection, control signals and power connection. Video bus includes video output of graphics devices, i.e. analog RGB and control signals for monitor. Power connection supplies the power for ACM.

Figure 2:
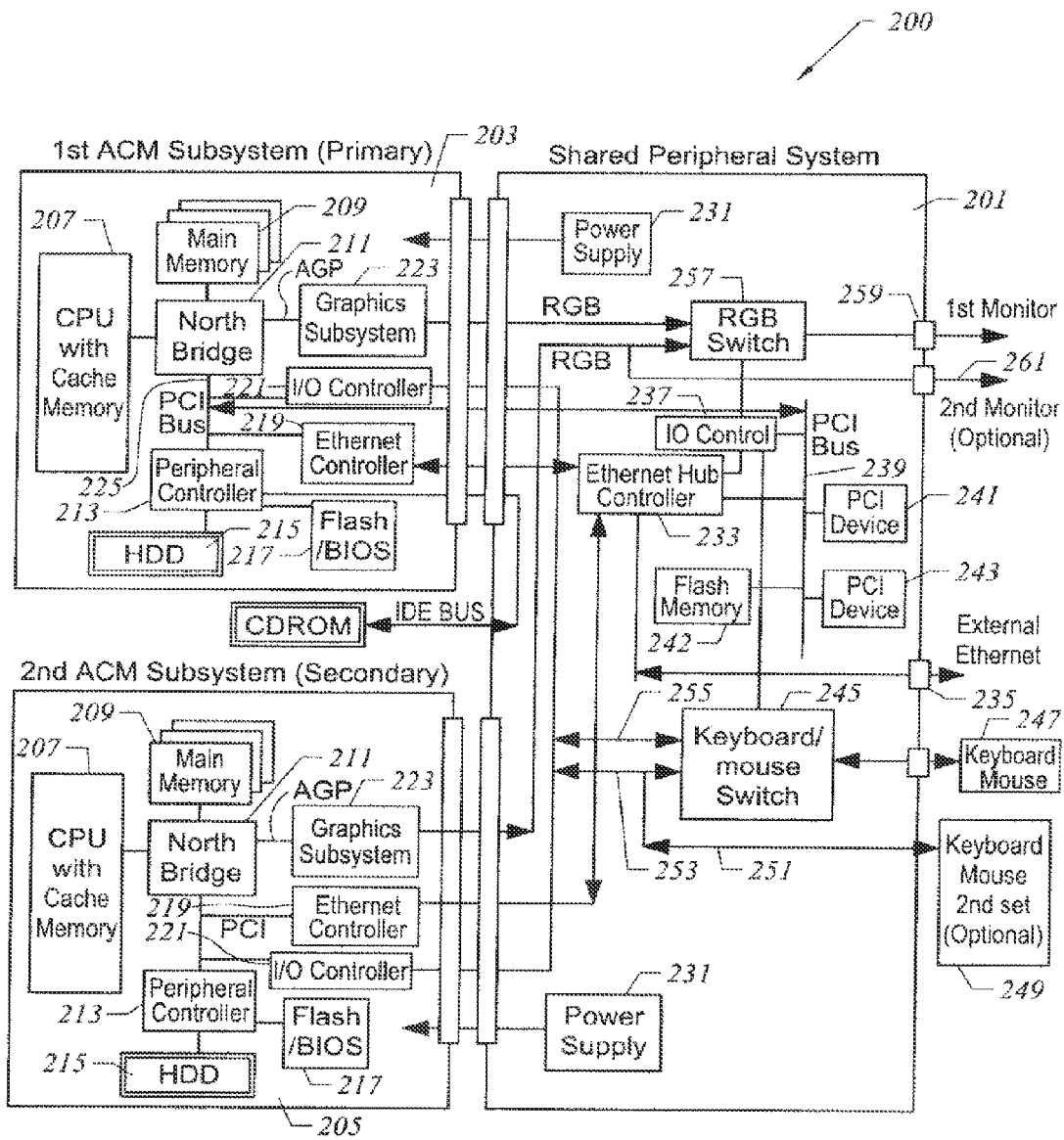
FIG. 2 is a simplified block diagram of a computer system according to an alternative embodiment of the present invention.

An implementation of peripheral sharing is the use of Ethernet controllers to bridge the communication between the two ACMs. Some of the peripheral devices residing in the peripheral console are shown in the simplified diagram of FIG. 2. As shown, the diagram is merely an illustration which should not limit the scope of the claims herein. One of ordinary skill in the art would recognize many other variations, alternatives, and modifications. As shown, a primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated; however, other form factors, such as PC card, and the like are also contemplated. Mass storage unit 240 may also support other interfaces than IDE.

Among other features, the computer system includes an ACM with security protection.

The ACM also has a network controller, which can be an Ethernet controller 219, which is coupled to the North Bridge through the PCI bus. The North Bridge is coupled to the CPU. The Ethernet controller can be a 10/100 Base, such as Intel's 82559 or the like. Other types of network connection devices can also be used. For example, the invention can use Gbit Ethernet 1394, and USB 2.0. The network controller couples to a hub 233 in the console, which includes shared peripheral system 201.

Also shown is the second ACM 205. The second ACM has the same or similar components as the first ACM. Here, like reference numerals have been used for easy cross-referencing, but is not intended to be limiting. In some embodiments, the secondary ACM is not connected to the PCI bus in the peripheral console directly. The secondary ACM 219 accesses peripheral devices controlled by the primary ACM through the Ethernet connection to the primary ACM, e.g. CD-ROM, or PCI modem. The implementation is not restricted to Ethernet serial communication and can use other high-speed serial communication such as USB 2.0, and 1394. The Ethernet hub is coupled to an external output port 235, which connects to an external network.

The primary hard disk drive in each ACM can be accessed by the other ACM as sharable hard drive through the Ethernet connection. This allows the easy sharing of files between the two independent computer modules. The Ethernet Hub Controller provides the high-speed communication function between the two computer modules. Ethernet data bandwidth of 100 Mbit/sec allows fast data communication between the two computer modules. The secondary ACM access peripheral devices of the primary ACM through the network connection provided by Ethernet link. The operating system, e.g. Windows98, provides the sharing of resources between the two ACMs. In some embodiments, critical data in one ACM can be backed up into the other ACM.

The Ethernet hub also couples to PCI bus 239, which connects to PCI devices 241, 243, e.g., modem, SCSI controller. A flash memory 242 can also be coupled to the PCI bus. The flash memory can store passwords and security information, such as those implementations described in U.S. Ser. No. 09/183,493, which is commonly owned, and hereby incorporated by reference. The hub 233 also couples to an I/O control 237, which connects to keyboard/mouse switch 245, which couples to keyboard/mouse 247. Optionally, the keyboard/mouse switch also couples to a second keyboard/house 259 via PS2 or USB signal line 251. The keyboard/mouse switch has at least a first state and a second state, which allow operation of respectively multiple keyboards or a single keyboard. The switch also couples to each I/O controller 221 in each ACM via lines 253, 255. The I/O control 237 also couples to an RGB switch 257, which allows video signals to pass to the first monitor 259. Alternatively, the RGB switch couples to a second monitor 261. The RGB switch includes analog video switches such as MAXIM's MAX4545.

The peripheral system 201 also has an independent power supply 231 for each ACM. Each power supply provides power to each ACM. As merely an example, the power supply is a MICRO ATX 150W made by ENLIGHT, but can be others. The power supply is connected or coupled to each ACM through a separate line, for example. The independent power supply allows for independent operation of each ACM in some embodiments.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 3:
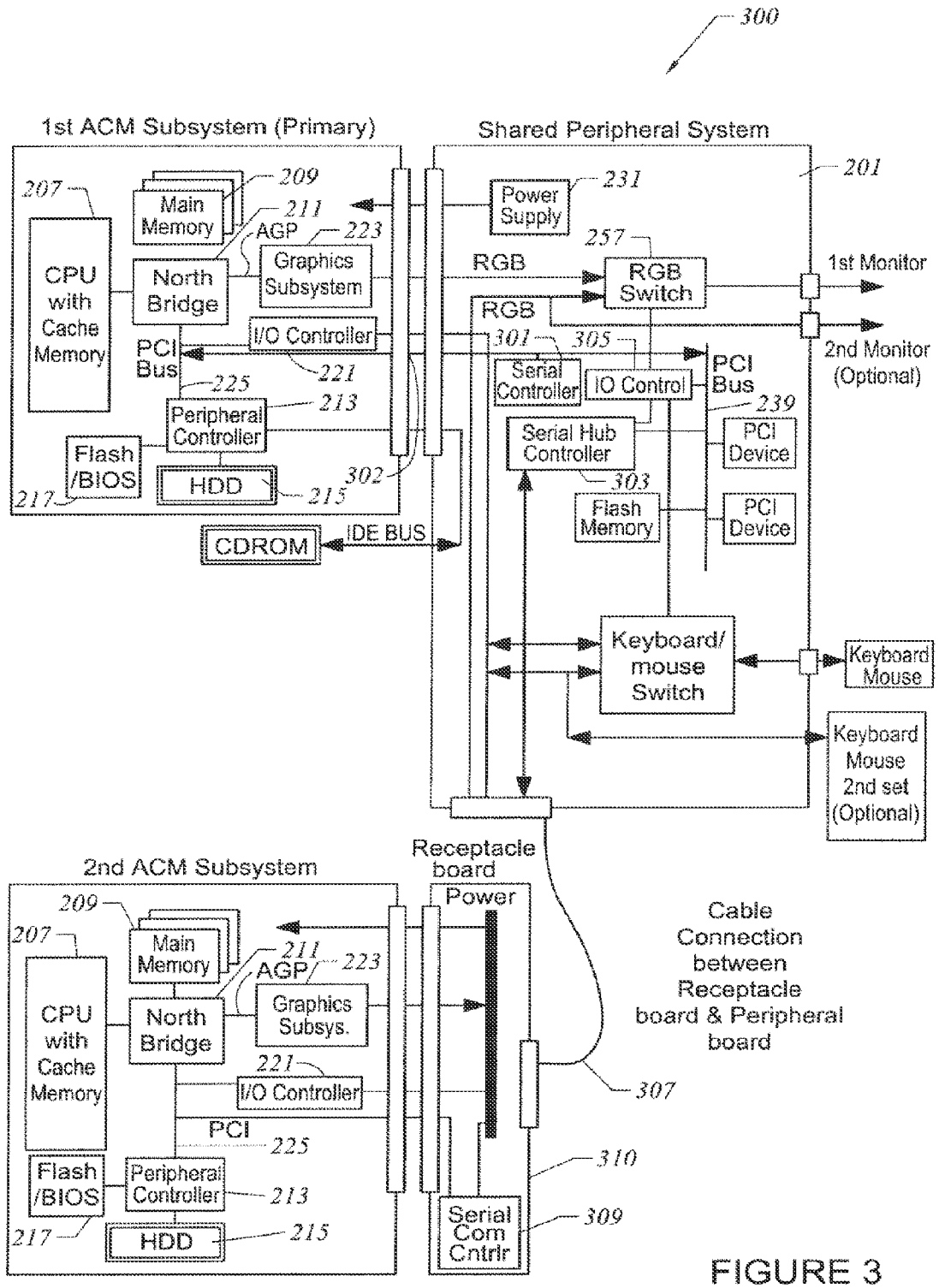
FIG. 3 is a simplified block diagram of a compeer system according to a further alternative embodiment of the present invention.

FIG. 3 is a simplified block diagram 300 of a computer system according to an alternative embodiment of the present invention. This diagram is merely an example which should not limit the scope of the claims herein. One of ordinary skill in the art would recognize many other variations, modifications, and alternatives. Like reference numerals are used in this Fig. as the previous Figs. for easy referencing, but are not intended to be limiting. As shown, each ACM includes common elements as the previous Fig. A primary ACM 203 is connected to PCI peripheral devices in the peripheral console through the PCI bus 225 that passes through the connection between primary ACM 203 and peripheral console 201. As shown, ACM has a CPU module 207 coupled to the PCI bus through a North Bridge 211.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, peripheral controller 213 is coupled to BIOS/flash memory 217. Additionally, the peripheral controller is coupled to a clock control logic, a configuration signal, and a peripheral bus. The ACM has the hard drive module 215. Among other elements, the ACM includes north bridge 215, graphics subsystem 223 (e.g., graphics accelerator, graphics memory), an IDE controller, and other components. Adjacent to and in parallel alignment with the hard drive module 215 is the PCI bus. In a specific embodiment, North Bridge unit 211 often couples to a computer memory 209, to the graphics subsystem, and to the peripheral controller via the PCI bus. Graphics subsystem typically couples to a graphics memory, and other elements. IDE controller generally supports and provides timing signals necessary for the IDE bus. In the present embodiment, the IDE controller is embodied as part of a P114XE controller from Intel, for example. Other types of buses than IDE are contemplated, for example EIDE, SCSI, 1394, and the like in alternative embodiments of the present invention.

The hard drive module or mass storage unit 215 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 215 includes a hard disk drive. The hard disk drive, however, can also be replaced by removable hard disk drives, read/write CD ROMs, flash memory, floppy disk drives, and the like. A small form factor, for example 2.5", is currently contemplated; however, other form factors, such as PC card, and the like are also contemplated. Mass storage unit 240 may also support other interfaces than IDE.

Among other features, the computer system includes an ACM with security protection.

The ACM also has a network controller, which can be coupled to a serial port 302, which is coupled to the PCI bus in the ACM. The serial port is coupled to the peripheral console through a serial controller 301 in the serial console. The serial controller is connected to PCI bus 239. The serial controller is also coupled to a serial hub controller 303, which is coupled to the PCI bus and a second ACM. In a specific embodiment, a receptacle board 310 is added to connect to the second ACM. The purpose of the receptacle board is to allow a cable connection 307 to the peripheral board 300. The cable connection is possible because the signals needed to connect to the peripheral board can be limited to video, I/O, serial communication, and power. The serial communication controller can be placed on the receptacle board and not in the ACM. As shown, the serial bus controller couples to the PCI bus. The receptacle board also couples to power, graphics subsystem, I/O controller, and other elements, which may be on a common bus. The overall operation of the present configuration is similar to the previous one except it operates in serial communication mode.

The Dual ACM system can support different usage models:
1. One user using both ACMs concurrently with 1 or 2 monitors, and a common keyboard/mouse.
2. Two users using the two separate ACMs at the same time with separate monitors and keyboard/mouse. The 2 users share peripherals, e.g., printer, CDROM, and others. The two users share external networking.

To support 1 monitor for both ACMs, a video switch in the peripheral console is used to switch between the video outputs of the two ACMs. The system can be set to support either 1 monitor or 2-monitor mode. The user presses a special key on the keyboard or a special icon on the screen to switch the screen display from one ACM to the other. This same action causes the keyboard and mouse connections to switch from one ACM to the other ACM.

A dual ACM system can save space, wiring, and cost for a 2-person PC setup, with the added benefit that both PC systems can be accessed from one user site for increased system performance if the other user is not using the system. Files can be copied between the primary drive of both system and provides protection against a single ACM failure. Software needs to be developed to manage the concurrent use of two PC subsystems, the automatic sharing of selected files between the two systems, and fault tolerance.

The design with more than two computer modules can be implemented with the use of multi-port, serial communication hub controller and multi-port I/O switches. In one embodiment, a peripheral console has four computer bays for four separate computer modules. The computer modules communicate through a four port Ethernet hub. The video, keyboard, and mouse switch will cycle through the connection from each computer module to the external monitor, keyboard, and mouse with a push button sequentially. This embodiment is useful for a server that performs different functions concurrently, e.g. email, application hosting, web hosting, firewall, etc.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the an would recognize other variations, modifications, and alternatives.

Figure 4:
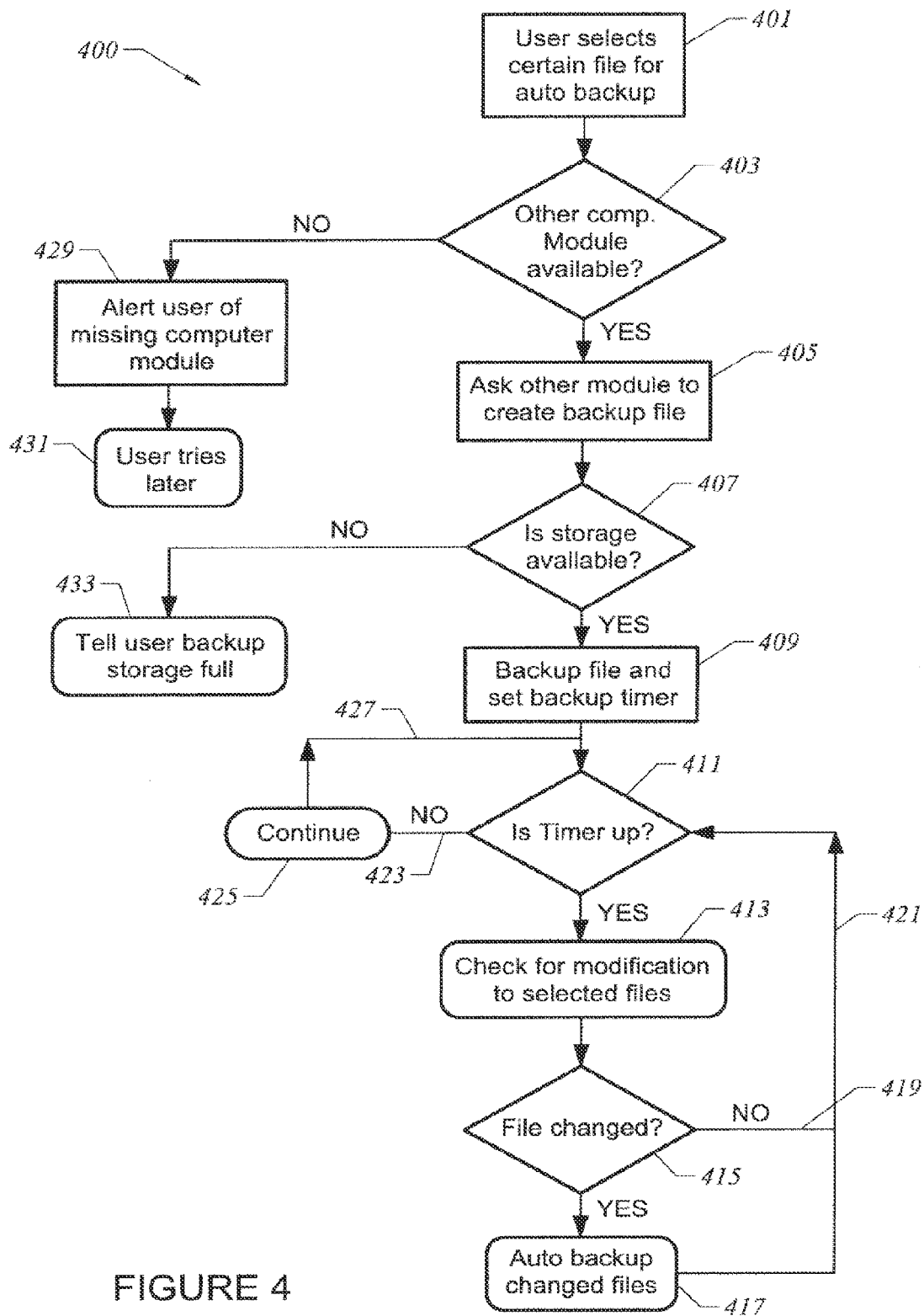
FIG. 4 is a simplified flow diagram of a method according to an embodiment of the present invention.
Figure 5:
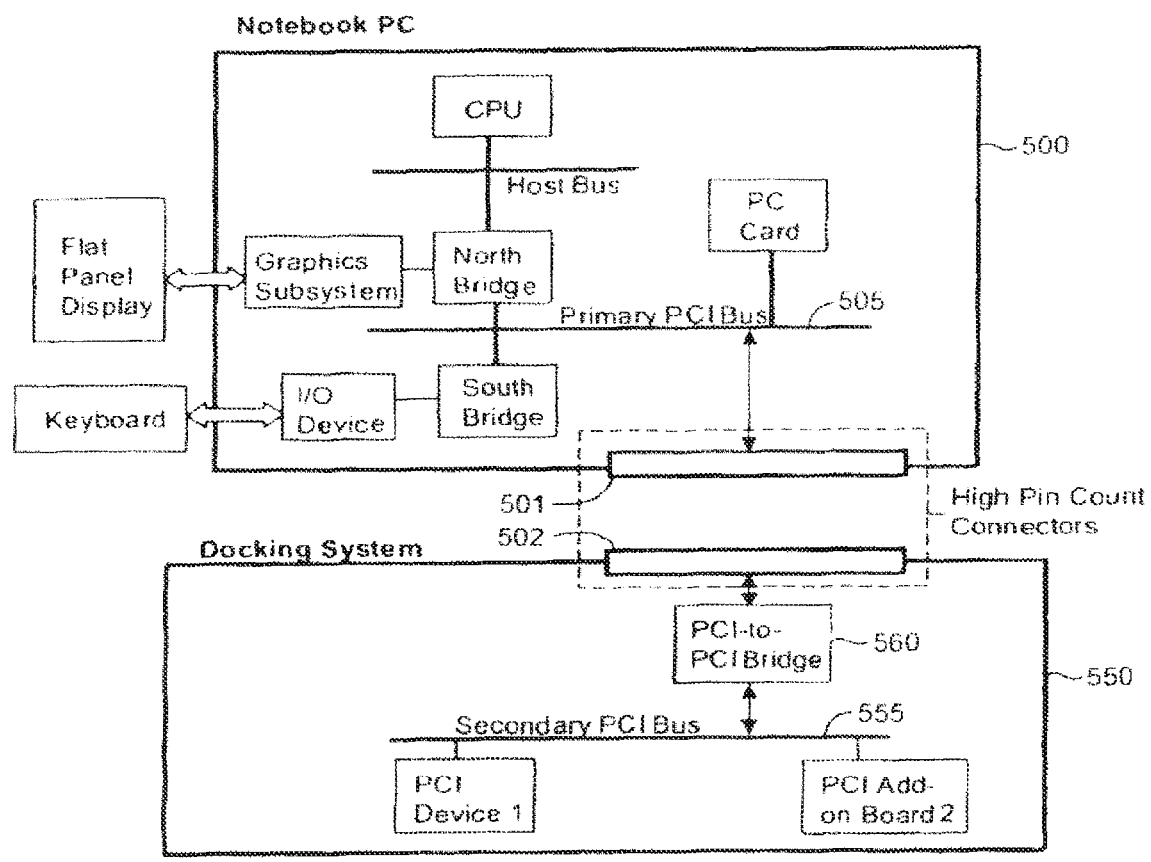
FIG. 5 is a block diagram of a computer system using a prior art interface between a primary and a secondary PCI bus.

FIG. 4 is a simplified diagram of a method according to an embodiment of the present invention. This diagram is merely an example which should not limit the scope of the claims herein. One of ordinary skill in the art would recognize many other variations, modifications, and alternatives. The present diagram illustrates an automatic file backup procedure from one computer module to the other. As shown, a user selects (step 401) a certain file in one of the computer module for automatic backup. Next, the method determines if another module is available, step 403. If so, the method in the originating module requests the other computer module to create (step 405) backup file. Alternatively, the method alerts the user of the missing or malfunctioning module, step 429. The method then has the user try later 431, once the missing or malfunctioning module has been replaced or repaired. Next, the method determines if there is sufficient storage available in the other computer module for the backup files. If so, the method goes to the next step. (Alternatively, the method prompts (step 433) a message to the user indicating that the storage is full.) In the next step, the method stores the backup file in memory of the other module. After the backup file has been successfully created (step 409), the software in the originating ACM sets a timer to check (step 411) for file modification via branches 423, 427 through continue, step 425 process. If a file selected for backup has been modified (step 415), then the file is automatically back up to the other ACM again, step 417. Alternatively, the method returns to step 411 through branch 421.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

Figure 6:
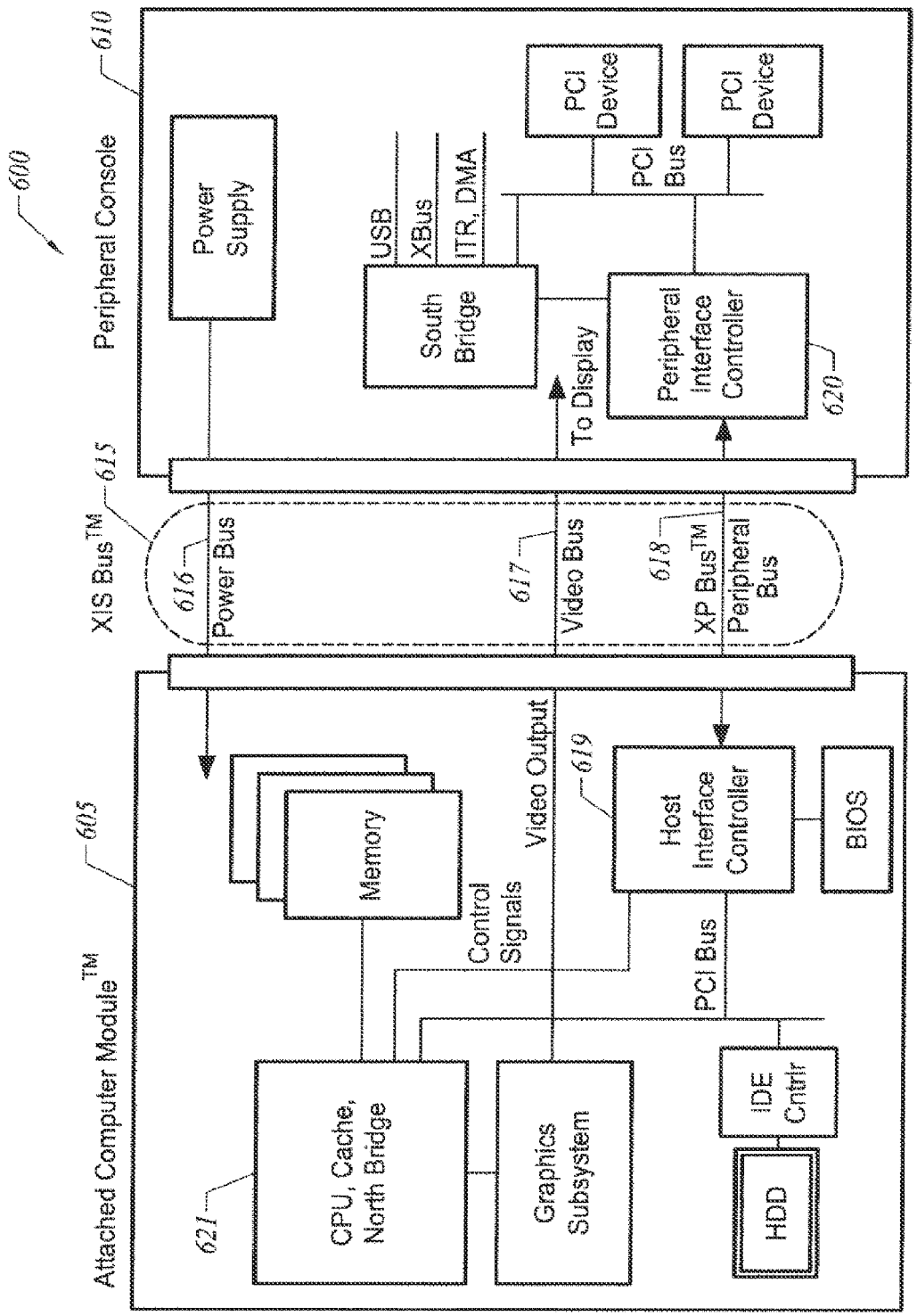
FIG. 6 is a block diagram of one embodiment of a computer system using the interface of the present invention.

FIG. 6 is a block diagram of one embodiment of a computer system 600 using the interface of the present invention. Computer system 600 includes an attached computer module (ACM) 605 and a peripheral console 610, which are described in greater detail in the application of William W. Y. Chu for "Personal Computer Peripheral Console With Attached Computer Module" filed concurrently with the present application on Sep. 8, 1998 and incorporated herein by reference. The ACM 605 and the peripheral console 610 are interfaced through an exchange interface system (XIS) bus 615. The XIS bus 615 includes power bus 616, video bus 617 and peripheral bus (XPBus) 618, which is also herein referred to as an interface channel. The power bus 616 transmits power between ACM 605 and peripheral console 610. In a preferred embodiment power bus 616 transmits power at voltage levels of 3.3 volts, 5 volts and 12 volts. Video bus 617 transmits video signals between the ACM 605 and the peripheral console 610. In a preferred embodiment, the video bus 617 transmits analog Red Green Blue (RGB) video signals for color monitors, digital video signals (such as Video Electronics Standards Association (VESA) Plug and Display's Transition Minimized Differential Signaling (TMDS) signals for flat panel displays), and television (TV) and/or super video (S-video) signals. The XPBus 618 is coupled to host interface controller (HIC) 619 and to peripheral interface controller (PIC) 620, which is also sometimes referred to as a bay interface controller.

Figure 7:
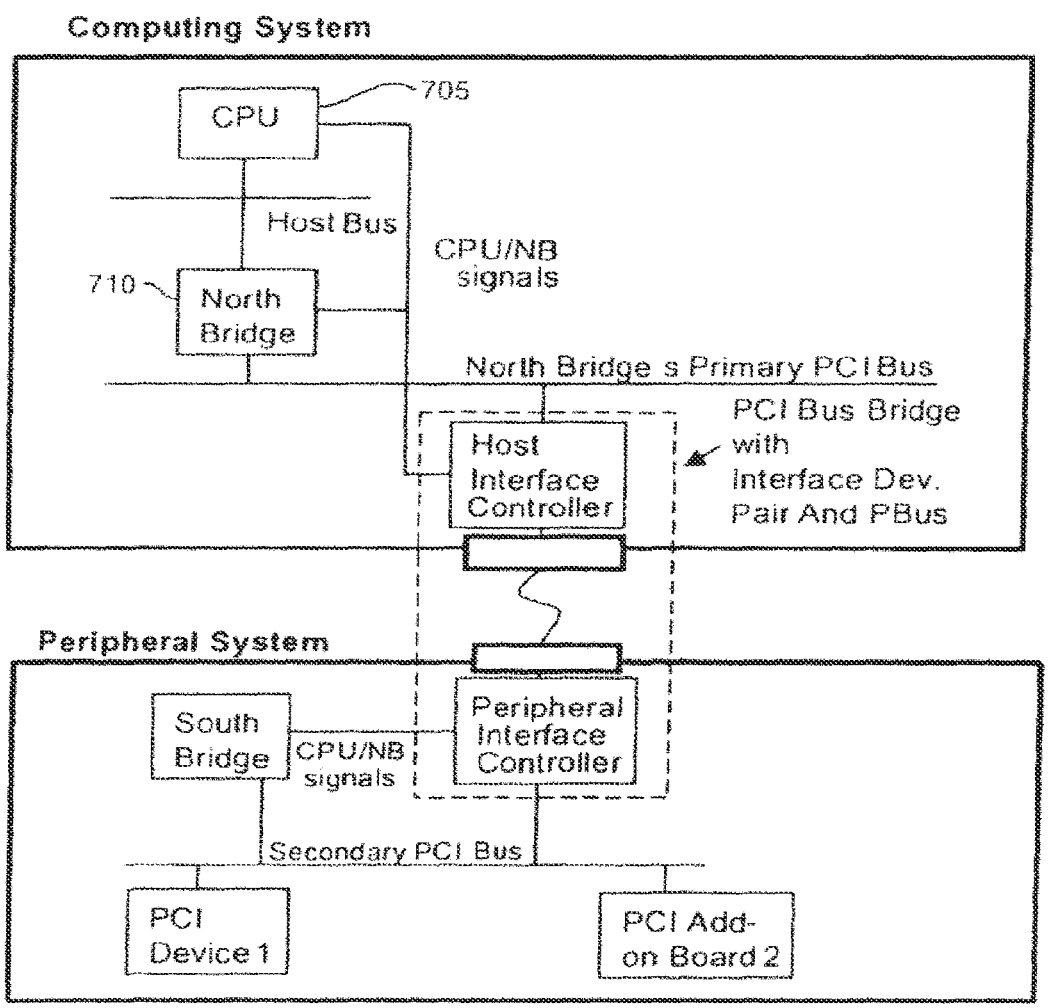
FIG. 7 is a partial block diagram of a computer system using the interface of the present invention as a bridge between the north and south bridges of the computer system.
Figure 8:
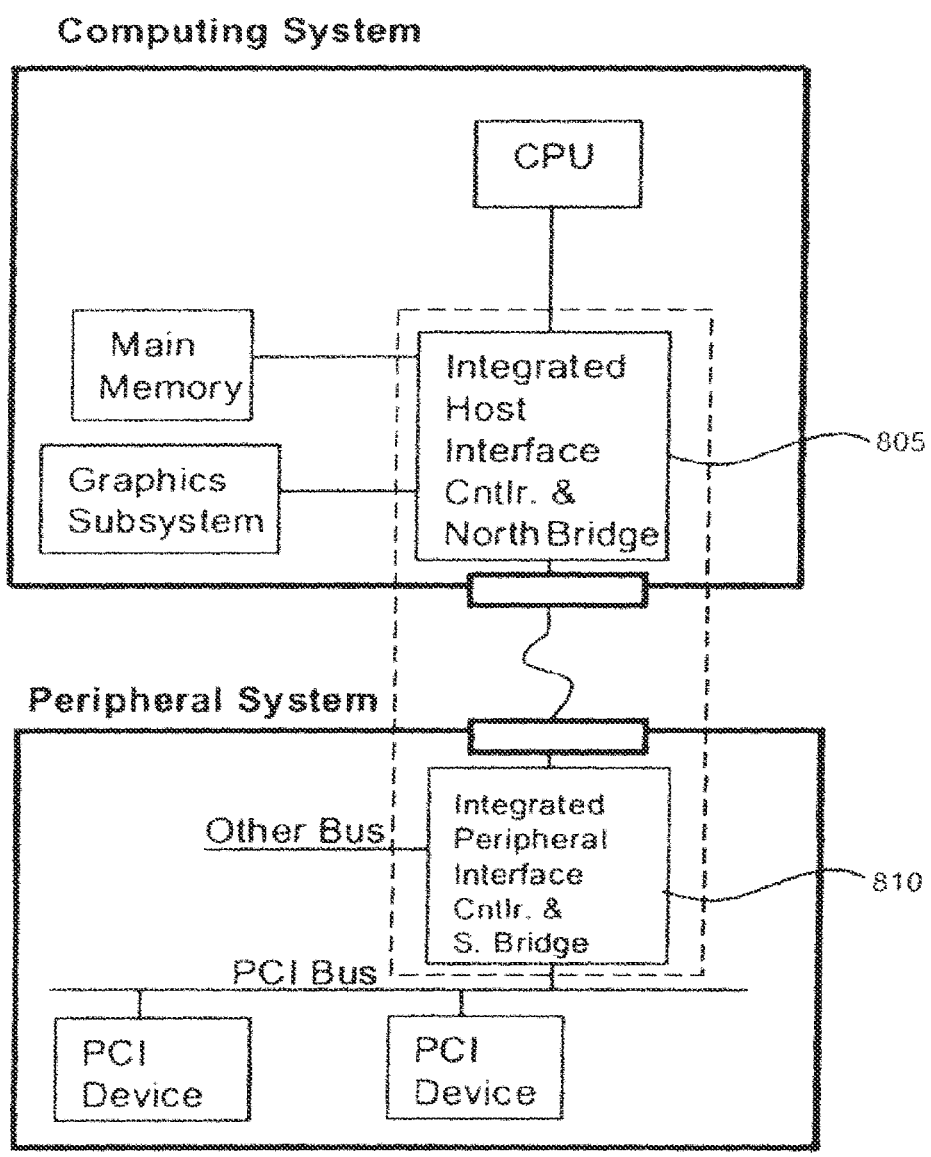
FIG. 8 is a partial block diagram of a computer system in which the north and south bridges are integrated with the host and peripheral interface controllers, respectively.
Figure 8A:
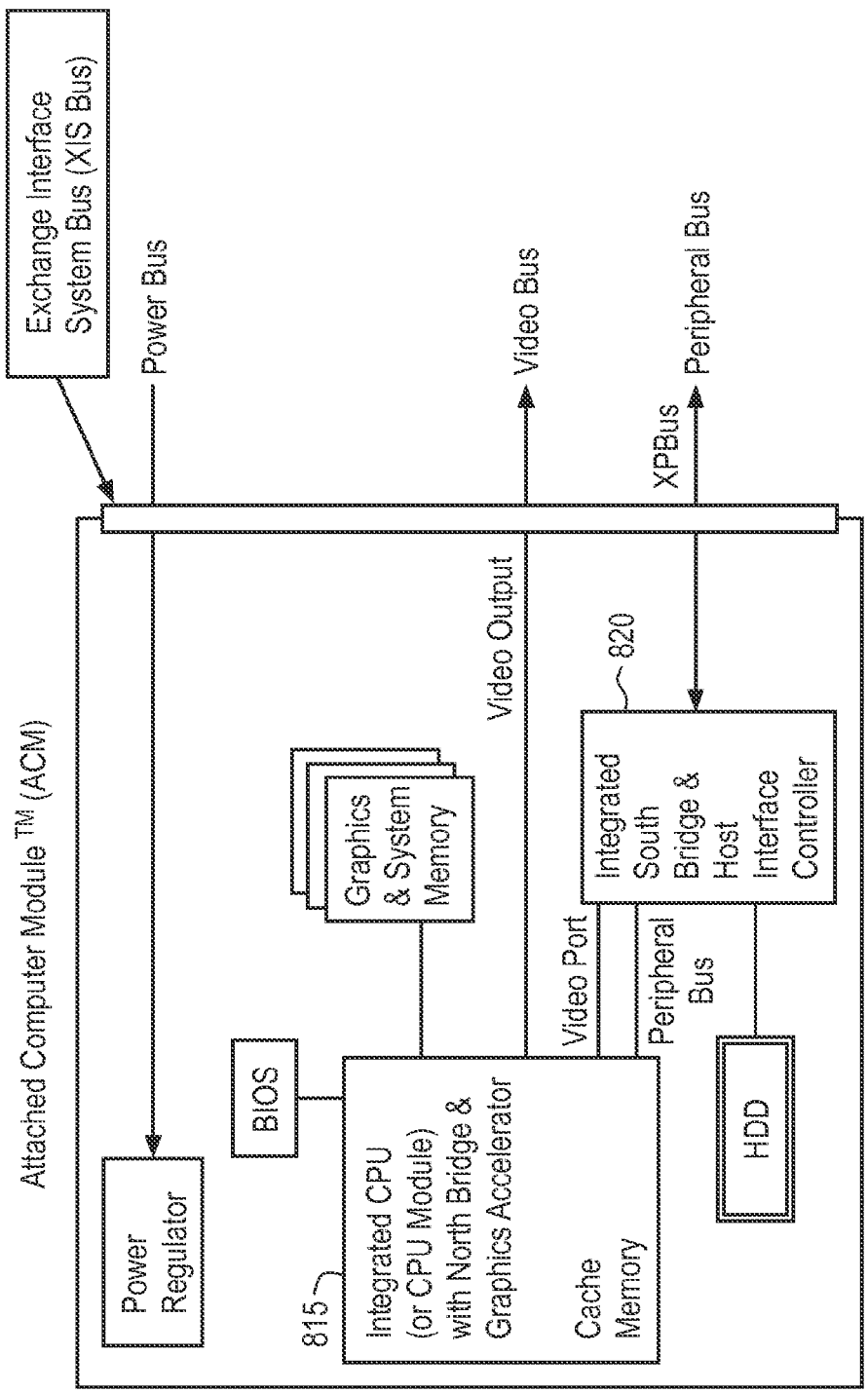
FIG. 8A shows an attached computer module with Integrated CPU/NB/Graphics and Integrated HIC/SB.
Figure 8B:
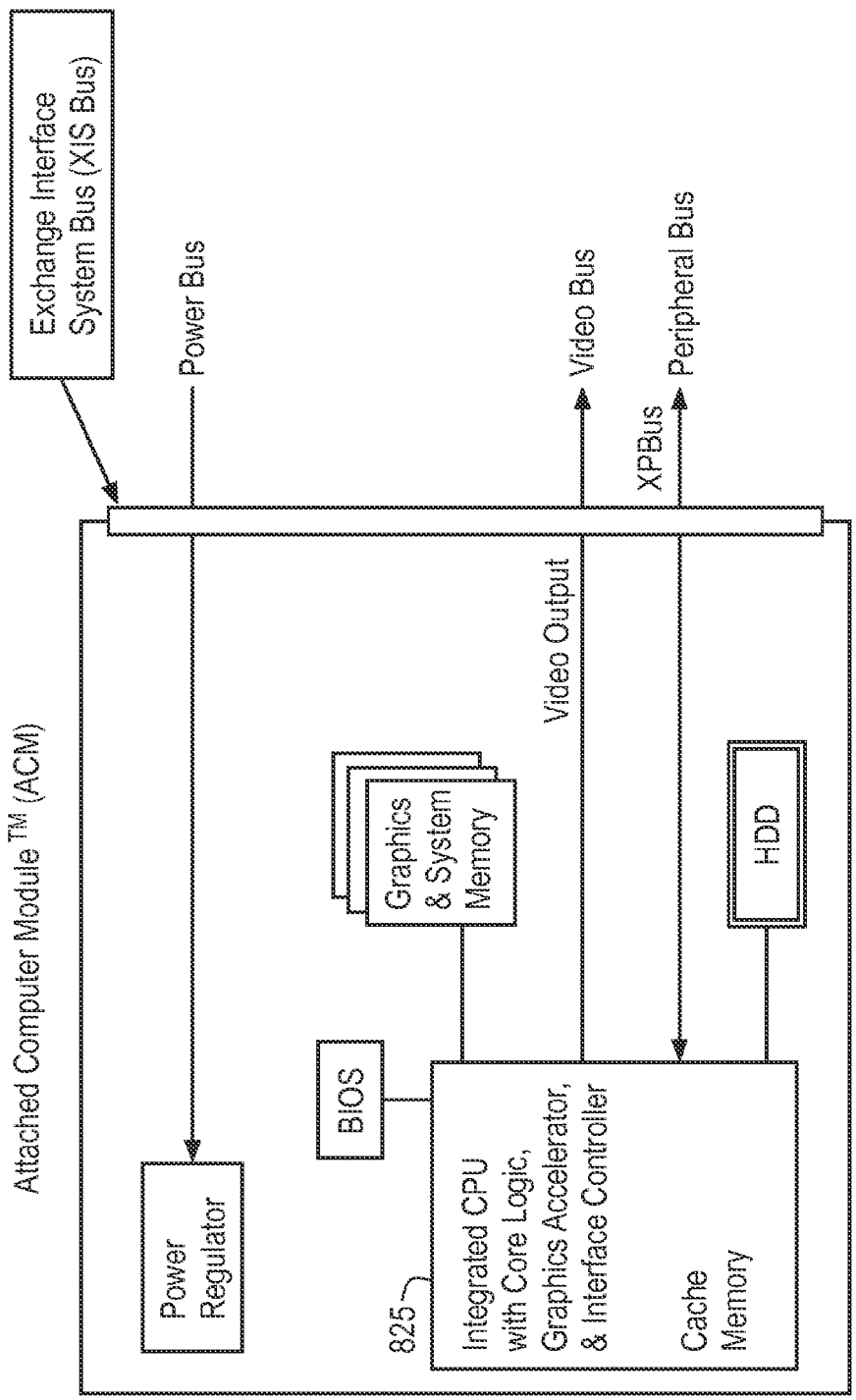
FIG. 8B shows an attached computer module with single chip fully integrated: CPU, Cache, Core Logic, Graphics controller and Interface controller.
Figure 8C:
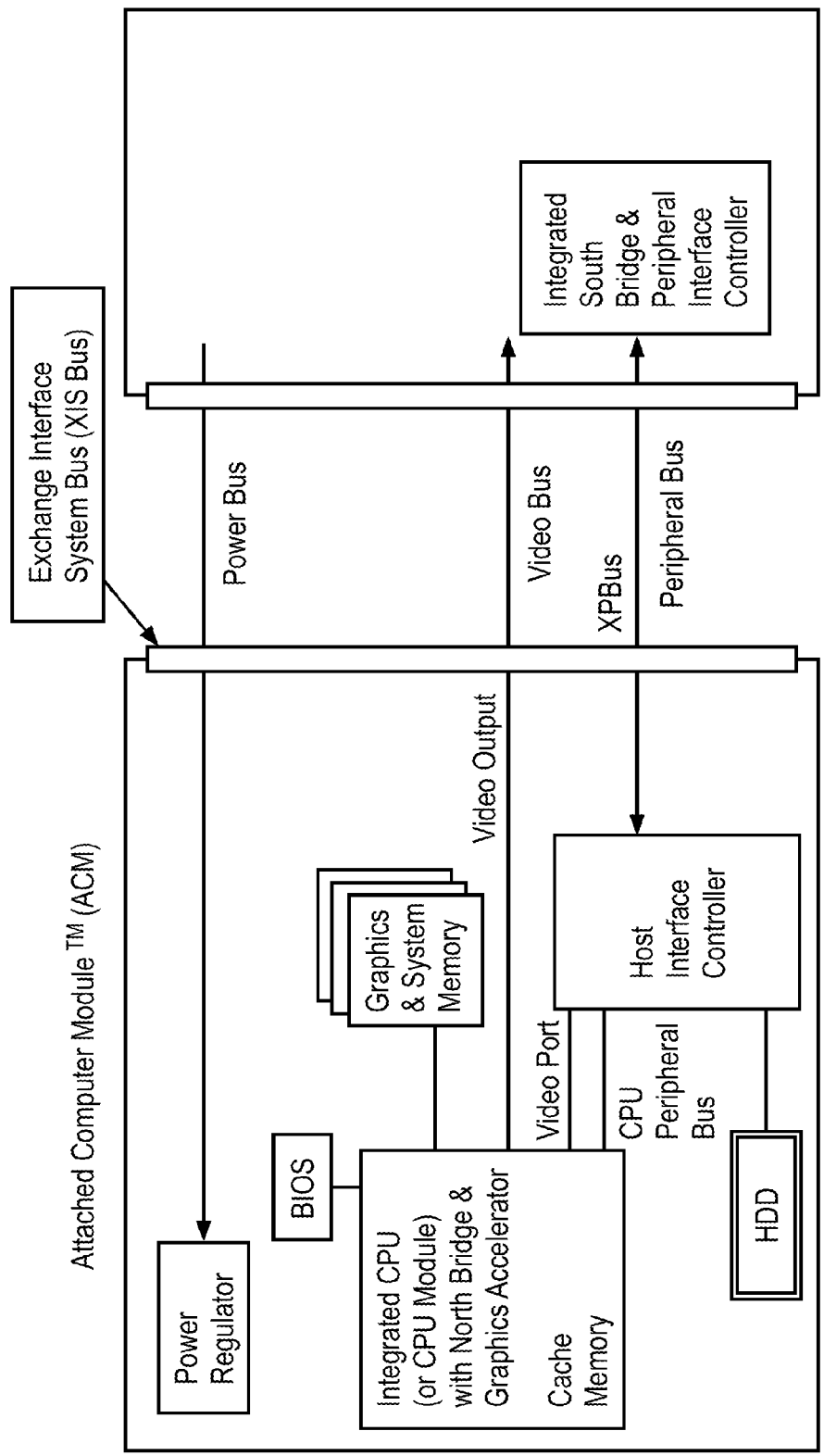
FIG. 8C shows an example of an attached computer module with Integrated CPU/North Bridge/Graphics and Peripheral Console with Integrated Peripheral Interface Controller and South Bridge.

In the embodiment shown in FIG. 6, HIC 619 is coupled to an integrated unit 621 that includes a CPU, a cache and a north bridge. In another embodiment, such as that shown in FIG. 7, the CPU 705 and north bridge 710 are separate rather than integrated units. In yet another embodiment, such as that shown in FIG. 8, the HIC and PIC are integrated with the north and south bridges, respectively, such that integrated HIC and north bridge unit 805 includes an HIC and a north bridge, while integrated PIC and south bridge unit 810 includes a PIC and a south bridge. FIG. 8A shows an attached computer module with integrated CPU/NB/Graphics 815 and Integrated HIC/SB820. FIG. 8B shows an attached computer module with single chip 825 fully integrated: CPU, Cache, Core Logic, Graphics controller and Interface controller. In an implementation with South Bridge in Peripheral Console, FIG. 8C shows an example of an attached computer module with Integrated CPU/North Bridge/Graphics and Peripheral Console with Integrated Peripheral Interface Controller and South Bridge.

Figure 9:
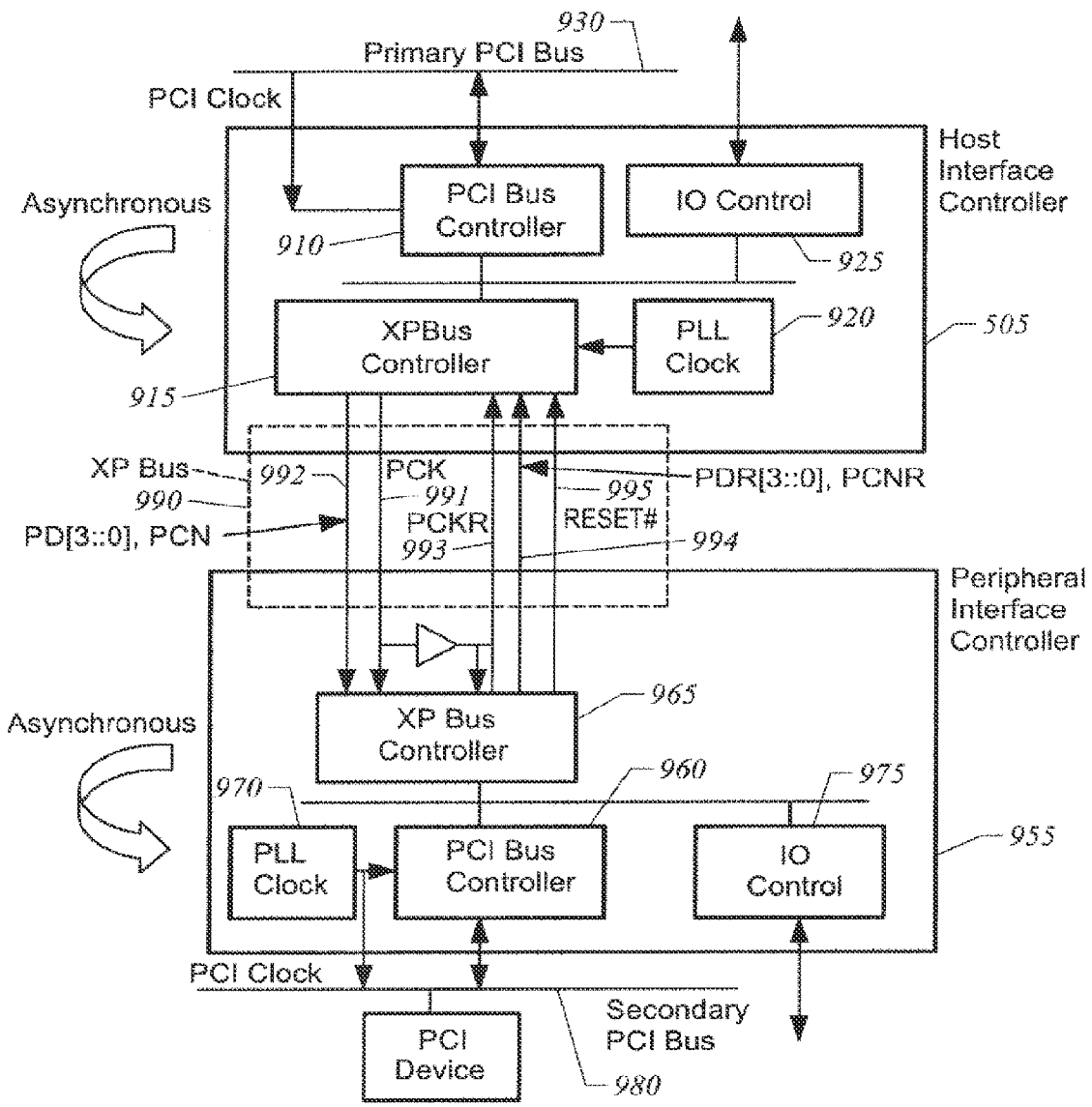
FIG. 9 is a block diagram of one embodiment of the host interface controller and the peripheral interface controller of the present invention.

FIG. 9 is a more detailed block diagram of one embodiment of an HIC 905 and a PIC 955 of the present invention. HIC 905 includes a peripheral component interconnect (PCI) bus controller 910, an XPBus controller 915, a phase lock loop (PLL) clock 920 and an input/output (IO) control 925. Similarly, PIC 955 includes a PCI bus controller 960, an XPBus controller 965, a PLL clock 970 and an IO control 975. PCI bus controllers 910 and 960 are coupled to the primary and secondary PCI buses 930 and 980, respectively, and manage PCI transactions on the primary and secondary PCI buses 930 and 980, respectively. Similarly, XPBus Controllers 915 and 965 are coupled to XPBus 990. XPBus controller 915 drives the PCK line 991 and PD[0::3] and PCN lines 992 while XPBus controller 965 drives the PCKR lines 993, the PDR [0::3] and PCNR lines 994 and the RESET# line 995.

PCI bus controller 910 receives PCI clock signals from the primary PCI bus 930 and is synchronized to the PCI clock. However, as indicated in FIG. 9, the XPBus controller 915 is asynchronous with the PCI bus controller 910. Instead, the XPBus controller receives a clock signal from the PLL clock 920 and is synchronized therewith. PLL clock 920 generates a clock signal independent of the PCI clock. The asynchronous operation of the PCI bus and the XPBus allows the PCI Bus to change in frequency. for example as in a power down situation, without directly affecting the XPBus clocking. In the embodiment shown in FIG. 9, the PLL clock 920 generates a clock signal having a frequency of 66 MHz, which is twice as large as the 33 MHz frequency of the PCI clock. (The clock signal generated by the PLL clock may have a clock speed different from, including lower than, 66 MHz. For example, in another embodiment, which is discussed in greater detail below, the PLL clock 920 generates a clock signal having a frequency of 132 MHz.)

The XPBus 990 operates at the clock speed generated by the PLL clock 920. Therefore, PCK, the clock signal from the XPBus controller 915 to XPBus controller 965 has the same frequency as the clock signal generated by PLL clock 920. XPBus controller 965 receives the PCK signal after it has been buffered and operates at the clock speed of PCK. The buffered version of the clock signal PCK is used to generate the clock signal PCKR, the clock signal form the XPBus controller 965 to XPBus controller 915. Accordingly, PCKR also has the same frequency as that generated by the PLL clock 920. The synchronous operation of PCK and PCKR provides for improved reliability in the system. In another embodiment, PCKR may be generated independently of PCK and may have a frequency different from that of PCK. It is to be noted that even when PCKR is generated from PCK, the slew between PCK and PCKR cannot be guaranteed because of the unknown cable length used for the XPBus. For a cable that is several feet long, the cable propagation delay alone can be several nano seconds.

As indicated in FIG. 9, PLL clock 970 is asynchronous with the XPBus controller 965. Instead, PLL clock 970 independently generates a clock signal that is used as a PCI clock signal on the secondary PCI bus 980. The secondary PCI bus 980 operates at the same clock speed as the primary PCI bus 930, namely at a frequency of 33 MHz.

Figure 10:
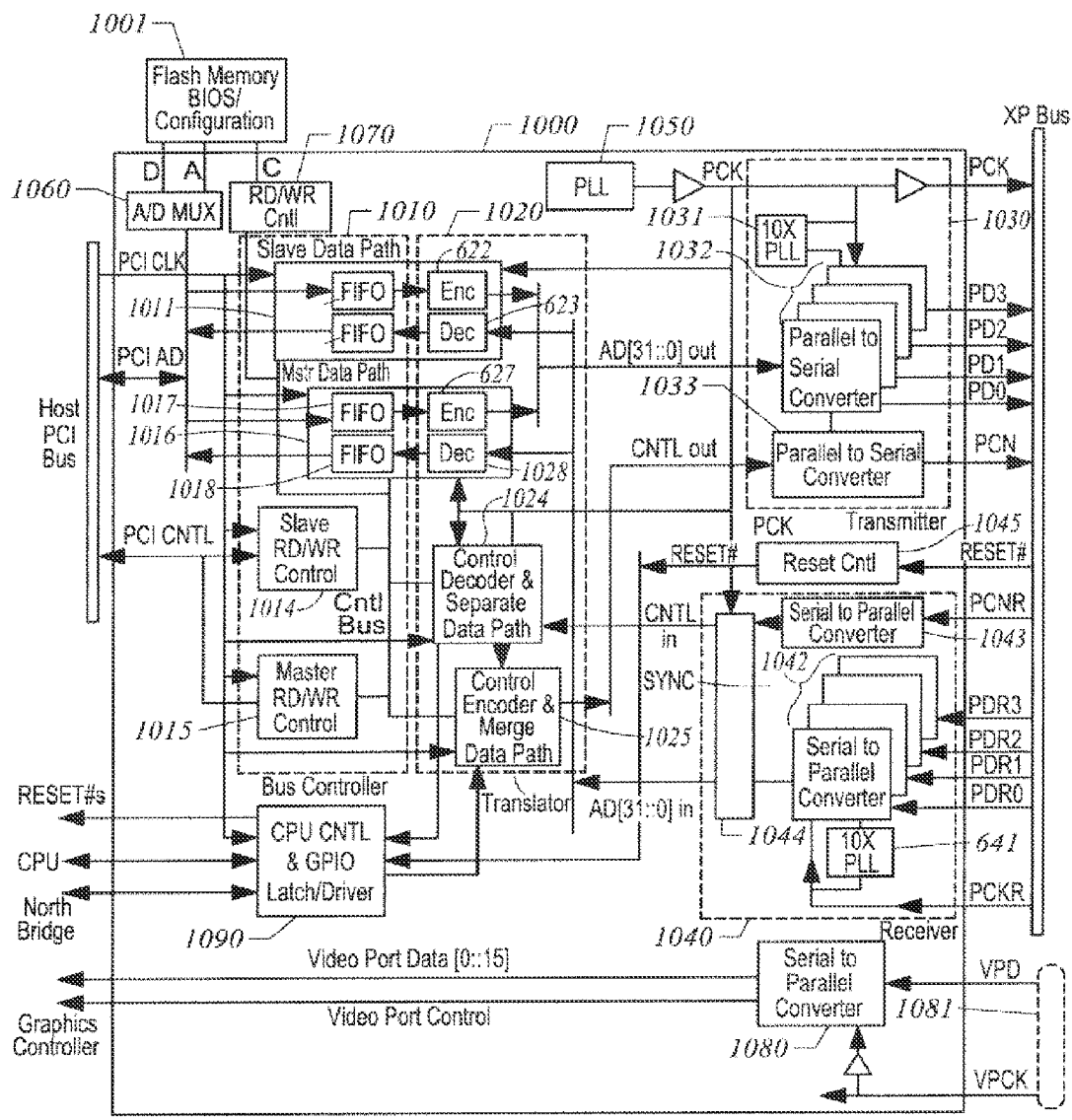
FIG. 10 is a detailed block diagram of one embodiment of the host interface controller of the present invention.

FIG. 10 is a detailed block diagram of one embodiment of the HIC of the present invention. As shown in FIG. 10, HIC 1000 comprises bus controller 1010, translator 1020, transmitter 1030, receiver 1040, a PLL 1050, an address/data multiplexer (A/D MUX) 1060, a read/write controller (RD/WR Cntl) 1070, a video serial to parallel converter 1080 and a CPU control & general purpose input/output latch/driver (CPU CNTL & GPIO latch/driver) 1090.

HIC 1000 is coupled to an optional flash memory BIOS configuration unit 1001. Flash memory unit 1001 stores basic input output system (BIOS) and PCI configuration information and supplies the BIOS and PCI configuration information to A/D MUX 1060 and RD/WR Control 1070, which control the programming, read, and write of flash memory unit 1001.

Bus controller 1010 is coupled to the host PCI bus which is also referred to herein as the primary PCI bus, and manages PCI bus transactions on the host PCI bus. Bus controller 1010 includes a slave (target) unit 1011 and a master unit 1016. Both slave unit 1011 and master unit 1016 each include two first in first out (FIFO) buffers, which are preferably asynchronous with respect to each other since the input and output of the two FIFOs in the master unit 1016 as well as the two FIFOs in the slave unit 1011 are clocked by different clocks, namely the PCI clock and the PCK. Additionally, slave unit 1011 includes encoder 1022 and decoder 1023, while master unit 1016 includes encoder 1027 and decoder 1028. The FIFOs 1012, 1013, 1017 and 1018 manage data transfers between the host PCI bus and the XPBus, which in the embodiment shown in FIG. 10 operate at 33 MHz and 106 MHz, respectively. PCI address/data (AD) from the host PCI bus is entered into FIFOs 1012 and 1017 before they are encoded by encoders 1022 and 1023. Encoders 1022 and 1023 format the PCI address/data bits to a form more suitable for parallel to serial conversion prior to transmittal on the XPBus. Similarly, address and data information from the receivers is decoded by decoders 1023 and 1028 to a form more suitable for transmission on the host PCI bus. Thereafter the decoded data and address information is passed through FIFOs 1013 and 1018 prior to being transferred to the host PCI bus. FIFOs 1012, 1013, 1017 and 1018, allow bus controller 1010 to handle posted and delayed PCI transactions and to provide deep buffering to store PCI transactions.

Bus controller 1010 also comprises slave read/write control (RD/WR Cntl) 1014 and master read/write control (RD/WR Cntl) 1015. RD/WR controls 1014 and 1015 are involved in the transfer of PCI control signals between bus controller 1010 and the host PCI bus.

Bus controller 1010 is coupled to translator 1020. Translator 1020 comprises encoders 1022 and 1027, decoders 1023 and 1028, control decoder & separate data path unit 1024 and control encoder & merge data path unit 1025. As discussed above encoders 1022 and 1027 are part of slave data unit 1011 and master data unit 1016, respectively, receive PCI address and data information from FIFOs 1012 and 1017, respectively, and encode the PCI address and data information into a form more suitable for parallel to serial conversion prior to transmittal on the XPBus. Similarly, decoders 1023 and 1028 are part of slave data unit 1011 and master data unit 1016, respectively, and format address and data information from receiver 1040 into a form more suitable for transmission on the host PCI bus. Control encoder & merge data path unit 1025 receives PCI control signals from the slave RD/WR control 1014 and master RD/WR control 1015. Additionally, control encoder & merge data path unit 1025 receives control signals from CPU CNTL & GPIO latch/driver 1090, which is coupled to the CPU and north bridge (not shown in FIG. 10). Control encoder & merge data path unit 1025 encodes PCI control signals as well as CPU control signals and north bridge signals into control bits, merges these encoded control bits and transmits the merged control bits to transmitter 1030, which then transmits the control bits on the data lines PD0 to PD3 and control line PCN of the XPBus. Examples of control signals include PCI control signals and CPU control signals. A specific example of a control signal is FRAME# used in PCI buses. A control bit, on the other hand is a data bit that represents a control signal. Control decoder & separate data path unit 1024 receives control bits from receiver 1040 which receives control bits on data lines PDR0 to PDR3 and control line PCNR of the XPBus. Control decoder & separate data path unit 1024 separates the control bits it receives from receiver 1040 into PCI control signals, CPU control signals and north bridge signals, and decodes the control bits into PCI control signals, CPU control signals, and north bridge signals all of which meet the relevant timing constraints.

Transmitter 1030 receives multiplexed parallel address/data (AID) bits and control bits from translator 1020 on the AD[31::0] out and the CNTL out lines, respectively. Transmitter 1030 also receives a clock signal from PLL 1050. PLL 1050 takes a reference input clock and generates PCK that drives the XPBus. PCK is asynchronous with the PCI clock signal and operates at 106 MHz, twice the speed of the PCI clock of 33 MHz. The higher speed is intended to accommodate at least some possible increases in the operating speed of future PCI buses. As a result of the higher speed, the XPBus may be used to interface two PCI or PCI-like buses operating at 106 MHz rather than 33 MHz or having 104 rather than 32 multiplexed address/data lines.

The multiplexed parallel A/D bits and some control bits input to transmitter 1030 are serialized by parallel to serial converters 1032 of transmitter 1030 into 10 bit packets. These bit packets are then output on data lines PD0 to PD3 of the XPBus. Other control bits are serialized by parallel to serial converter 1033 into 10 bit packets and send out on control line PCN of the XPBus.

A 10× multiplier 1031 receives PCK, multiplies it by a factor of 10 and feeds a clock signal 10 times greater than PCK into the parallel to serial converters 1032 and 1033. The parallel to serial converters 1032 and 1033 perform bit shifting at 10 times the PCK rate to serialize the parallel bits into 10 bit packets. As the parallel to serial converters 1032 and 1033 shift bits at 10 times the PCK rate, the bit rate for the serial bits output by the parallel to serial converters is 10 times higher than PCK rate, i.e., 1060 MHz. However, the rate at which data packets are transmitted on the XPBus is the same as the PCK rate, i.e., 106 MHz. As the PCI buses operate at a clock and bit rate of 33 MHz, the XPBus has a clock rate that is twice as large and a bit rate per bit line (channel) that is 100 times as large as that of the PCI buses which it interfaces.

Receiver 1040 receives serial bit packets on data lines PDR0 to PDR3 and control line PCNR. Receiver 1040 also receives PCKR on the XPBus as well as the clock signal PCK from PLL 1050. The synchronizer (SYNC) 1044 of receiver 1040 synchronizes the clock signal PCKR to the locally generated clock signal, PCK, in order to capture the bits received from the XPBus into PCK clock timing.

Serial to parallel converters 1042 convert the serial bit packets received on lines PDR0 to PDR3 into parallel address/data and control bits that are sent to decoders 1023 and 1028 and control decoder and separate data path unit 1024, respectively. Serial to parallel converter 1043 receives control bit packets from control line PCNR, converts them to parallel control bits and sends the parallel control bits to control decoder & separate data path 1024.

A 10× multiplier 1041 receives PCKR, multiplies it by a factor of 10 and feeds a clock signal 10 times greater than PCKR into the serial to parallel converters 1042 and 1043. Because the bits on PDR0 to PDR3 and PCNR are transmitted at a bit rate of 10 times the PCKR rate, the serial to parallel converters 1042 and 1043 perform bit shifting at 10 times the PCKR rate to convert the 10 bit packets into parallel bits. It is to be noted that the rate at which bit packets are transmitted on the XPBus is the same as the PCKR rate, i.e., 106 MHz. The parallel data and control bits are thereafter sent to decoders 1023 and 1028 by way of the AD[3::0] in line and to control decoder & separate data path unit 1024 by way of CNTL in lines, respectively.

Reset control unit 1045 of HIC 1000 receives the signal RESET#, which is an independent system reset signal, on the reset line RESET#. Reset control unit 1045 then transmits the reset signal to the CPU CNTL & GPIO latch/driver unit 1090.

As may be noted from the above, the 32 line host and secondary PCI buses are interfaced by 10 XPBus lines (PD0, PD1, PD2, PD3, PCN, PDR0, PDR1, PDR2, PDR3, PCNR). Therefore, the interface channel, XPBus, of the present invention uses fewer lines than are contained in either of the buses which it interfaces, namely the PCI buses. XPBus is able to interface such PCI buses without backup delays because the XPBus operates at a clock rate and a per line (channel) bit rate that are higher than those of the PCI buses.

In addition to receiving a reset signal, the CPU CNTL & GPIO latch/driver 1090 is responsible for latching input signals from the CPU and north bridge and sending the signals to the translator. It also takes decoded signals from the control decoder & separate data path unit 1024 and drives the appropriate signals for the CPU and north bridge.

In the embodiment shown in FIG. 10, video serial to parallel converter 1080 is included in HIC 1000. In another embodiment, video serial to parallel converter 1080 may be a separate unit from the HIC 1000. Video serial to parallel converter 1080 receives serial video data on line VPD and a video clock signal VPCK from line VPCK of video bus 1081. It then converts the serial video data into 16 bit parallel video port data and the appropriate video port control signals, which it transmits to the graphics controller (not shown in FIG. 10) on the video port data [0::15] and video port control lines, respectively.

HIC 1000 handles the PCI bus control signals and control bits from the XPBus representing PCI control signals in the following ways:

1. HIC 1000 buffers clocked control signals from the host PCI bus, encodes them into control bits and sends the encoded control bits to the XPBus;
2. HIC 1000 manages the signal locally; and
3. HIC 1000 receives control bits from XPBus, translates the control bits into PCI control signals and sends the PCI control signals to the host PCI bus.

Figure 11:
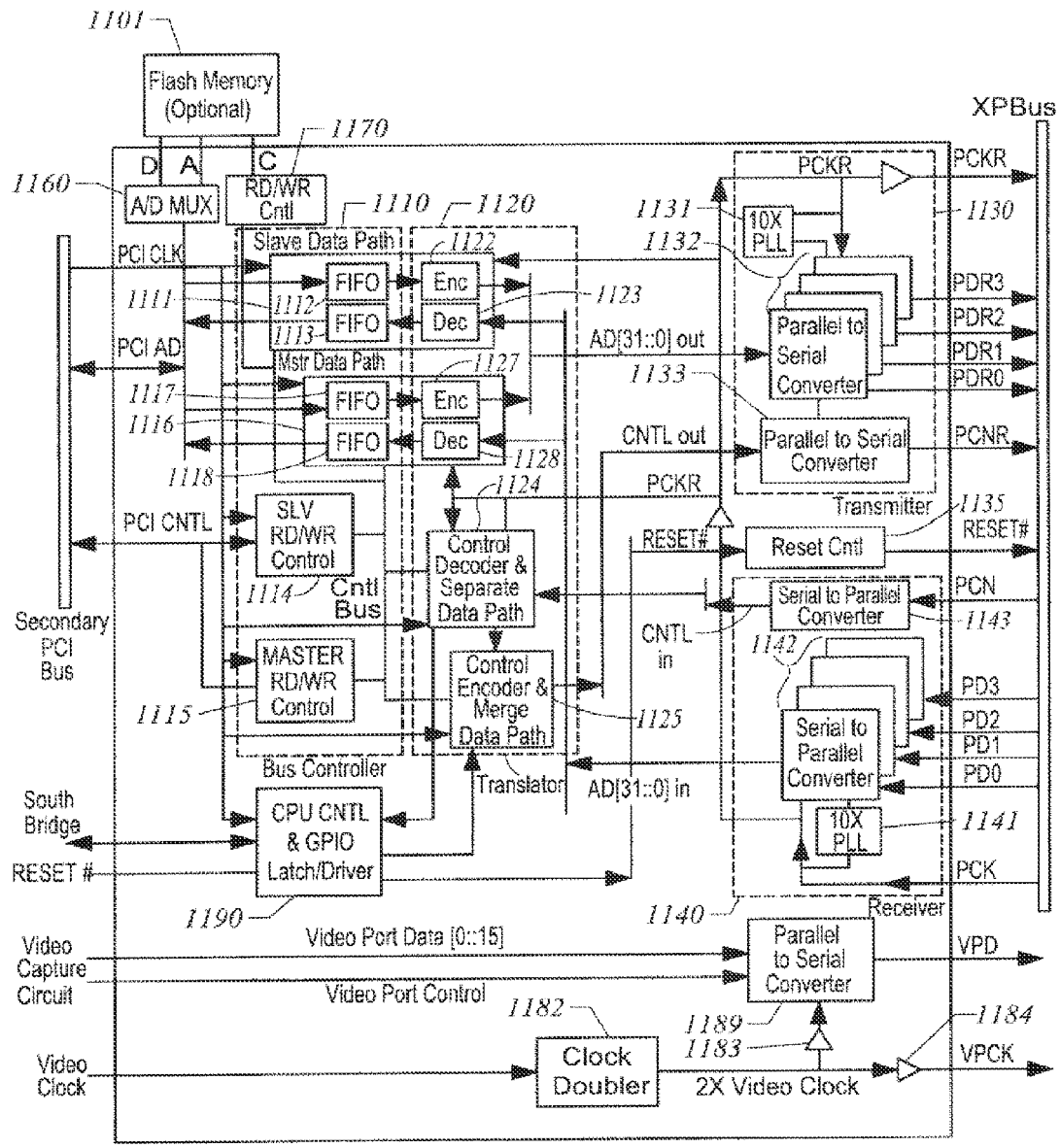
FIG. 11 is a detailed block diagram of one embodiment of the PIC of the present invention.

FIG. 11 is a detailed block diagram of one embodiment of the PIC of the present invention. PIC 1100 is nearly identical to HIC 1000 in its function, except that HIC 1000 interfaces the host PCI bus to the XPBus while PIC 1100 interfaces the secondary PCI bus to the XPBus. Similarly, the components in PIC 1100 serve the same function as their corresponding components in HIC 1000. Reference numbers for components in PIC 1100 have been selected such that a component in PIC 1100 and its corresponding component in HIC 1000 have reference numbers that differ by 500 and have the same two least significant digits. Thus for example, the bus controller in PIC 1100 is referenced as bus controller 1110 while the bus controller in HIC 1000 is referenced as bus controller 1010. As many of the elements in PIC 1100 serve the same functions as those served by their corresponding elements in HIC 1000 and as the functions of the corresponding elements in HIC 1000 have been described in detail above, the function of elements of PIC 1100 having corresponding elements in HIC 1000 will not be further described herein. Reference may be made to the above description of FIG. 10 for an understanding of the functions of the elements of PIC 1100 having corresponding elements in HIC 1000.

As suggested above, there are also differences between HIC 1000 and PIC 1100. Some of the differences between HIC 1000 and PIC 1100 include the following. First, receiver 1140 in PIC 1100, unlike receiver 1040 in HIC 1000, does not contain a synchronization unit. As mentioned above, the synchronization unit in HIC 1000 synchronizes the PCKR clock to the PCK clock locally generated by PLL 1050. PIC 1100 does not locally generate a PCK clock and therefore, it does not have a locally generated PCK clock with which to synchronize the PCK clock signal that it receives from HIC 1000. Another difference between PIC 1100 and HIC 1000 is the fact that PIC 1100 contains a video parallel to serial converter 1189 whereas HIC 1000 contains a video serial to parallel converter 1080. Video parallel to serial converter 1189 receives 16 bit parallel video capture data and video control signals on the Video Port Data [0::15] and Video Port Control lines, respectively, from the video capture circuit (not shown in FIG. 11) and converts them to a serial video data stream that is transmitted on the VPD line to the HIC. The video capture circuit may be any type of video capture circuit that outputs a 16 bit parallel video capture data and video control signals. Another difference lies in the fact that PIC 1100, unlike HIC 1000, contains a clock doubler 1182 to double the video clock rate of the video clock signal that it receives. The doubled video clock rate is fed into video parallel to serial converter 1182 through buffer 1183 and is sent to serial to parallel converter 1080 through buffer 1184. Additionally, reset control unit 1135 in PIC 1100 receives a reset signal from the CPU CNTL & GPIO latch/driver unit 1190 and transmits the reset signal on the RESET# line to the HIC 1000 whereas reset control unit 1045 of HIC 1000 receives the reset signal and forwards it to its CPU CNTL & GPIO latch/driver unit 1090 because, in the above embodiment, the reset signal RESET# is unidirectionally sent from the PIC 1100 to the HIC 1000.

Like HIC 1000, PIC 1100 handles the PCI bus control signals and control bits from the XPBus representing PCI control signals in the following ways:

1. PIC 1100 buffers clocked control signals from the secondary PCI bus. encodes them and sends the encoded control bits to the XPBus;
2. PIC 1100 manages the signal locally; and
3. PIC 1100 receives control bits from XPBus, translates them into PCI control signals and sends the PCI control signals to the secondary PCI bus.

PIC 1100 also supports a reference arbiter on the secondary PCI Bus to manage the PCI signals REQ# and GNT#.

FIG. 12 is a table showing the symbols, signals, data rate and description of signals on the XPBus, where RTN indicates a ground (GND) reference. In the above tables, P&D stands for plug and display and is a trademark of the Video Electronics Standards Association (VESA) for the Plug and Display standard, DDC2:SCL and DDC2:SDA stand for the VESA display data channel (DDC) standard 2 clock and data signals, respectively, SV stands for super video, V33 is 3.3 volts, and V5 is 5.0 volts. TMDS stands for Transition Minimized Differential Signaling and is a trademark of Silicon Images and refers to their Panel Link technology, which is in turn a trademark for their LVDS technology. TMDS is used herein to refer to the Panel Link technology or technologies compatible therewith.

FIG. 13 is a table showing the information transmitted on the XPBus during two clock cycles of the XPBus in one embodiment of the present invention where 10 data bits are transmitted in each clock cycle of the XPBus. In FIGS. 13, A00 to A31 represent 32 bits of PCI address A[31::0], D00 to D31 represent 32 bits of PCI data D[31::0], BS0 to BS3 represent 4 bits of bus status data indicating the status of the XPBus, CM0# to CM3# represent 4 bits of PCI command information, BE0# to BE3# represent 4 bits of PCI byte enable information, and CN0 to CN9 represent 10 bits of control information sent in each clock cycle. As shown in FIG. 13, for each of lines PD0 to PD3, the 10 bit data packets contain one BS bit, one CM/BE bit, and eight AID bits. For the PCN line, the 10 bit data packet contains 10 CN bits. The first clock cycle shown in FIG. 13 comprises an address cycle in which 4 BS bits, 4 CM bits, 32 A bits and 10 CN bits are sent. The second clock cycle comprises a data cycle in which 4 BS bits, 4 BE bits, 32 D bits and 10 CN bits are sent. The bits transmitted on lines PD0 to PD3 represent 32 PCI AD[31::0] signals, 4 PCI C/BE#[3::0] signals, and part of the function of PCI control signals, such as FRAME#, IRDY#, and TRDY#.

In the embodiment shown in FIG. 13, BS0 to BS3 are sent at the beginning of each clock cycle. The bus status bits indicate the following bus cycle transactions: idle, address transfer, write data transfer, read data transfer, switch XPBus direction, last data transfer, wait, and other cycles.

Bits representing signals transmitted between the CPU and South Bridge may also be sent on the lines interconnecting the HIC and PIC, such as lines PCN and PCNR. For example, CPU interface signals such as CPU interrupt (INTR), Address 20 Mask (A20M#), Non-Maskable Interrupt (NMI), System Management Interrupt (SMI#), and Stop Clock (STPCLK#), may be translated into bit information and transmitted on the XPBus between the HIC and the PIC.

Figure 14:
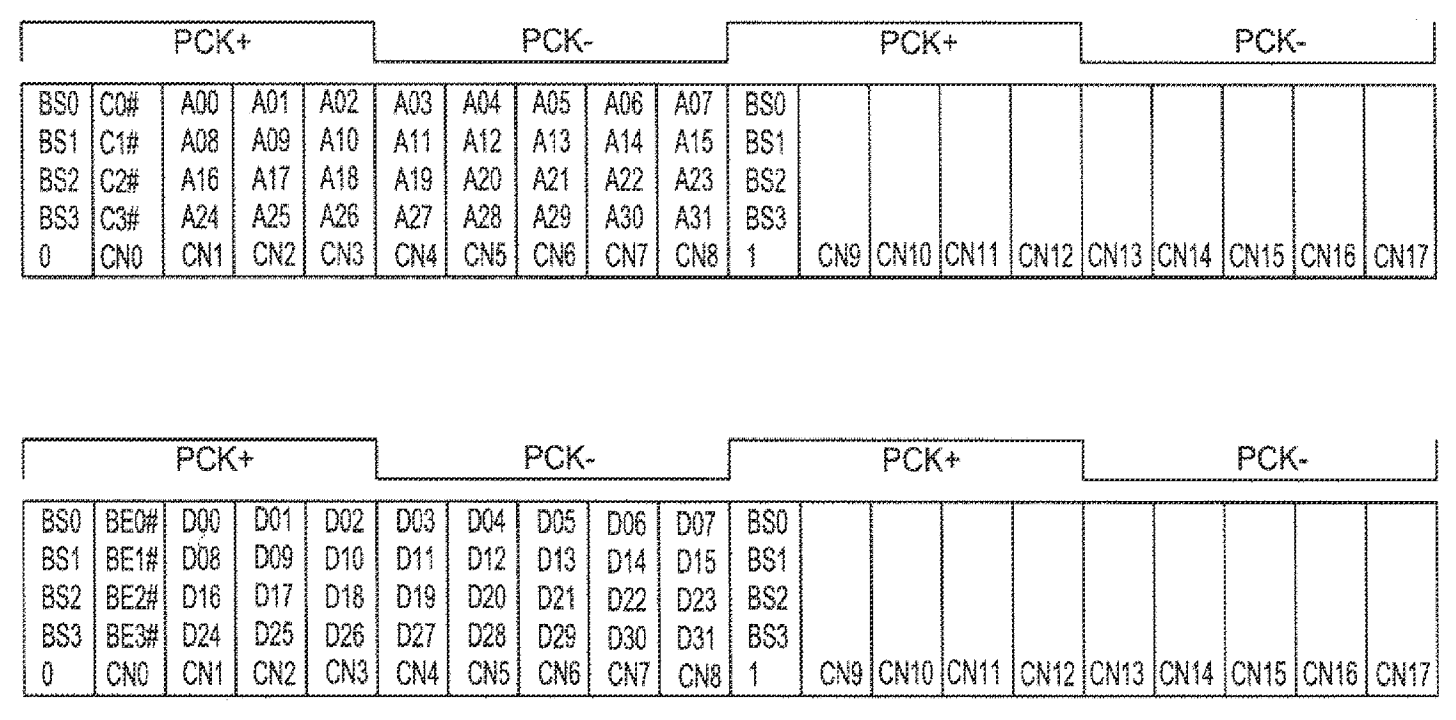

FIG. 14 is a table showing the information transmitted on the XPBus during four clock cycles of the XPBus in another embodiment of the present invention where 10 data bits are transmitted in each clock cycle of the XPBus. In this embodiment, the XPBus clock rate is twice as large as the PCI clock rate. This allows sending data and address bits every other XPBus cycle. As can be seen in FIG. 14, there are no address or data bits transmitted during the second or fourth XPBus clock cycle. The fact that the XPBus clock rate is higher than the PCI clock rate allows for compatibility of the XPBus with possible future expansions in the performance of PCI bus to higher data transfer and clock rates.

In the embodiment shown in FIG. 14, there are 18 control bits, CN0 to CN17, transmitted in every two XPBus clock cycles. The first bit transmitted on the control line in each XPBus clock cycle indicates whether control bits CN0 to CN8 or control bits CN9 to CN17 will be transmitted in that cycle. A zero sent at the beginning of a cycle on the control line indicates that CN0 to CN8 will be transmitted during that cycle, whereas a one sent at the beginning of a cycle on the control line indicates that CN9 to CN17 will be transmitted during that cycle. These bits also indicate the presence or absence of data and address bits during that cycle. A zero indicates that address or data bits will be transmitted during that cycle whereas a one indicates that no address or data bits will be transmitted during that cycle.

In one embodiment, BS0 and BS1 are used to encode the PCI signals FRAME# and IRDY#, respectively. Additionally, in one embodiment, BS2 and BS3 are used to indicate the clock speed of the computer bus interface and the type of computer bus interface, respectively. For example, BS2 value of zero may indicate that a 33 MHz PCI bus of 32 bits is used whereas a BS2 value of one may indicate that a 66 MHz PCI bus of 32 bits is used. Similarly, a BS3 value of zero may indicated that a PCI bus is used whereas a BS3 value of one may indicated that another computer interface bus, such as an Institute of Electronics & Electrical Engineers (IEEE) 1394 bus, is used.

Figure 15:
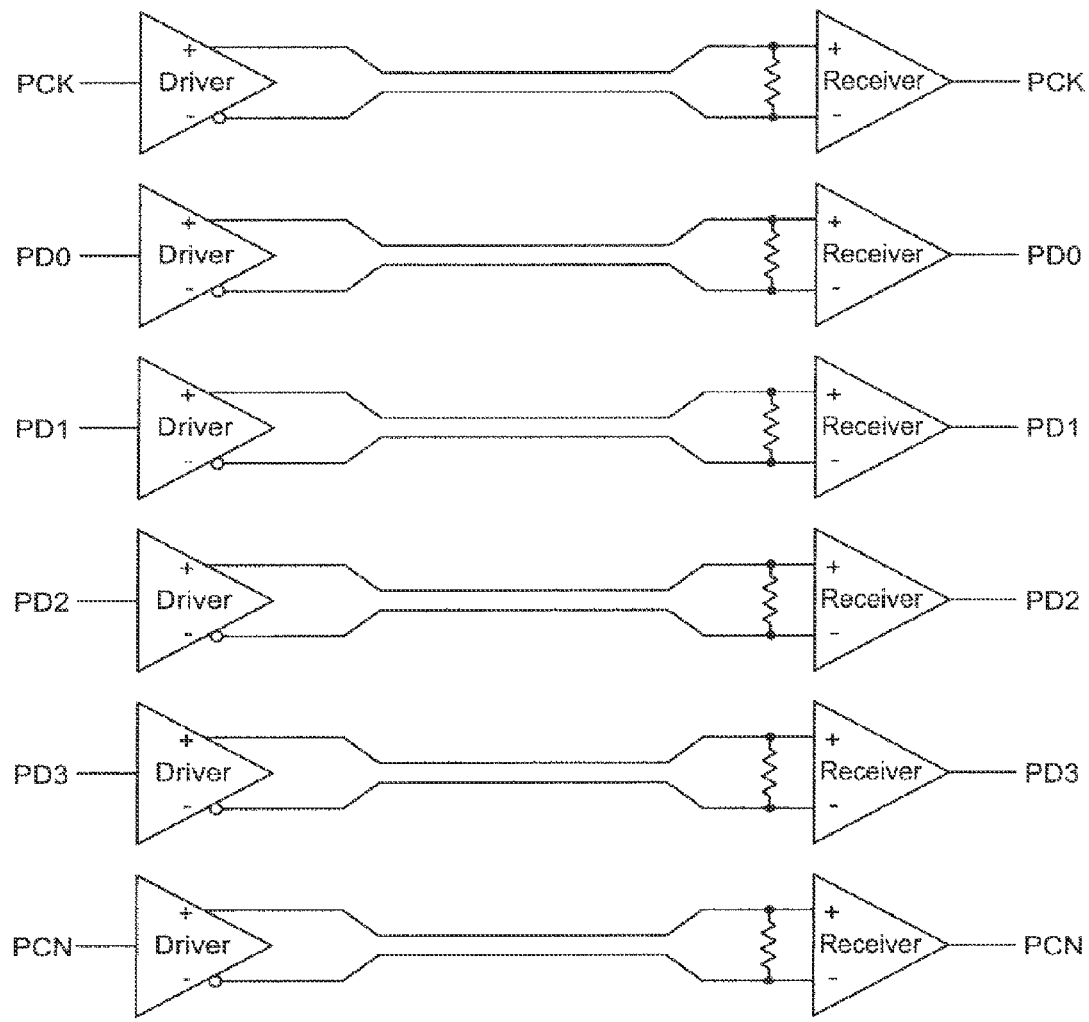
FIG. 15 is a schematic diagram of the signal lines PCK, PD0 to PD3, and PCN.

FIG. 15 is a schematic diagram of lines PCK, PD0 to PD3, and PCN. These lines are unidirectional LVDS lines for transmitting clock signals and bits such as those shown in FIGS. 13 and 14 from the HIC to the PIC. The bits on the PD0 to PD3 and the PCN lines are sent synchronously within every clock cycle of the PCK. Another set of lines, namely PCKR, PDR0 to PDR3, and PCNR, are used to transmit clock signals and bits from the PIC to HIC. The lines used for transmitting information from the PIC to the HIC have the same structure as those shown in FIG. 15, except that they transmit data in a direction opposite to that in which the lines shown in FIG. 15 transmit data. In other words they transmit information from the PIC to the HIC. The bits on the PDR0 to PDR3 and the PCNR lines are sent synchronously within every clock cycle of the PCKR. Some of the examples of control information that may be sent in the reverse direction, i.e., on PCNR line, include a request to switch data bus direction because of a pending operation (such as read data available), a control signal change in the target requiring communication in the reverse direction, target busy, and transmission error detected.

The XPBus which includes lines PCK, PD0 to PD3, PCN, PCKR, PDR0 to PDR3, and PCNR, has two sets of unidirectional lines transmitting clock signals and bits in opposite directions. The first set of unidirectional lines includes PCK, PD0 to PD3, and PCN. The second set of unidirectional lines includes PCKR, PDR0 to PDR3, and PCNR. Each of these unidirectional set of lines is a point-to-point bus with a fixed transmitter and receiver, or in other words a fixed master and slave bus. For the first set of unidirectional lines, the HIC is a fixed transmitter/master whereas the PIC is a fixed receiver/slave. For the second set of unidirectional lines, the PIC is a fixed transmitter/master whereas the HIC is a fixed receiver/slave. The LVDS lines of XPBus, a cable friendly and remote system I/O bus, transmit fixed length data packets within a clock cycle.

The XPBus lines, PD0 to PD3, PCN, PDR0 to PDR3 and PCNR, and the video data and clock lines, VPD and VPCK, are not limited to being LVDS lines, as they may be other forms of bit based lines. For example, in another embodiment, the XPBus lines may be IEEE 1394 lines.

It is to be noted that although each of the lines PCK, PD0 to PD3, PCN, PCKR, PDR0 to PDR3, PCNR, VPCK, and VPD is referred to as a line, in the singular rather than plural. each such line may contain more than one physical line. For example, in the embodiment shown in FIG. 23, each of lines PCK, PD0 to PD3 and PCN includes two physical lines between each driver and its corresponding receiver. The term line, when not directly preceded by the terms physical or conductive, is herein used interchangeably with a signal or bit channel which may consist of one or more physical lines for transmitting a signal. In the case of non-differential signal lines, generally only one physical line is used to transmit one signal. However, in the case of differential signal lines, a pair of physical lines is used to transmit one signal. For example, a bit line or bit channel in an LVDS or IEEE 1394 interface consists of a pair of physical lines which together transmit a signal.

A bit based line (i.e., a bit line) is a line for transmitting serial bits. Bit based lines typically transmit bit packets and use a serial data packet protocol. Examples of bit lines include an LVDS line, an IEEE 1394 line, and a Universal Serial Bus (USB) line.

FIG. 27 is a table showing different types of first nibbles and their corresponding data packet types. The reserved data packet types can be used to support non-PCI bus transactions, e.g., USB transactions. The bits sent in the first nibble of each data packet indicate the type of that data packet.

FIG. 16 is a table showing the names, types, number of pins dedicated to, and the description of the primary bus PCI signals. The pins represent those between the host PCI bus and the HIC.

Figure 17:
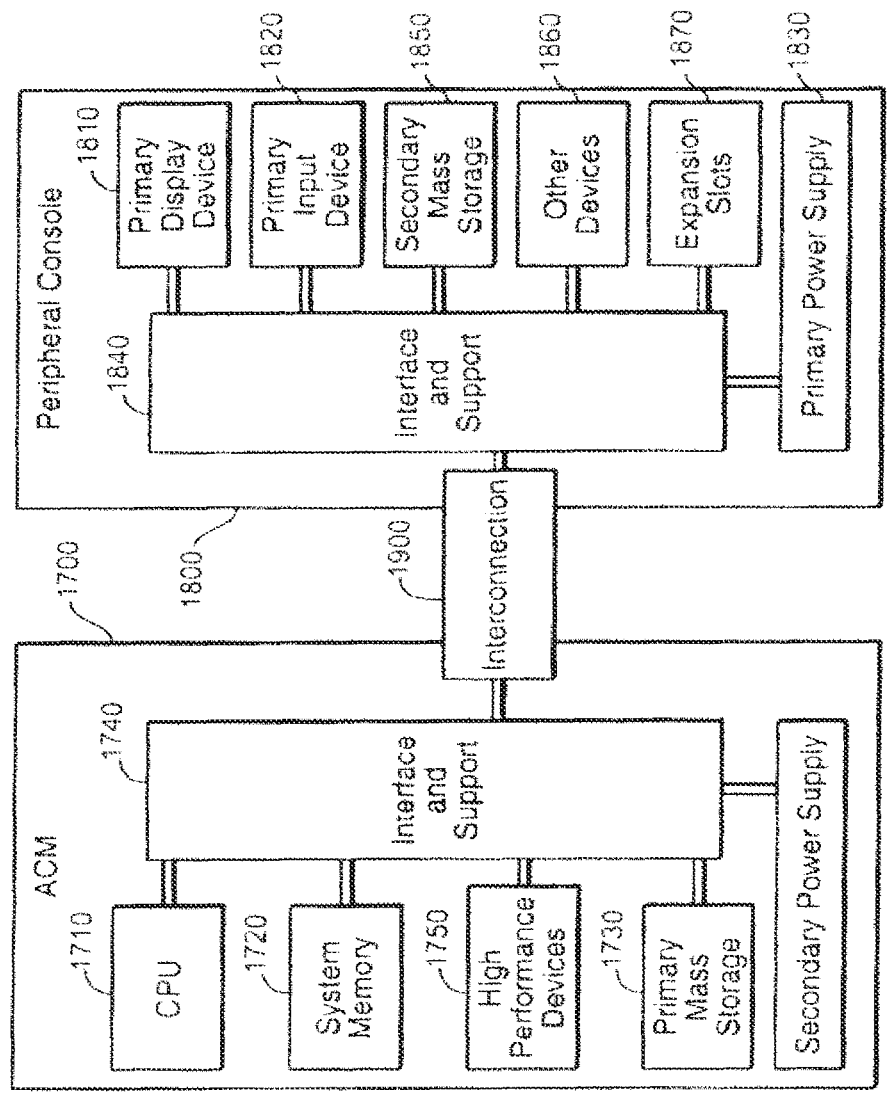
FIG. 17 is a block diagram of one embodiment of a computer system employing the present invention.

FIG. 17 is a block diagram of the components in one computer system employing the present invention. The computer system comprises an attached computer module (ACM), a peripheral console (PCON), and the interconnection apparatus between them. The ACM includes the central processing unit (CPU) 1710, system memory 1720, high performance devices 1750, primary mass storage 1730, and related interface and support circuitry 1740. The PCON includes primary display 1810, primary input 1820, secondary mass storage 1750, other devices 1860, expansion slots 1870, the primary power supply 1830, and related interface and support circuitry 1840. The interconnection apparatus 1900 includes circuitry to convey power and operational signals between the ACM and PCON.

Within the ACM 1700, the CPU 1710 executes instructions and manipulates data stored in the system memory. The CPU 1710 and system memory 1720 represent the user's core computing power. The core computing power may also include high performance devices 1750 such as advanced graphics processor chips that greatly increase overall system performance and which, because of their speed, need to be located close to the CPU. The primary mass storage 1730 contains persistent copies of the operating system software, application software, configuration data, and user data. The software and data stored in the primary mass storage device represent the user's computing environment. Interface and support circuitry 1740 primarily includes interface chips and signal busses that interconnect the CPU, system memory, high performance devices, and primary mass storage. The interface and support circuitry also connects ACM-resident components with the ACM-to-PCON interconnection apparatus as needed.

Within the PCON 1800, the primary display component 1810 may include an integrated display device or connection circuitry for an external display device. This primary display device may be, for example, an LCD, plasma, or CRT display screen used to display text and graphics to the user for interaction with the operating system and application software. The primary display component is the primary output of the computer system, i.e., the paramount vehicle by which programs executing on the CPU can communicate toward the user.

The primary input component 1820 of the PCON may include an integrated input device or connection circuitry for attachment to an external input device. The primary input may be, for example, a keyboard, touch screen, keypad, mouse, trackball, digitizing pad, or some combination thereof to enable the user to interact with the operating system and application software. The primary input component is the paramount vehicle by which programs executing on the CPU receive signals from the user.

The PCON may contain secondary mass storage 1850 to provide additional high capacity storage for data and software. Secondary mass storage may have fixed or removable media and may include, for example, devices such as diskette drives, hard disks, CD-ROM drives, DVD drives, and tape drives.

The PCON may be enhanced with additional capability through the use of integrated "Other Devices" 1860 or add-on cards inserted into the PCON's expansion slots 1870. Examples of additional capability include sound generators, LAN connections, and modems. Interface and support circuitry 1840 primarily includes interface chips, driver chips, and signal busses that interconnect the other components within the PCON. The interface and support circuitry also connects PCON-resident components with the ACM-to-PCON interconnection apparatus as needed.

Importantly, the PCON houses the primary power supply 1830. The primary power supply has sufficient capacity to power both the PCON and the ACM 1700 for normal operation. Note that the ACM may include a secondary "power supply" in the form, for example, of a small battery. Such a power supply would be included in the ACM to maintain, for example, a time-of-day clock, configuration settings when the ACM is not attached to a PCON, or machine state when moving an active ACM immediately from one PCON to another. The total energy stored in such a battery would, however, be insufficient to sustain operation of the CPU at its rated speed, along with the memory and primary mass storage, for more than a fraction of an hour, if the battery were able to deliver the required level of electrical current at all.

Figure 18:
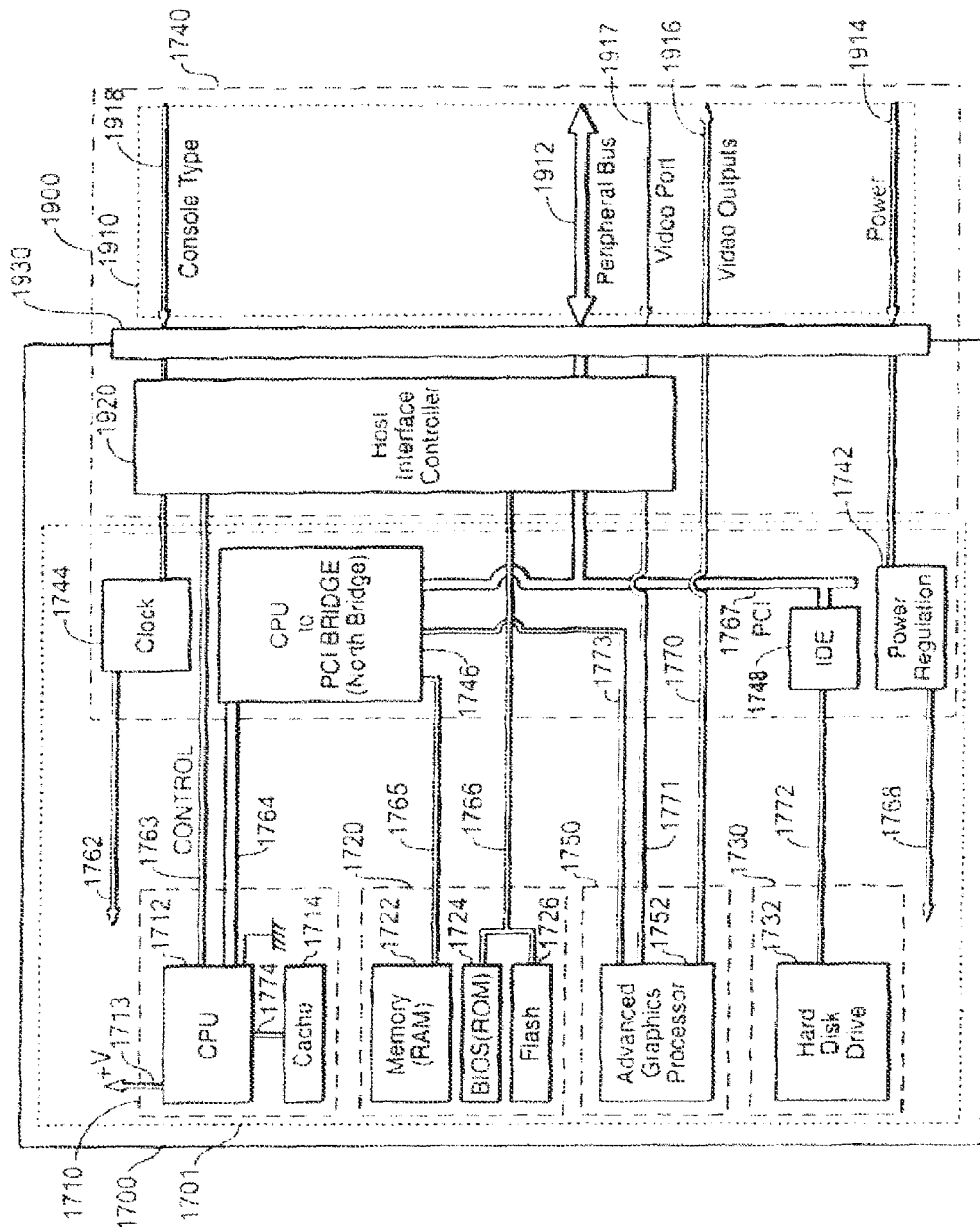
FIG. 18 is a block diagram of an attached computing module (ACM).

FIG. 18 is a block diagram of an attached computing module (ACM) 1700. The physical ACM package 1700 contains the ACM functional components 1701 and the ACM side of the ACM-to-PCON Interconnection 1900. The ACM 1701 comprises a CPU component 1710, a system memory component 1720, a primary mass storage component 1730, a high performance devices components 1750, and an interface and support component 1740.

The ACM side of the ACM-to-PCON Interconnection 1900 comprises a Host Interface Controller (HIC) component 1920 and an ACM connector component 1930. The HIC 1920 and connector 1930 components couple the ACM functional components 1700 with the signals of an ACM-to-PCON interface bus 1910 used to operatively connect an ACM with a PCON. The ACM-to-PCON interface bus 1910 comprises conveyance for electrical power 1914 and signals for a peripheral bus 1912, video 1916, video port 1917, and console type 1918. The preferred ACM-to-PCON Interconnection 1900 is described in detail in a companion U.S. patent application Ser. No. 09/149,882, entitled "A Communication Channel and Interface Devices for Bridging Computer Interface Buses," by the same inventor, filed on the same day herewith, and hereby incorporated by reference. The preferred ACM-to-PCON interconnection 1900 includes circuitry to transmit and receive parallel bus information from multiple signal paths as a serial bit stream on a single signal path. This reduces the number of physical signal paths required to traverse the interconnection 1900. Further, employing low-voltage differential signaling (LVDS) on the bit stream data paths provides very reliable, high-speed transmission across cables. This represents a further advantage of the present invention.

The CPU component 1710 of the ACM functional circuitry 1701 of the presently described embodiment comprises a microprocessor 1712, which is the chief component of the personal computer system, power supply connection point 1713, and cache memory 1714 tightly coupled to the microprocessor 1712 by the CPU-to-cache bus 1714 comprising signal paths for address, data. and control information. The microprocessor 1712 of this embodiment is one of the models from the Pentium II family of processors from Intel Corporation. Microprocessor 1712 receives electrical power from power bus 1768 via connection point 1713. Microprocessor 1712 couples to the Host Interface Controller (HIC) 1920 via CPU-to-HIC bus 1763 comprising signal paths to exchange control information such as an interrupt request. Microprocessor 1712 also couples to CPU Bridge 1746 via CPU main bus 1764 comprising signal paths for address, data, and control information.

The CPU Bridge component 1746 of the interface and support circuitry 1740 operates to couple the high speed CPU main bus 1764 to specialty buses of varying speeds and capability that connect other computer components. The CPU Bridge of the presently described embodiment incorporates memory controller circuitry, advanced graphics processor support circuitry, and a general, industry-standard PCI bus controller in a single package. A CPU Bridge 1746 such as the 82443LX PCI/AGP Controller from Intel Corporation may be used.

The system memory component 1720 of the ACM functional circuitry 1701 in the present embodiment comprises main system memory (RAM) 1722, BIOS memory 1724, and flash memory 1726. The system memory 1720 is used to contain data and instructions that are directly addressable by the CPU. The RAM 1722 comprises volatile memory devices such as DRAM or SDRAM memory chips that do not retain their stored contents when power is removed. This form of memory represents the largest proportion of total system memory 1720 capacity. The BIOS memory 1724 comprises non-volatile memory devices such as ROM or EPROM memory chips that retain their stored contents regardless of the application of power and are read-only memory under normal operating conditions. The BIOS memory 1724 stores, for example, start-up instructions for the microprocessor 1712 and sets of instructions for rudimentary input/output tasks. The flash memory 1726 comprises non-volatile memory devices that retain their stored contents regardless of the application of power. Unlike the BIOS non-volatile memory, however, the stored contents of the flash memory 1726 are easily changed under normal operating conditions. The flash memory 1726 may be used to store status and configuration data, such as security identifiers or ACM specifications like the speed of the microprocessor 1712. Some embodiments may combine the BIOS functions into the flash memory device, thus permitting BIOS contents to be rewritten, improving field upgradability.

The main system memory (RAM) 1722 is coupled to memory controller circuitry resident within the CPU Bridge 1746 via direct memory bus 1765. The BIOS 1724 and flash memory 1726 are coupled to HIC 1920 via switched memory bus 1766. This permits the BIOS 1724 and flash 1726 memories to be accessed by circuitry in the HIC 1920 or other circuitry connected thereto. The direct memory bus 1765 and the switch memory bus 1766 each comprises conductors to convey signals for data, address, and control information.

The primary mass storage component 1730 of the ACM functional circuitry 1701 in the present embodiment comprises a compact hard disk drive with an industry-standard, IDE interface. The hard disk drive (HDD) 1732 has a formatted storage capacity sufficient to contain an operating system for the computer, application software desired by the user, and related user configuration and operating parameter data. The HDD 1732 in the present embodiment serves as the "boot" device for the personal computer from which the operating system is loaded into RAM 1722 by the start-up program stored in the BIOS 1724.

The present HDD 1732 has a capacity of approximately 2,000 megabytes to provide adequate storage for common software configurations and reasonable space for user data. One example of a common software configuration includes the Windows 95 operating system from Microsoft Corporation, a word processing program, a spreadsheet program, a presentation graphics program, a database program, an email program, and a web browser such as Navigator from Netscape Corporation. The hard disk 1732 stores program and data files for each software component, including files distributed by the vendor as well as files created or updated by operation of the software after it is installed. For example, a word processor program may maintain information about a user's identity and latest preferences in an operating system registry file. Or, for example, the web browser may maintain a file of the user's favorite web sites or most recently viewed web pages. An HDD with 2000 megabyte capacity is readily available in the small size of hard disk (e.g., 2.5-inch or 3.5-inch) to minimize the space required within the ACM for the primary mass storage device 1730.

The HDD 1732 is coupled to IDE controller circuitry 1748 via IDE bus 1772. The IDE controller circuitry 1748 is coupled to the CPU Bridge 1746 via the Host PCI bus 1767. IDE controllers and busses, and the PCI bus are well known and understood in the industry. The above components operate together to couple the hard disk drive 1732 to the microprocessor 1712.

The high performance devices component 1750 of the ACM functional circuitry 1701 in the present embodiment comprises an Advanced Graphics Processor (AGP) 1752. The Model 740 Graphics Device froth Intel Corporation may be used in the present embodiment as the AGP.

Increases in computer screen size, graphics resolution, color depth, and visual motion frame rates, used by operating system and application software alike, have increased the computing power required to generate and maintain computer screen displays. An AGP removes a substantial portion of the graphics computing burden from the CPU to the specialized high-performance processor, but a high level of interaction between the CPU and the specialized processor is nonetheless required. To maximize the effective contribution of having a specialized processor in the presently described embodiment, the AGP 1752 is located in the ACM 1700, where it is in close proximity to the microprocessor 1712. The AGP 1752 is coupled to the microprocessor 1712 via the advanced graphics port bus 1773 of the CPU Bridge 1746. The visual display signal generated by the AGP are conveyed toward actual display devices at the peripheral console (PCON) via video signal bus 1770. Video information from a source external to the ACM and appearing as video port signals 1917 may be conveyed to the AGP 1752 via video port signal path 1771.

Other types of high performance components may be included in different ACM configurations. For example, an interface to an extremely high speed data communication facility may be desirable in some future computer where CPU-to-network interaction is of comparable intensity to today's CPU-to-graphics interaction. Because such high performance components tend to be high in cost, their inclusion in the ACM is desirable. Inclusion of high cost, high performance components in the ACM concentrates a user's core computing power and environment in a portable package. This represents a further advantage of the invention.

The interface and support component 1740 of the ACM functional circuitry 1701 in the present embodiment comprises circuitry for power regulation 1742, clocking 1744, CPU Bridge 1746, IDE controller 1748, and signal conveyance paths 1761-1774. The CPU Bridge 1746 couples the CPU component 1710 of the ACM 1700 with the other components of the ACM 1720-1750 and the CPU-to-PCON Interconnection 1900. The CPU Bridge 1746 and IDE controller 1748 have already been discussed. Power regulation circuitry 1742 receives electrical power via the electrical power conduction path 1914 of the CPU-to-PCON Interconnection 1900, conditions and distributes it to the other circuitry in the ACM using power distribution bus 1768. Such regulation and distribution is well known and understood in the art.

Clocking circuitry 1744 generates clock signals for distribution to other components within the ACM 1700 that require a timing and synchronization clock source. The CPU 1710 is one such component. Often, the total power dissipated by a CPU is directly proportional to the frequency of its main clock signal. The presently described embodiment of the ACM 1700 includes circuitry that can vary the frequency of the main CPU clock signal conveyed to the CPU via signal path 1762, in response to a signal received from the host interface controller (HIC) 1920 via signal path 1761. The generation and variable frequency control of clocking signals is well understood in the art. By varying the frequency, the power consumption of the CPU (and thus the entire ACM) can be varied.

The variable clock rate generation may be exploited to match the CPU power consumption to the available electrical power. Circuitry in the host interface controller (HIC) 1920 of the presently described embodiment adjusts the frequency control signal sent via signal path 1761 to the clocking circuitry 1744, based on the "console type" information signal 1918 conveyed from the peripheral console (PCON) by the CPU-to-PCON interconnection 1900. In this arrangement, the console type signal originating from a desktop PCON would result in the generation of a maximum speed CPU clock. The desktop PCON, presumably has unlimited power from an electrical wall outlet and does not need to sacrifice speed for power conservation. The console type signal originating from a notebook PCON would, however, result in the generation of a CPU clock speed reduced from the maximum in order to conserve battery power and extend the duration of computer operation obtained from the energy stored in the battery. The console type signal originating from a notepad PCON would result in the generation of a CPU clock speed reduced further yet, the notepad PCON presumably having smaller batteries than the notebook PCON. Inclusion of control signals and circuitry to affect a CPU clock signal varying in frequency according to characteristics of the PCON to which the ACM is connected facilitates the movement of the user's core computing power and environment to different work settings, which is a further advantage of the present invention.

Figure 19:
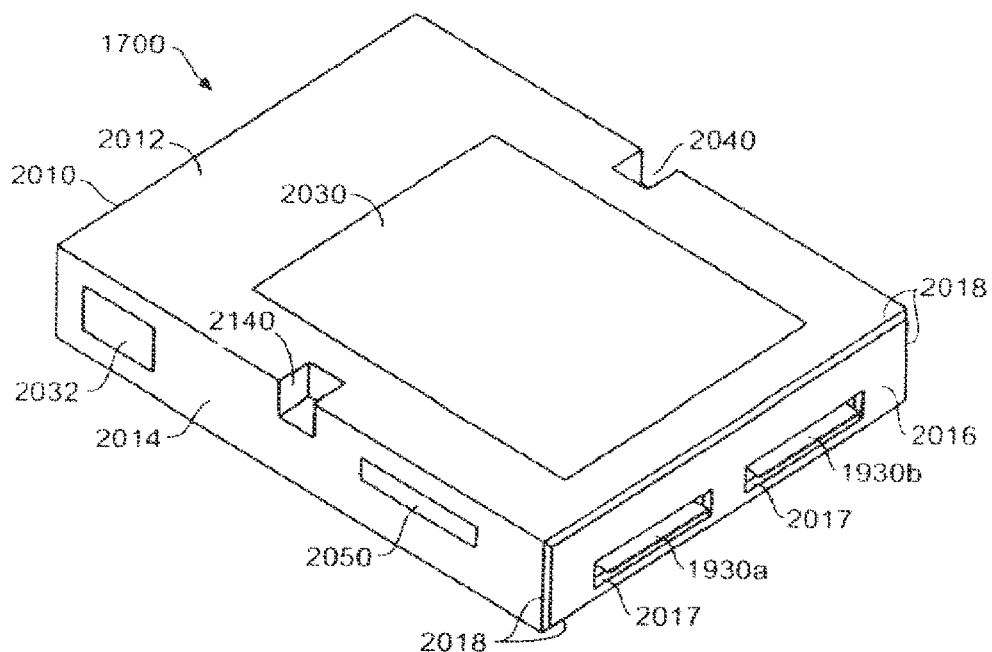
FIG. 19 illustrates an external view of one embodiment of an ACM.

FIG. 19 illustrates an external view of one embodiment of an ACM. The case 2010 of the ACM 1700 is generally rectangular in shape, preferably constructed of a strong, lightweight, rigid material that will protect the internal components from mechanical and environmental exposure. Plastics may readily be used to construct the case 2010. The case 2010 completely surrounds the internal components, being generally an 8-sided box. FIG. 19 shows the top 2012, right 2014, and rear 2016 surfaces of the ACM case 2010. Rear edges 2018 of the case joining the rear surface 2016 with its adjoining surfaces may be beveled or rounded to facilitate insertion of the ACM 1700 into the computer bay of the PCON. Notches 2040 may be formed by projecting small surfaces inward from otherwise generally flat surfaces of the ACM case 2010. The notches 2040 may be used to engage with mechanical devices mounted in and about a computer bay. Such mechanical devices can be employed to secure the ACM into position within a computer bay for reliability and security. Openings 2017 are formed into the rear surface 2016 of the ACM case 2010 through which to project connectors 1930a and 1930b. In one embodiment the case 2010 is approximately 5.75 inches wide by 6.5 inches deep by 1.6 inches high.

Connectors 1930a and 1930b are part of the ACM-to-PCON Interconnection as described earlier in reference to FIGS. 3 and 4. When the ACM 1700 is inserted into the computer bay of a peripheral console (PCON), connectors 1930a and 1930b mate with corresponding connectors located at the rear of the computer bay to electrically couple the ACM with the PCON containing the computer bay. Details concerning the ACM-to-PCON Interconnection can be found in the U.S. patent application entitled "A Communication Channel and Interface Devices for Bridging Computer Interface Buses," already incorporated herein by reference. The connectors 1930a and 1930b used in one embodiment are connectors complying with the Device Bay industry standard as documented in "Device Bay Interface Specification," revision 0.85, Feb. 6, 1998. Such connectors have specifically been designed to stand up to the rigors of repeated insertion and withdrawal.

Cooling plate 2030 forms part of the top surface 2012 of ACM 1700. The cooling plate 2030 may be mounted to, or project through an opening formed in, case 2010. Similarly, electromagnetic interference (EMI)/electrostatic discharge (ESD) grounding plate 2032 forms part of the right surface 2014 of ACM 1700. The grounding plate 2032 may be mounted to, or project through an opening formed in, case 2010. Cooling plate 2030 and grounding plate 2032 compressively mate with counterparts when the ACM is fully inserted into the computer bay. The counterparts located along the boundaries of the computer bay conduct dangerous heat and electrical charges away from the ACM. Inside the ACM, cooling plate 2030 thermally couples to heat-sensitive components such as CPU 1710 by methods well known in the art. Similarly, grounding plate 2032 electrically couples to EMI/ESD-sensitive components, such as a microprocessor, by methods well known in the art.

LCD display 2050 forms part of the right surface 2014 of ACM 1700. The LCD display may be mounted to, or project through an opening formed in, case 2010. The LCD display may contain indicators about the status of the ACM. Such indicators may display, for example, the time-of-day from a time-of-day clock contained within the ACM, or the amount of charge remaining in an ACM-resident battery, or certain configuration options recorded in flash memory. The LCD display 2050 provides display capability for a limited amount of information, most useful when the ACM is separated from a PCON (and is thus separated from a full-capability, primary display device).

Figure 19B:
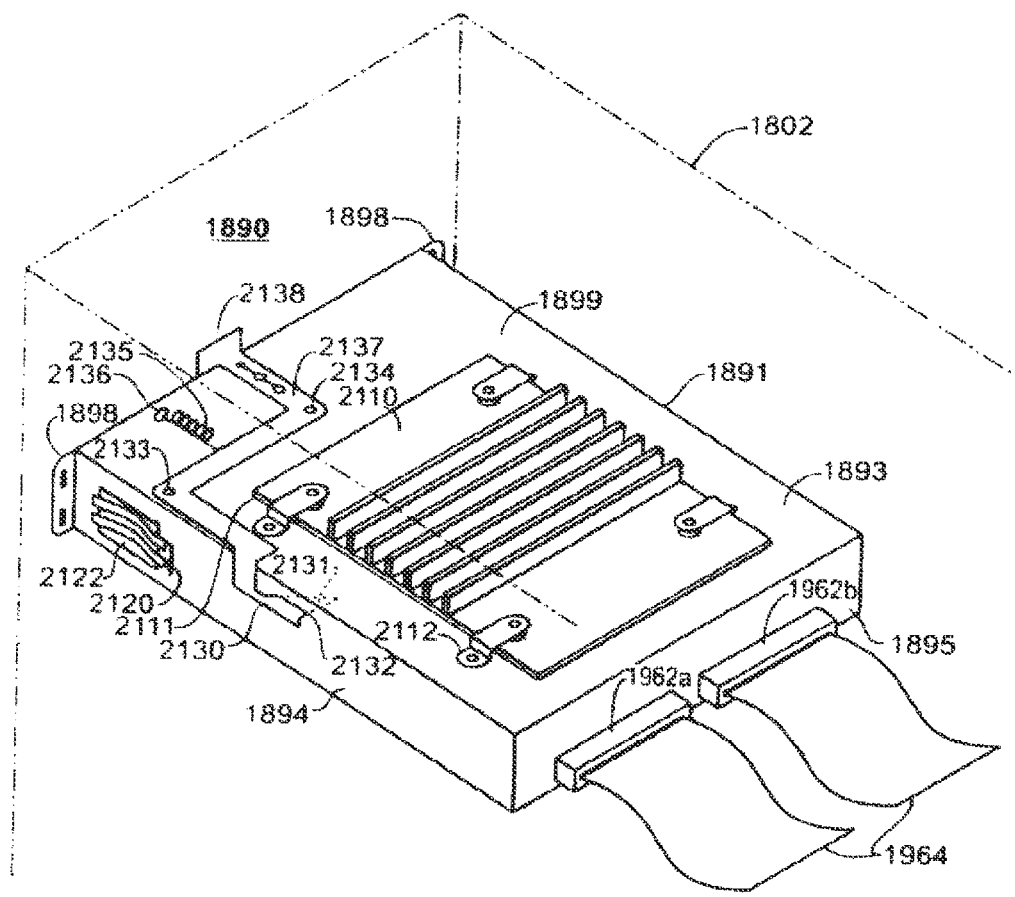
FIG. 19b illustrates one possible embodiment of a computer bay.

FIG. 19b illustrates one possible embodiment of a computer bay. A computer bay 1890 acts as a receptacle for lodging an ACM (such as the one shown in FIG. 20) within a desktop PCON. The illustrated computer bay 1890 provides an ACM with housing and with signal flow, electrical grounding, heat transfer, and mechanical connections. While many physical arrangements between the ACM and PCON are possible, the use of an enclosed computer bay as the one illustrated in FIG. 20b offers many advantages. For example, the illustrated computer bay 1890 provides physical protection for the ACM. The computer bay may also be easily incorporated into industry standard form factors used in the manufacture of desktop personal computers (e.g., the ACM and associated computer bay could be designed to fit within the volume occupied by a standard-size disk drive).

The computer bay 1890 appearing in FIG. 20b is shown mounted within the confines of PCON case 1802. The computer bay 1890 comprises frame 1891 and signal flow, grounding, cooling, and locking components as described below. Mounting flanges 1898 of frame 1891 may be used to attach the computer bay 1890 to the PCON structure. The computer bay 1890 is prominently defined by frame 1891 generally forming a cavity in which to lodge an ACM. As such, the interior cavity formed by frame 1891 closely approximates the exterior dimensions of a compatible ACM. The top 1893, right 1894, and rear 1895 sides of the computer bay frame 1891 are visible. The computer bay frame 1891 also includes substantial bottom and left sides which are not shown. The front side of the frame 1891 (not shown) is open to allow the insertion of the ACM. Frame 1891 is constructed of metal for strength and to facilitate the conductance of heat and undesired electrical currents away from the ACM.

In the presently described embodiment, the weight of an inserted ACM is largely borne by the bottom side (not shown) of computer bay frame 1891. Alternative embodiments are possible where, for example, the weight of the ACM is borne by rails running longitudinally down the right and left sides of the computer bay cavity that engage corresponding grooves running longitudinally down the right and left sides of an ACM.

Figure 20:
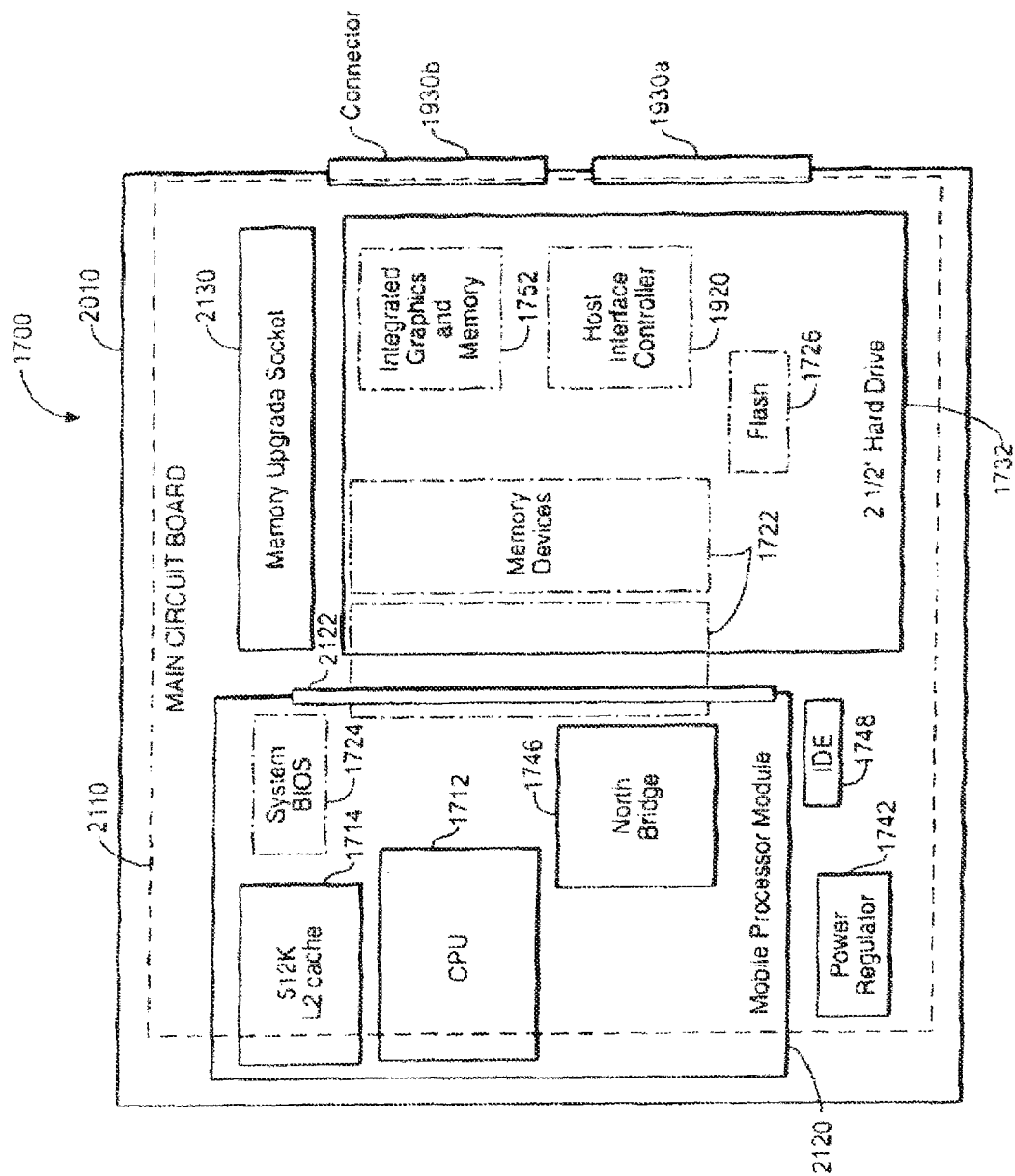
FIG. 20 illustrates the internal component layout for one embodiment of an ACM.

FIG. 20 illustrates the internal component layout for one embodiment of an ACM. All components are contained within the confines of the ACM case 510, except for connectors 1930*a* and 1930*b* which extend from the rear of the ACM 1700 to engage mating connectors (not shown) that will couple the ACM circuitry with the PCON circuitry. Main circuit board 2110 provides electrical connections for circuitry within the ACM and mounting for many of its components 1724, 1722, 17221, 1752, 1742, 1748, 1920, and 1930. The fabrication and use of such circuit boards is well known and understood in the art. Connector 2122 is also mounted on main circuit board 2110 and mates with mobile processor module 2120. Mobile processor module 2120 represents a form of packaging for a microprocessor and related components. The illustrated mobile processor module 2120 is a self-contained unit that includes a microprocessor 1712, CPU cache 1714, and CPU bridge 1746 operatively interconnected by the manufacturer. An example of one such module is the Pentium Processor with MMX Technology Mobile Module from Intel Corporation (order number 24 3515-001, September 1997). One skilled in the art recognizes that discrete microprocessor, cache, and bridge could have been employed and mounted directly to the main circuit board.

The mobile processor module 2120 blocks the view, from the top, of the system BIOS 1724. Similarly, hard disk drive 1732 hides RAM memory 1722, the high performance graphics processor 1752, the host interface controller 1920, and flash memory 1726. Memory upgrade socket 2130 remains exposed to facilitate installation of additional RAM memory 1722. Power regulator 1742, like the memory upgrade socket, enjoys a generous amount of overhead clearance to accommodate its vertical size. The area including IDE controller 1748 also enjoys overhead clearance to facilitate a cable connection with the hard disk drive 1732.

The functional interconnection and operation of components contained within the ACM and depicted in FIG. 20 has already been described in relation to FIG. 18 for like numbered items appearing therein.

Figure 21:
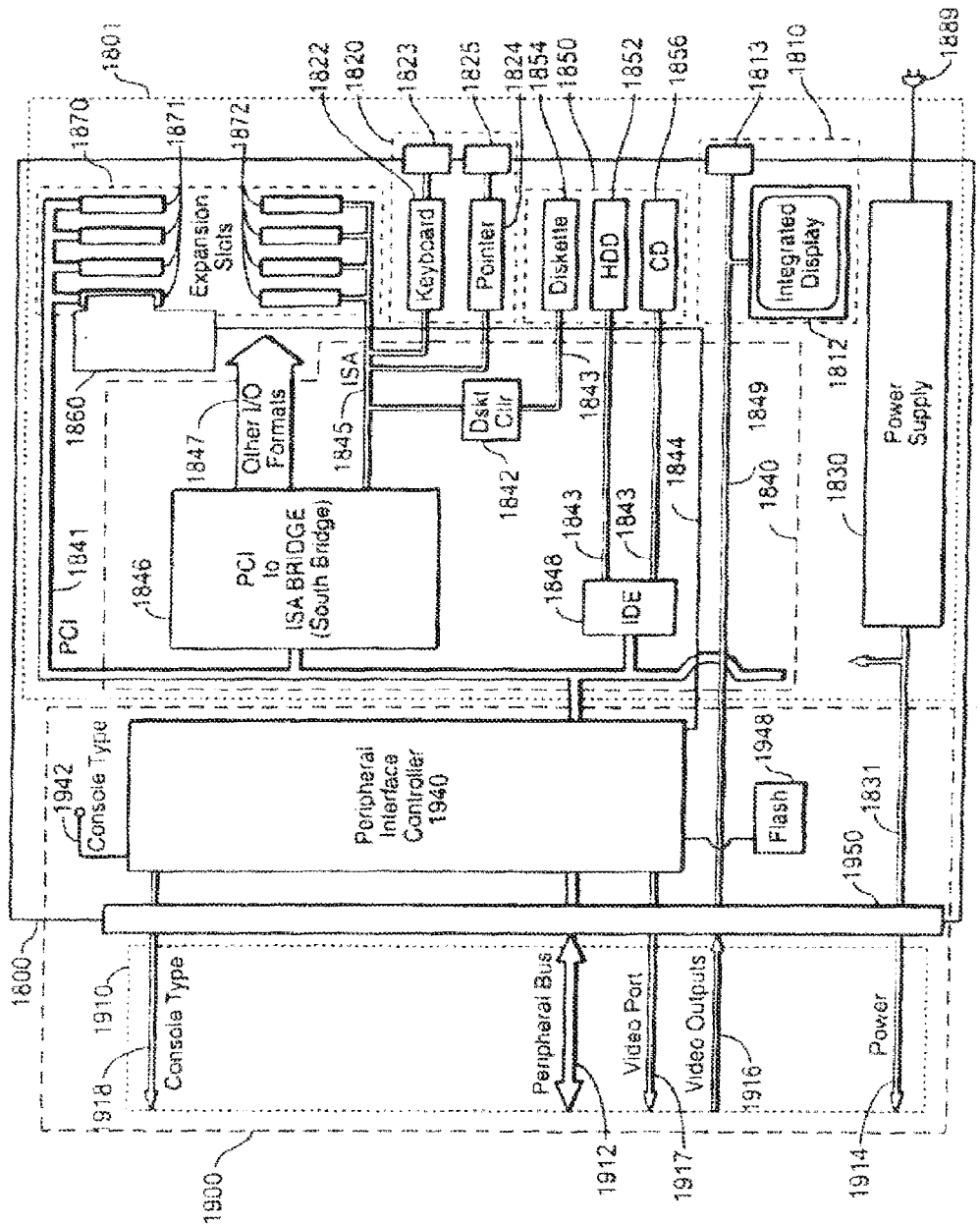
FIG. 21 is a block diagram of a peripheral console (PCON).

FIG. 21 is a block diagram of a peripheral console (PCON). A peripheral console couples with an ACM to form an operating personal computer system. The peripheral console (PCON) supplies an ACM with primary input, display, and power supply; the ACM supplies the core computing power and environment of the user. In the presently described embodiment the physical PCON package 200 contains the PCON functional components 1801 and the PCON side of the ACM-to-PCON Interconnection 1900. The PCON functional components 1801 comprise primary display 1810, a primary input 1820, a primary power supply 1830, interface and support 1840, secondary mass storage 1850, other devices 1860, and expansion slots 1870.

The PCON side of the ACM-to-PCON Interconnection 1900 comprises a Peripheral Interface Controller (PIC) component 1940, a PCON connector component 1950, console-type component 1942, and flash memory device 1948. The PIC 1940 and connector 1950 components couple the PCON functional components 1801 with the signals of an ACM-to-PCON interface bus 1910 used to operatively connect an ACM with a PCON. The ACM-to-PCON interface bus 1910 comprises conveyance for electrical power 1914 and signals for a peripheral bus 1912, video 1916, video port 1917, and console-type 1918. The preferred ACM-to-PCON Interconnection 1900 is described in detail in the U.S. patent application entitled "A Communication Channel and Interface Devices for Bridging Computer Interface Buses," already incorporated herein by reference.

Figure 24:
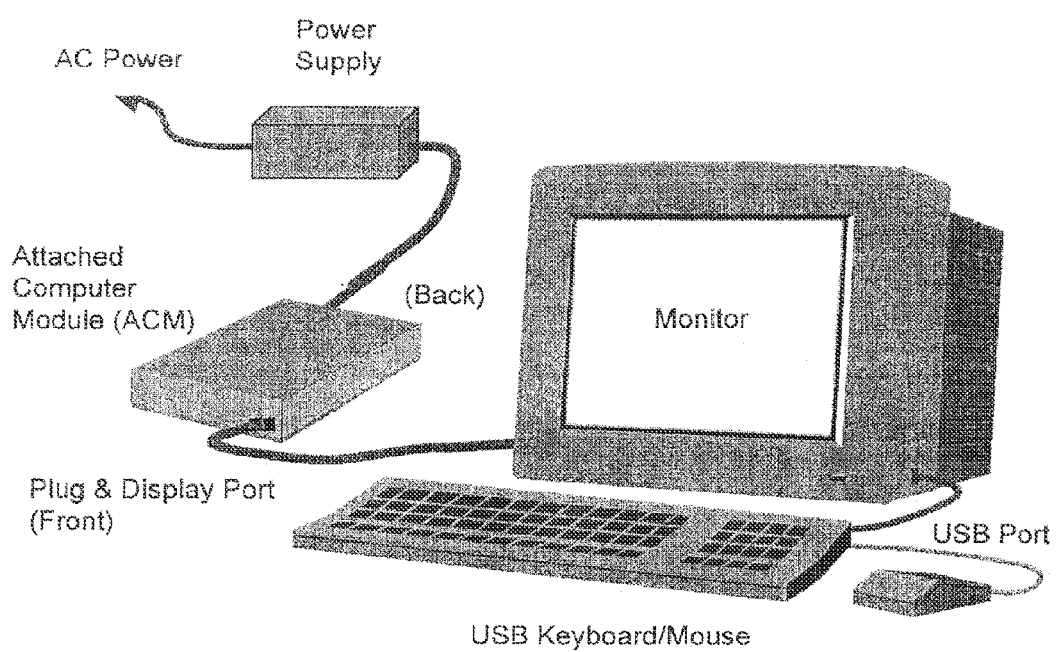
FIG. 24 shows an attached computer module with a "Plug & Display" port and direct power connection.

Connector component 1950 may be selected to mate directly with the connector component 1930 of an ACM (shown in FIG. 18). Alternatively, connector component 1950 may be selected to mate with, for example, the connector on one end of a cable intervening between the PCON and an ACM in a particular embodiment, such as cable 1964 shown in FIG. 19B. FIG. 24 shows an attached computer module with a "Plug & Display" port and direct power connection. The ACM-to-PCON interconnection described in the aforementioned companion patent application has the advantage of providing reliable signal conveyance across low cost cables.

Flash memory device 1948 provides non-volatile storage. This storage may be accessible to devices in both the ACM and the PCON, including the host interface controller and the peripheral interface controller to which it is connected. As such, flash memory 1948 may be used to store configuration and security data to facilitate an intelligent mating between an ACM and a PCON that needs no participation of the CPU.

The primary display component 1810 of the PCON functional circuitry 1801 of the presently described embodiment comprises integrated display panel 1812 and video connector 1813. Integrated display panel 1812 is a color LCD display panel having a resolution of 640 horizontal by 480 vertical pixels. 640-by-480 resolution is popularly considered to be the minimum screen size to make practical use of the application software in widespread use today. One skilled in the art recognizes that the type and resolution of the display can vary greatly from embodiment to embodiment, depending on factors such as cost and intended application. Any display device may be used, without departing from the scope and spirit of the invention, that provides principal visual output to the computer user for operating system and application software executing in its customary and intended fashion using the CPU component (1710 of FIG. 17) of an ACM presently coupled to PCON 1800.

Integrated display panel 1812 is coupled to video signal bus 1849 and displays a screen image in response to video signals presented on bus 1849. Certain pins of connector 1950 receive video output signals 1916 of the ACM-to-PCON interface bus 1910 from a mated connector that is coupled to an ACM. These certain pins of connector 1950 couple to video signal bus 1849 which conveys the video output signals 316 throughout the PCON 1800 as needed. Video connector 1813 is exposed at the exterior of PCON 1800 and couples to video signal bus 1849. Connector 1813 permits easy attachment of an external display device that is compatible with the signals carried by bus 1849, such as a CRT monitor (not shown). The external display device may be used in addition, or as an alternative, to integrated display panel 1812.

The isolation of the relatively heavy and sizable primary display 1810 from the core computing power and user environment contained within an ACM represents a further advantage of the present invention.

The primary input component 1820 of the PCON functional circuitry 1801 of the presently described embodiment comprises keyboard interface circuitry 1822, keyboard connector 1823, pointer interface circuitry 1824, and pointer connector 1825. Keyboard interface circuitry 1822 and pointer interface circuitry 1824 connect to ISA bus 1845 and are thereby coupled to the CPU component (1710 of FIG. 17) of any ACM attached to PCON 1800. Keyboard interface circuitry 1822 interfaces a standard computer keyboard (not shown), attached at connector 1823, to ISA bus 1845. Pointer interface circuitry 1822 interfaces a standard computer pointing device (not shown), such as a computer mouse attached at connector 1825, to ISA bus 1845. Computer keyboards, pointing devices, connectors 1823. 1825. keyboard interface circuitry 1822, and pointer interface circuitry 1824 are well known in the art. The isolation of the relatively heavy and sizable primary input devices 1820 from the core computing power and user environment contained within an ACM represents a further advantage of the present invention.

The primary power supply component 1830 of the PCON functional circuitry 1801 of the presently described embodiment provides electrical energy for the sustained, normal operation of the PCON 1800 and any ACM coupled to connector 1950. The power supply may be of the switching variety well known in the art that receives electrical energy from an AC source 1889, such as a wall outlet. Power supply 1830 reduces the alternating current input voltage, to a number of distinct outputs of differing voltages and current capacities. The outputs of power supply 1830 are applied to power bus 1831. Power bus 1831 distributes the power supply outputs to the other circuitry within the PCON 1800. Bus 1831 also connects to certain pins of connector 1950 to provide the electrical power 1914 for an ACM conveyed by ACM-to-PCON interconnection 1900. The isolation of the usually heavy power supply 1830 from the core computing power and user environment contained within the ACM represents a further advantage of the present invention.

The interface and support component 1840 of the PCON functional circuitry 1801 of the presently described embodiment comprises peripheral bridge 1846, diskette controller 1842, IDE controller 1848, and signal conveyance paths 1841, 1843, 1844, 1845, 1847 and 1849. Peripheral bridge 1846 couples PCI peripheral bus 1841 with peripheral busses of other formats such as ISA peripheral bus 1845 and others 1847. PCI and ISA peripheral busses are industry standards, well known and understood in the art. Other peripheral busses 1847 may include, for example, a bus compliant with the universal serial bus (USB) industry standard. While other embodiments of a peripheral console 1800 may include a single peripheral bus that is coupled to an attached ACM via ACM-to-PCON interconnection 1900, such as PCI bus 1841, this embodiment includes peripheral bridge 1846 to establish additional busses 1845, 1847. The additional busses 1845, 1847 permit the use of the many low-cost and readily available components compatible with these bus specifications.

Diskette controller 1842 interfaces a floppy disk drive 1854 with the CPU component 1710 of an attached ACM (shown in FIG. 18) so that the CPU may control and use the diskette drive 1854 hardware to store and retrieve data. Diskette controller 1842 couples to the CPU via a connection to ISA bus 1845. Diskette controller 1842 connects to the diskette drive 1854 via one of device cables 1843.

Similarly, IDE controller 1848 interfaces a hard disk drive 1852 and a CDROM drive 1856 with the CPU component 1710 of an attached ACM (shown in FIG. 18) so that the CPU may control and use the hard disk drive 1852 and CDROM 1856 hardware to store and retrieve data. IDE controller 1848 couples to the CPU via a connection to PCI peripheral bus 1841. IDE controller 1848 connects to each of hard disk drive 1852 and CD-ROM drive 1856 via one of device cables 1843. Some embodiments of PCON 1800 may take advantage of VLSI integrated circuits such as an 82371SB (PIIX4) integrated circuit from Intel Corporation. An 82371SB integrated circuit includes circuitry for both the peripheral bridge 1846 and the IDE controller 1848 in a single package.

The secondary mass storage component 1850 of the PCON functional circuitry 1801 of the presently described embodiment comprises diskette drive 1854, hard disk drive 1852, and CD-ROM drive 1856. Secondary mass storage 1850 generally provides low-cost, non-volatile storage for data files which may include software program files. Data files stored on secondary mass storage 1850 are not part of a computer user's core computing power and environment. Secondary mass storage 1850 may be used to store, for example, seldom used software programs, software programs that are used only with companion hardware devices installed in the same peripheral console 1800, or archival copies of data files that are maintained in primary mass storage 1750 of an ACM (shown in FIG. 18). Storage capacities for secondary mass storage 1850 devices may vary from the 1.44 megabytes of the 3.5-inch high density diskette drive 1854, to more than 10 gigabytes for a large format (5-inch) hard disk drive 1852. Hard disk drive 1852 employs fixed recording media, while diskette drive 1854 and CD-ROM drive 1856 employ removable media. Diskette drive 1854 and hard disk drive 1852 support both read and write operations (i.e., data stored on their recording media may be both recalled and modified) while CD-ROM drive 1856 supports only read operations.

The other devices component 1860 of the PCON functional circuitry 1801 of the presently described embodiment comprises a video capture card. A video capture card accepts analog television signals, such as those complying with the NTSC standard used for television broadcast in the United States, and digitizes picture frames represented by the analog signal for processing by the computer. Video capture cards at present are considered a specialty, i.e., not ubiquitous, component of personal computer systems. Digitized picture information from video capture card 1860 is carried via signal conveyance path 1844 to the peripheral interface controller 1940 which transforms it to the video port signals 1917 of the ACM-to-PCON interconnection 1900 for coupling to the advanced graphics processor 1752 in an attached ACM (shown in FIG. 18).

Video capture card 1860 is merely representative of the many types of "other" devices that may be installed in a PCON to expand the capabilities of the personal computer. Sound cards and laboratory data acquisition cards are other examples. Video capture card 1860 is shown installed in one of expansion slots 1870 for coupling to the interface and control circuitry 1840 of the PCON. Any of other devices 1860 could be coupled to the interface and control circuitry 1840 of the PCON by different means, such as direct installation on the circuit board that includes the interface and control circuitry 1840; e.g., a motherboard.

The expansion slots component 1870 of the PCON functional circuitry 1801 of the presently described embodiment comprises PCI connectors 1871 and ISA connectors 1872. A circuit card may be inserted into one of the connectors 1871, 1872 in order to be operatively coupled with the CPU 1710 of an attached ACM (shown in FIG. 18). Each of connectors 1871 electrically connects to PCI bus 1841, and may receive and hold a printed circuit card which it electrically couples to PCI bus 1841. Each of connectors 1872 electrically connects to ISA bus 1845, and may receive and hold a printed circuit card which it electrically couples to ISA bus 1845. The PCI 1841 and ISA 1845 busses couple to the CPU 1710 of an attached ACM (shown in FIG. 18) by circuitry already described.

An embodiment of a detachable computing module in accordance with the present invention, for attachment to a peripheral console for forming a fully operational computer system, comprises, an enclosure, a CPU, a memory coupled to said CPU, and a mass storage coupled to said CPU. The module further comprises interconnection circuitry coupled to said CPU, said interconnection circuitry connectable to a peripheral console. The CPU is uncoupled from any primary input circuitry when said interconnection circuitry is disconnected from a peripheral console.

An alternative embodiment of a detachable computing module in accordance with the present invention, for attachment to a peripheral console for forming a fully operational computer system, comprises an enclosure, a CPU, a memory coupled to said CPU, and a mass storage coupled to said CPU. The module further comprises interconnection circuitry coupled to said CPU, said interconnection circuitry connectable to a peripheral console. The CPU is uncoupled from any primary output circuitry when said interconnection circuitry is disconnected from a peripheral console.

Various modifications to the preferred embodiment can be made without departing from the spirit and scope of the invention. (A limited number of modifications have already been described in the preceding discussion.) For example, a particular embodiment may insert another layer of bus bridging between the CPU bridge and the Peripheral bridge. This may be desirable if, for example, a vendor wants to implement a proprietary, general-purpose bus having intermediate performance characteristics that fall between those of the high-performance general purpose bus originating at the CPU, and the slower general purpose PCI bus. Thus, the foregoing description is not intended to limit the invention as set forth.

In most embodiments, the ACM includes an enclosure such as the one described with the following components, which should not be limiting:

1) A CPU with cache memory;
2) Core logic device or means;
3) Main memory;
4) A single primary Hard Disk Drive ("HDD") that has a security program;
5) Flash memory with system BIOS and programmable user password;
6) Operating System, application software, data files on primary HDD;
7) An interface device and connectors to peripheral console;
8) A software controllable mechanical lock, lock control means, and other accessories.

The ACM connects to a peripheral console with power supply, a display device, an input device, and other elements. Some details of these elements with the present security system are described in more detail below.

Figure 22:
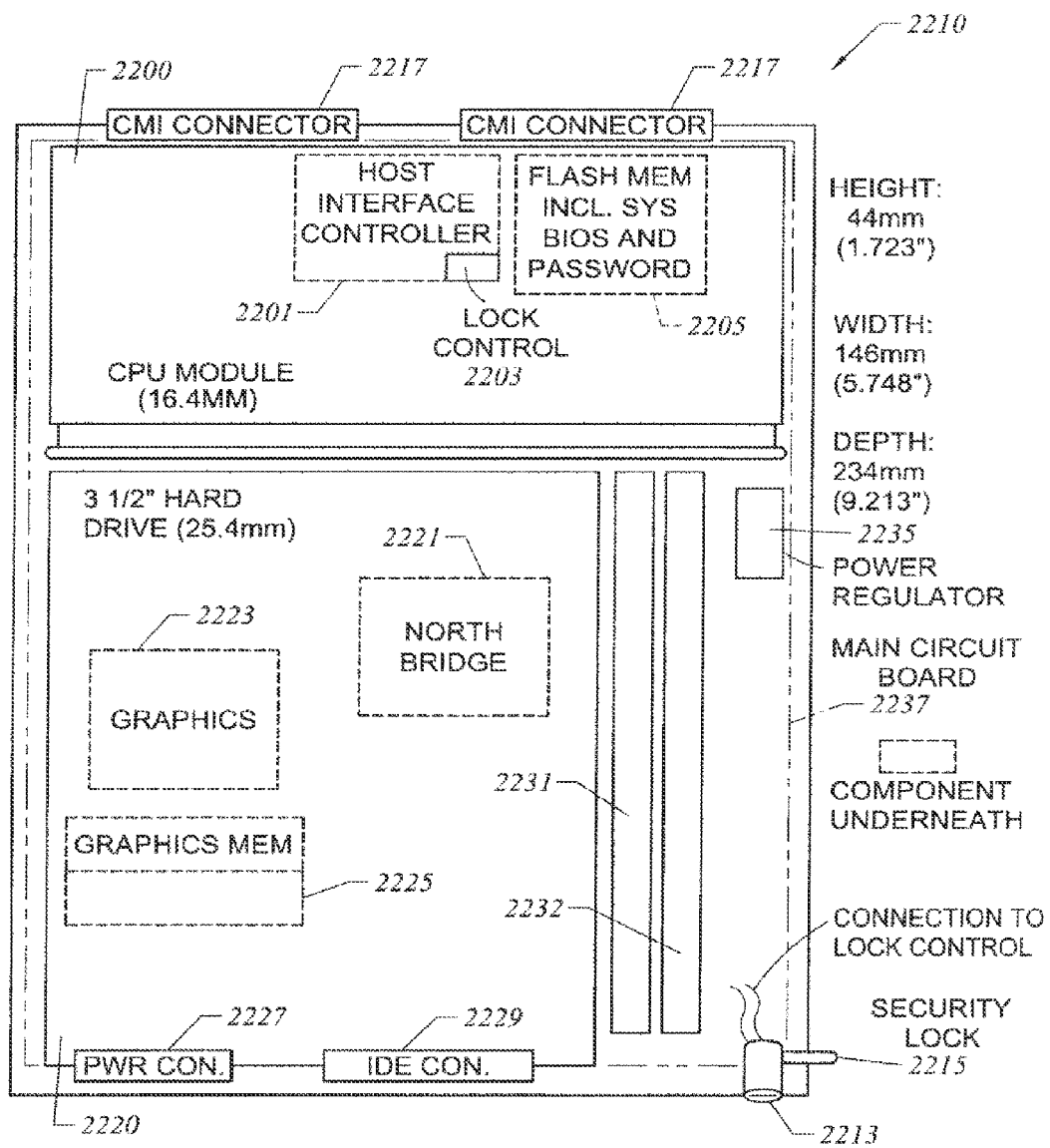
FIG. 22 is a simplified layout diagram of a security system for a computer system according to an embodiment of the present invention.

FIG. 22 is a simplified layout diagram of a security system for a computer system according to an embodiment of the present invention. This diagram is merely an illustration and should not limit the scope of the claims herein. One of ordinary skill in the art would recognize other variations, modifications. and alternatives. The layout diagram illustrates the top-view of the module 22, where the backside components (e.g., Host Interface Controller) are depicted in dashed lines. The layout diagram has a first portion, which includes a central processing unit ("CPU") module 2200, and a second portion, which includes a hard drive module 2220. A common printed circuit board 2237 houses these modules and the like. Among other features, the ACM includes the central processing unit module 2200 with a cache memory 2205, which is coupled to a north bridge unit 2221, and a host interface controller 2201. The host interface controller includes a lock control 2203. As shown, the CPU module is disposed on a first portion of the attached computer module, and couples to connectors 2217. Here, the CPU module is spatially located near connector 2217.

The CPU module can use a suitable microprocessing unit, microcontroller, digital signal processor, and the like. In a specific embodiment, the CPU module uses, for example, a 400 MHz Pentium II microprocessor module from Intel Corporation and like microprocessors from AMD Corporation, Cyrix Corporation (now National Semiconductor Corporation), and others. In other aspects, the microprocessor can be one such as the Compaq Computer Corporation Alpha Chip, Apple Computer Corporation PowerPC G3 processor, and the like. Further, higher speed processors are contemplated in other embodiments as technology increases in the future.

In the CPU module, host interface controller 2201 is coupled to BIOS/flash memory 2205. Additionally, the host interface controller is coupled to a clock control logic, a configuration signal, and a peripheral bus. The present invention has a host interface controller that has lock control 2203 to provide security features to the present ACM. Furthermore, the present invention uses a flash memory that includes codes to provide password protection or other electronic security methods.

The second portion of the attached computer module has the hard drive module 2220. Among other elements, the hard drive module includes north bridge 2221, graphics accelerator 2223, graphics memory 2225, a power controller 2227, an IDE controller 2229, and other components. Adjacent to and in parallel alignment with the hard drive module is a personal computer interface ("PCI") bus 2231, 2232. A power regulator 435 is disposed near the PCI bus.

In a specific embodiment, north bridge unit 2221 often couples to a computer memory, to the graphics accelerator 2223, to the IDE controller, and to the host interface controller via the PCI bus. Graphics accelerator 2223 typically couples to a graphics memory 2223, and other elements. IDE controller 2229 generally supports and provides timing signals necessary for the IDE bus. In the present embodiment, the IDE controller is embodied as a 643U2 PCI-to IDE chip from CMD Technology, for example. Other types of buses than IDE are contemplated, for example EIDE, SCSI, 1394, and the like in alternative embodiments of the present invention.

The hard drive module or mass storage unit 2220 typically includes a computer operating system, application software program files, data files, and the like. In a specific embodiment, the computer operating system may be the Windows98 operating system from Microsoft Corporation of Redmond Wash. Other operating systems, such as WindowsNT, MacOS8, Unix, and the like are also contemplated in alternative embodiments of the present invention. Further, some typical application software programs can include Office98 by Microsoft Corporation, Corel Perfect Suite by Corel, and others. Hard disk module 2220 includes a hard disk drive. The hard disk drive, however, can also be replaced by removable hard disk drives, read/write CD ROMs, flash memory, floppy disk drives, and the like. A small form factor, for example 2.5", is currently contemplated, however, other form factors, such as PC card, and the like are also contemplated. Mass storage unit 2240 may also support other interfaces than IDE. Among other features, the computer system includes an ACM with security protection. The ACM connects to the console, which has at least the following elements, which should not be limiting.

1) Connection to input devices, e.g. keyboard or mouse;
2) Connection to display devices, e.g. Monitor;
3) Add-on means, e.g. PCI add-on slots;
4) Removable storage media subsystem, e.g. Floppy drive, CDROM drive;
5) Communication device, e.g. LAN or modem;
6) An interface device and connectors to ACM;
7) A computer module bay with a notch in the frame for ACM's lock; and
8) Power supply and other accessories.

As noted, the computer module bay is an opening in a peripheral console that receives the ACM. The computer module bay provides mechanical support and protection to ACM. The module bay also includes, among other elements, a variety of thermal components for heat dissipation, a frame that provides connector alignment, and a lock engagement, which secures the ACM to the console. The bay also has a printed circuit board to mount and mate the connector from the ACM to the console. The connector provides an interface between the ACM and other accessories.

Figure 23:
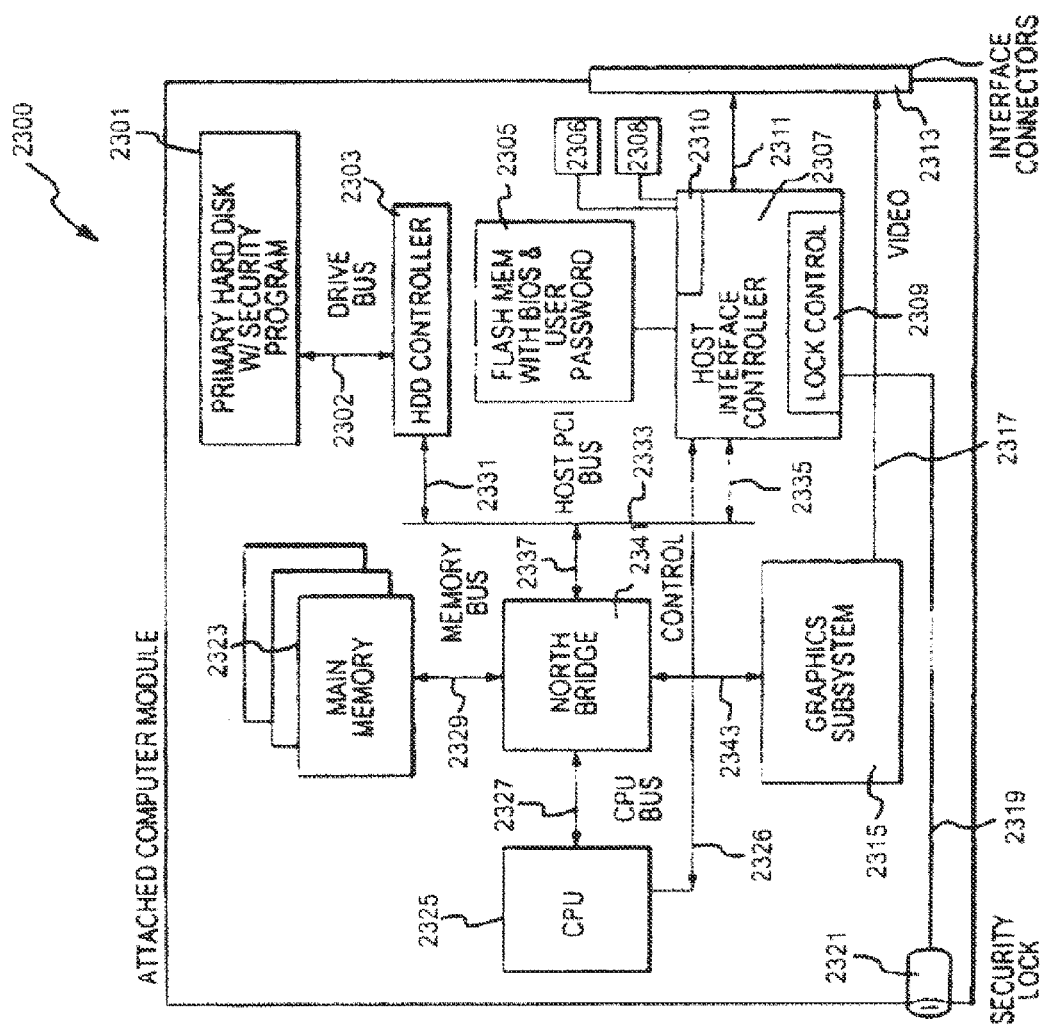
FIG. 23 is a simplified block diagram of a security system for a computer module according to an embodiment of the present invention.

FIG. 23 is a simplified block diagram 2300 of a security system for a computer module according to an embodiment of the present invention. This diagram is merely an illustration and should not limit the scope of the claims herein. One of ordinary skill in the art would recognize other variations, modifications, and alternatives. The block diagram 2300 has a variety of features such as those noted above, as well as others. In the present diagram, different reference numerals are used to show the operation of the present system.

The block diagram is an attached computer module 2300. The module 2300 has a central processing unit, which communicates to a north bridge 2341, by way of a CPU bus 2327. The north bridge couples to main memory 2323 via memory bus 2329. The main memory can be any suitable high speed memory device or devices such as dynamic random access memory ("DRAM") integrated circuits and others. The DRAM includes at least 32 Meg. or 64 Meg. and greater of memory, but can also be less depending upon the application. Alternatively, the main memory can be coupled directly with the CPU in some embodiments. The north bridge also couples to a graphics subsystem 2315 via bus 2342. The graphics subsystem can include a graphics accelerator, graphics memory, and other devices. Graphics subsystem transmits a video signal to an interface connector, which couples to a display, for example.

The attached computer module also includes a primary hard disk drive that serves as a main memory unit for programs and the like. The hard disk can be any suitable drive that has at least 2 GB and greater. As merely an example, the hard disk is a Marathon 2250 (2.25 GB, 2½ inch drive) product made by Seagate Corporation of Scotts Valley, but can be others. The hard disk communicates to the north bridge by way of a hard disk drive controller and bus lines 2302 and 2331. The hard disk drive controller couples to the north bridge by way of the host PCI bus, which connects bus 2337 to the north bridge. The hard disk includes computer codes that implement a security program according to the present invention. Details of the security program are provided below.

The attached computer module also has a flash memory device 2305 with a BIOS. The flash memory device 2305 also has codes for a user password that can be stored in the device. The flash memory device generally permits the storage of such password without a substantial use of power, even when disconnected. As merely an example, the flash memory device has at least 4 Meg. or greater of memory, or 16 Meg. or greater of memory. A host interface controller 2307 communications to the north bridge via bus 2335 and host PCI bus.

The host interface controller also has a Lock control 2309, which couples to a lock. The lock is attached to the module and has a manual override to the lock on the host interface controller in some embodiments. Host interface controller 2307 communicates to the console using bus 2311, which couples to connection 2313.

FIGS. 25 and 26 are tables including the pin number, symbol, signal standard and description for the pins on the peripheral and video connectors, respectively.

In a preferred embodiment, the present invention uses a password protection scheme to electronically prevent unauthorized access to the computer module. The present password protection scheme uses a combination of software, which is a portion of the security program, and a user password, which can be stored in the flash memory device 505. By way of the flash memory device, the password does not become erased by way of power failure or the lock. The password is substantially fixed in code, which cannot be easily erased. Should the user desire to change the password, it can readily be changed by erasing the code, which is stored in flash memory and a new code (i.e., password) is written into the flash memory. An example of a flash memory device can include a Intel Flash 28F800F3 series flash, which is available in 8 Mbit and 16 Mbit designs. Other types of flash devices can also be used, however. Details of a password protection method are further explained below by way of the FIGS.

In a specific embodiment, the present invention also includes a real-time clock 510 in the ACM, but is not limited. The real-time clock can be implemented using a reference oscillator 14.31818 MHz 508 that couples to a real-time clock circuit. The real-time clock circuit can be in the host interface controller. An energy source 506 such as a battery can be used to keep the real-time clock circuit running even when the ACM has been removed from the console. The real-time clock can be used by a security program to perform a variety of functions. As merely an example, these functions include: (1) fixed time period in which the ACM can be used, e.g., ACM cannot be used at night; (2) programmed ACM to be used after certain date, e.g., high security procedure during owner's vacation or non use period; (3) other uses similar to a programmable time lock. Further details of the present real-time clock are described in the application listed under Ser. No. 09/183,816 noted above.

In still a further embodiment, the present invention also includes a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present password and user identification can be quite important for electronic commerce applications and the like. In one or more embodiments, the permanent password or user code can be combined with the password on flash memory for the security program, which is described below in more detail.

In one aspect of the invention, the user password is programmable. The password can be programmable by way of the security program. The password can be stored in a flash memory device within the ACM. Accordingly, the user of the ACM and the console would need to have the user password in order to access the ACM. In the present aspect, the combination of a security program and user password can provide the user a wide variety of security functions as follows:

1) Auto-lock capability when ACM is inserted into CMB;
2) Access privilege of program and data;
3) Password matching for ACM removal; and
4) Automatic HDD lock out if tempering is detected.

In still a further embodiment, the present invention also includes a method for reading a permanent password or user identification code to identify the computer module. In one embodiment, the permanent password or user code is stored in a flash memory device. Alternatively, the permanent password or user code is stored in the central processing unit. The password or user code can be placed in the device upon manufacture of such device. Alternatively, the password or user code can be placed in the device by a one time programming techniques using, for example, fuses or the like. The present password or user code provides a permanent "finger print" on the device, which is generally hardware. The permanent finger print can be used for identification purposes for allowing the user of the hardware to access the hardware itself, as well as other systems. These other systems include local and wide area networks. Alternatively, the systems can also include one or more servers. The present method allows a third party confirm the user by way of the permanent password or user code. The present password and user identification can be quite important for electronic commerce applications and the like, which verify the user code or password. In one or more embodiments, the permanent password or user code can be combined with the password on flash memory for the security program.

The above embodiments are described generally in terms of hardware and software. It will be recognized, however, that the functionality of the hardware can be further combined or even separated. The functionality of the software can also be further combined or even separated. Hardware can be replaced, at times, with software. Software can be replaced, at times, with hardware. Accordingly, the present embodiments should not be construed as limiting the scope of the claims here. One of ordinary skill in the art would recognize other variations, modifications, and alternatives.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A method of improving computer peripheral data communications, comprising:
   connecting a Central Processing Unit (CPU) directly to a peripheral bridge on a printed circuit board of a computer system;
   connecting a Low Voltage Differential Signal (LVDS) channel directly to the peripheral bridge on the printed circuit board, the LVDS channel comprising two unidirectional, serial channels that transmit data in opposite directions;
   increasing data throughput of the serial channels by providing each channel with multiple pairs of differential signal lines;
   conveying encoded address and data bits of a Peripheral Component Interconnect (PCI) bus transaction in serial form over the serial channels to preserve the PCI bus transaction;
   coupling the peripheral bridge to an Ethernet connection through the LVDS channel to improve data throughput between the CPU and the Ethernet connection;
   using the Ethernet connection to connect the computer system to an Ethernet network; and
   applying power to the computer system.

2. The method of claim 1 further comprising attaching system memory directly to the CPU.

3. The method of claim 1 further comprising:
   coupling a mass storage device to the CPU; and
   using flash memory as a mass storage device.

4. A method of improving computer peripheral data communications, comprising:
   mounting a Central Processing Unit (CPU) on a printed circuit board of a computer system;
   connecting a Low Voltage Differential Signal (LVDS) channel directly to the CPU on the printed circuit board, the LVDS channel comprising two unidirectional, serial channels that transmit data in opposite directions;
   increasing data throughput of the serial channels by providing each channel with multiple pairs of differential signal lines;
   conveying encoded address and data bits of a Peripheral Component Interconnect (PCI) bus transaction in serial form over the serial channels to preserve the PCI bus transaction;
   coupling the CPU to a peripheral device through the LVDS channel; and
   applying power to the computer system.

5. The method of claim 4 further comprising attaching system memory directly to the CPU.

6. The method of claim 4 further comprising:
   coupling a mass storage device to the CPU; and
   using flash memory as a mass storage device.

7. A method of improving computer storage data throughput, comprising:
   connecting a Central Processing Unit (CPU) directly to a peripheral bridge on a printed circuit board of a computer system,
   connecting a Low Voltage Differential Signal (LVDS) channel directly to the peripheral bridge on the printed circuit board, the LVDS channel comprising two unidirectional, serial channels that transmit data in opposite directions;
   increasing data throughput of the serial channels by providing each channel with multiple pairs of differential signal lines;
   conveying encoded address and data bits of a Peripheral Component Interconnect (PCI) bus transaction in serial form over the serial channels to preserve the PCI bus transaction;
   coupling the peripheral bridge to a mass storage device through the LVDS channel; and
   applying power to the computer system.

8. The method of claim 7 further comprising attaching system memory directly to the CPU.

9. The method of claim 7 further comprising using flash memory for mass storage.

10. A method of improving peripheral data performance on a motherboard, comprising:
    connecting a Central Processing Unit (CPU) directly to a peripheral bridge on a motherboard, connecting a Low Voltage Differential Signal (LVDS) channel directly to the peripheral bridge on the motherboard, the LVDS channel comprising two unidirectional, serial channels that transmit data in opposite directions;

increasing data throughput of the serial channels by providing each channel with multiple pairs of differential signal lines;

conveying encoded address and data bits of a Peripheral Component Interconnect (PCI) bus transaction in serial form over the serial channels to preserve the PCI bus transaction;

attaching an Ethernet connector to the motherboard for connection to an Ethernet network; and coupling the peripheral bridge to the Ethernet connector through the LVDS channel.

11. The method of claim 10 further comprising using the motherboard and the LVDS channels in a computer system.

12. The method of claim 10 further comprising:
providing sockets for memory modules on the motherboard that connect directed to the CPU; and
populating the sockets with system memory.

13. The method of claim 10 further comprising:
providing a connector on the motherboard for adding a mass storage device; and
utilizing flash memory for the mass storage device.

14. A method of improving data throughput on a motherboard, comprising:
mounting a Central Processing Unit (CPU) on a motherboard;
connecting a Low Voltage Differential Signal (LVDS) channel directly to the CPU on the motherboard, the LVDS channel comprising two unidirectional, serial channels that transmit data in opposite directions;
increasing data throughput of the serial channels by providing each channel with multiple pairs of differential signal lines;
conveying encoded address and data bits of a Peripheral Component Interconnect (PCI) bus transaction in serial form over the serial channels to preserve the PCI bus transaction; and
coupling the CPU to a peripheral device attached to the motherboard through the LVDS channel.

15. The method of claim 14 further comprising:
having the peripheral device support Ethernet communication; and
using the motherboard in a computer system to improve Ethernet network data throughput to the CPU.

16. The method of claim 14 further comprising:
providing sockets for memory modules on the motherboard that connect directly to the CPU; and
populating the sockets with system memory to improve system performance.

17. The method of claim 14 further comprising:
mounting a connector on the motherboard for a mass storage device; and
utilizing flash memory for the mass storage device.

18. A method of increasing external peripheral data communication speed of a computer, comprising:
connecting a Central Processing Unit (CPU) directly to a peripheral bridge on a printed circuit board of a computer system;
connecting a first Low Voltage Differential Signal (LVDS) channel directly to the peripheral bridge on the printed circuit board, the first LVDS channel comprising two unidirectional, serial channels that transmit data in opposite directions;
providing a connector for the computer system that can connect to a console;
providing a second LVDS channel to couple to the console through the connector, the second LVDS channel comprising two unidirectional, serial channels that transmit data in opposite directions;
conveying encoded address and data bits of a Peripheral Component Interconnect (PCI) bus transaction in serial form over the first and second LVDS channels to preserve the PCI bus transaction; and
conveying the encoded PCI bus transaction serially through the second LVDS channel to the console.

19. The method of claim 18 further comprising attaching system memory directly to the CPU.

20. The method of claim 18 further comprising providing digital video signals through the same connector to an external display.

21. A method of increasing external peripheral data communication speed of a computer, comprising:
providing an integrated Central Processing Unit (CPU) and graphics controller in a single chip, on a printed circuit board of a computer system;
providing digital video signals directly from the integrated Central Processing Unit (CPU) and graphics controller;
connecting a first Low Voltage Differential Signal (LVDS) channel directly to a peripheral bridge on the printed circuit board, the first LVDS channel comprising two unidirectional, serial channels that transmit data in opposite directions;
providing a connector for the computer system that can connect to a console;
providing a second LVDS channel to couple to the console through the connector, the second LVDS channel comprising two unidirectional, serial channels that transmit data in opposite directions;
conveying encoded address and data bits of a Peripheral Component Interconnect (PCI) bus transaction in serial form over the second LVDS channel to preserve the PCI bus transaction; and
conveying the encoded PCI bus transaction serially through the second LVDS channel to the console.

22. The method of claim 21 further comprising attaching system memory directly to the CPU.

23. The method of claim 21 further comprising coupling the digital video signals from the integrated CPU and graphics controller through the connector to an external display.

24. A method of improving data communication within a modular server, comprising:
coupling a first integrated CPU and graphics controller chip to a first printed circuit board;
coupling a first Low Voltage Differential Signal (LVDS) channel to the first integrated CPU and graphics controller chip, wherein the first LVDS channel comprises two unidirectional, serial channels to transmit an encoded Peripheral Component Interconnect (PCI) bus transaction in serial form in opposite directions;
coupling the first LVDS channel directly to a first connector;
coupling a second integrated CPU and graphics controller chip to a second printed circuit board;
coupling a second LVDS channel to the second integrated CPU and graphics controller chip, wherein the second LVDS channel comprises two unidirectional, serial channels to transmit an encoded Peripheral Component Interconnect (PCI) bus transaction in serial form in opposite directions;

coupling the second LVDS channel directly to a second connector;

coupling the first and second connectors to a third printed circuit board;

coupling a hub controller to the third printed circuit board; and coupling the first and second LVDS channels directly to the hub controller with point to point connections for each channel through the third printed circuit board to communicate using a PCI protocol.

25. The method of claim 24 further comprising coupling a mass storage device to the first integrated CPU and graphics controller chip, wherein the mass storage device resides on the first printed circuit board.

26. The method of claim 25 wherein the mass storage device comprises flash memory.

27. A method of improving data communication within a computer, comprising:

connecting an integrated Central Processing Unit (CPU) and graphics controller chip to a printed circuit board within the computer, connecting a first Low Voltage Differential Signal (LVDS) channel directly to the integrated CPU and graphics controller chip, wherein the first LVDS channel comprises two unidirectional, serial channels that transmit data in opposite directions;

connecting a second LVDS channel directly to a connector, comprising two unidirectional, serial channels that transmit data in opposite directions;

conveying Universal Serial Bus (USB) protocol data over the first LVDS channel; and coupling the first LVDS channel to the connector through the second LVDS channel.

28. The method of claim 27 further comprising coupling a cable to the connector for communicating USB protocol data to a console, wherein the console comprises a power supply.

29. The method of claim 28 further comprising:

supplying power to the computer from the console upon coupling.

30. A method of improving peripheral data communication within a computer, comprising:

connecting an integrated Central Processing Unit (CPU) and graphics controller chip directly to a first Low Voltage Differential Signal (LVDS) channel comprising two unidirectional, serial channels that transmit data in opposite directions;

conveying Universal Serial Bus (USB) protocol data over the first LVDS channel;

coupling a second LVDS channel directly to the integrated CPU and graphics controller;

conveying digital video signals through the second LVDS channel;

coupling the first LVDS channel to a connector to communicate using a USB protocol.

31. The method of claim 30 further comprising coupling the connector to a console through a cable to communicate using a USB protocol.

32. The method of claim 30 further comprising conveying Transition Minimized Differential Signaling (TDMS) signals over the second differential signal channel.

33. A method of improving external peripheral data performance within a computer, comprising:

coupling an integrated Central Processing Unit (CPU) and graphics controller chip to a connector, conveying a first Low Voltage Differential Signal (LVDS) channel through the connector comprising two unidirectional, serial channels that transmit data in opposite directions;

conveying Universal Serial Bus (USB) protocol data from the integrated CPU and graphics controller chip, over the first LVDS channel for external USB protocol data communication.

34. The method of claim 33 further comprising connecting a second differential signal channel directly to the integrated CPU and graphics controller chip to output digital video signals.

35. The method of claim 34 further comprising:

conveying Transition Minimized Differential Signaling (TDMS) signals over the second differential signal channel.

36. A method of improving data throughput on a motherboard, comprising:

mounting an integrated Central Processing Unit (CPU) and interface controller as a single chip on a motherboard;

connecting a Low Voltage Differential Signal (LVDS) channel directly to the interface controller on the motherboard, wherein the LVDS channel comprises two unidirectional, serial channels that transmit data in opposite directions;

increasing data throughput of the serial channels by providing each channel with multiple differential signal line pairs;

configuring the interface controller to adapt to different numbers of differential signal line pairs for conveying encoded address and data bits of a Peripheral Component Interconnect (PCI) bus transaction in serial form; and coupling the integrated CPU and interface device to a peripheral device attached to the motherboard through the LVDS channel with the adapted number of differential signal line pairs.

37. The method of claim 36 further comprising:

having the peripheral device support Ethernet communication; and using the motherboard in a computer system to improve Ethernet network data throughput to the integrated CPU and interface controller.

38. The method of claim 36 further comprising:

providing Phase-Locked Loop (PLL) clock circuitry in the single chip coupled to the interface controller; and configuring the interface controller to generate different data transfer frequencies to convey the PCI bus transaction through the LVDS channel based on different clock frequencies generated by the PLL clock circuitry.

\* \* \* \* \*